(12) United States Patent
Hayashi et al.

(10) Patent No.: US 11,030,482 B2
(45) Date of Patent: Jun. 8, 2021

(54) ANNOTATION DEVICE AND ANNOTATION METHOD

(71) Applicant: OLYMPUS CORPORATION, Tokyo (JP)

(72) Inventors: Toshikazu Hayashi, Sagamihara (JP); Zhen Li, Hino (JP); Hisayuki Harada, Tama (JP); Seiichiro Sakaguchi, Akishima (JP); Kazuhiko Osa, Hachioji (JP); Osamu Nonaka, Sagamihara (JP)

(73) Assignee: OM DIGITAL SOLUTIONS, Tokyo (JP)

(*) Notice: Subject to any disclaimer, the term of this patent is extended or adjusted under 35 U.S.C. 154(b) by 106 days.

(21) Appl. No.: 16/552,542

(22) Filed: Aug. 27, 2019

(65) Prior Publication Data

US 2020/0074224 A1   Mar. 5, 2020

(30) Foreign Application Priority Data

Aug. 28, 2018  (JP) .............................. JP2018-159582
Aug. 28, 2018  (JP) .............................. JP2018-159583

(51) Int. Cl.
*G06K 9/62*   (2006.01)
*G06F 3/14*   (2006.01)
(Continued)

(52) U.S. Cl.
CPC ............ *G06K 9/6253* (2013.01); *G06F 3/14* (2013.01); *G06K 9/48* (2013.01); *G06K 9/623* (2013.01); *G06K 9/6257* (2013.01); *G06K 9/6263* (2013.01); *G06K 9/6267* (2013.01); *G06N 3/08* (2013.01); *G06K 2209/05* (2013.01)

(58) Field of Classification Search
CPC ........ G16H 30/40; G16H 50/70; G16H 40/40; A61B 90/361; A61B 34/30
See application file for complete search history.

(56) References Cited

U.S. PATENT DOCUMENTS 8,272,873 B1 *  9/2012  Keller ..................... G09B 19/06
                                              434/169
8,500,453 B2 *  8/2013  Simon ...................... G09B 5/06
                                              434/365
(Continued)

FOREIGN PATENT DOCUMENTS

JP        2015-198928 A     11/2015

*Primary Examiner* — Yosef Kassa
(74) *Attorney, Agent, or Firm* — Scully, Scott, Murphy & Presser, P.C.

(57) ABSTRACT

An annotation device, comprising: a display that performs sequential playback display of a plurality of images that may contain physical objects that are the subject of annotation, and a processor that acquires specific portions that have been designated within the images displayed on the display as annotation information, sets operation time or data amount for designating the specific portions, and at a point in time where designation of the specific portions has been completed for the operation time, a time based on data amount, or data amount, that have been set, requests learning to an inference engine that creates an inference model by learning, using annotation information that has been acquired up to the time of completion as training data representing a relationship between the physical object and the specific portions.

22 Claims, 20 Drawing Sheets

(51) Int. Cl.
*G06K 9/48* (2006.01)
*G06N 3/08* (2006.01)

(56) References Cited

U.S. PATENT DOCUMENTS

| | | | | |
|---|---|---|---|---|
| 8,597,027 B2* | 12/2013 | Staplin | ............... | G09B 9/052 |
| | | | | 434/65 |
| 9,002,720 B2* | 4/2015 | Nepomuceno | ....... | G09B 19/167 |
| | | | | 705/4 |
| 9,055,904 B2* | 6/2015 | Yoo | ............... | A61B 3/0041 |
| 9,565,332 B2* | 2/2017 | Takeuchi | ............... | G06T 7/223 |
| 2015/0279061 A1 | 10/2015 | Kutsuna et al. | | |

* cited by examiner

LAPSE OF TIME

LAPSE OF TIME

ANNOTATION DEVICE AND ANNOTATION METHOD

CROSS-REFERENCE TO RELATED APPLICATIONS

Benefit is claimed, under 35 U.S.C. § 119, to the filing date of prior Japanese Patent Applications No. 2018-159582 filed on Aug. 28, 2018, and No. 2018-159583 filed on Aug. 28, 2018. These applications are expressly incorporated herein by reference. The scope of the present invention is not limited to any requirements of the specific embodiments described in the applications.

BACKGROUND OF THE INVENTION

1. Field of the Invention

The present invention relates to an annotation device and an annotation method suitable for creating training data for generating an inference model for machine learning, such as deep learning.

2. Description of the Related Art

In a medical image processing apparatus that displays at least one medical image that has been taken of a test subject, it has been proposed to determine a position to be confirmed from an image, and to display whether or not there has been determination for this position (refer to Japanese patent Laid-open No. 2015-198928 (hereafter referred to as "patent publication 1"). Also, while various machine learning devices, such as for deep learning, have been proposed, at the time of this machine learning training data for performing deep learning is required. In order to create this training data, a person manually performed annotation to designate a position.

As was described previously, though it has been proposed to determine a position to be diagnosed, there is no description regarding creating training data for use in machine learning such as deep learning, by performing annotation. There is also no description regarding, at the time of performing annotation, performing annotation first by an operator manually, and then performing the rest of the annotation using an inference model that has been generated using training data that was created by the annotation. Also, although, at the time of performing inference using an inference model, reliability of the inference model must also be validated, there is no description regarding generation of validation data for detecting reliability of the training data for learning, and the inference model.

SUMMARY OF THE INVENTION

The present invention provides an annotation device and an annotation method that can perform an annotation operation without imposing a burden on the operator.

An annotation device of a first aspect of the present invention comprises: a display control circuit that performs the following display control: (1) display of operation times of a series of annotation operations, or image data amount of the annotation operation, on a display; and (2) sequential playback display of a plurality of images on the display, based on a plurality of items of image data that contain physical object constituting subjects of annotation; and a processor that has the following circuits: (a) a circuit that acquires operation results of an operation section that designates specific portions within an image that has been displayed on the display; (b) a circuit that, for an annotation operation, acquires annotation information for the displayed image, based on the operation results; and (c) a circuit that, at a point in time when the operation time, a time based on data amount, or a data amount, that have been set, have been reached, makes image data for which annotation information has already been acquired into training data, and requests learning, for generating an inference model that will infer specific portions from image data, to a learning circuit.

An annotation device of a second aspect of the present invention comprises: a display that performs sequential playback display of a plurality of images that contain physical objects that are the subject of annotation; and a processor that acquires specific portions that have been designated within the images displayed on the display as annotation information, sets operation time or data amount for designating the specific portions, and at a point in time where designation of the specific portions has been completed for the operation time, a time based on data amount, or data amount, that have been set, requests learning to an inference engine that generates an inference model, by learning using annotation information that has been acquired up to the time of completion as training data representing a relationship between the physical object and the specific portions.

An annotation method of a third aspect of the present invention comprises: setting operation time or data amount for designating specific portions of a physical object obtained that is a subject of annotation; individually sequentially playing back a plurality of images that may contain the physical object in accordance with operation time or data amount that have been set, and performing annotation to designate specific portions of the physical object on an image that has been played back; and requesting generation of an inference model, by learning using a relationship between the physical objects and the specific portions that have been acquired in the annotation as training data, to a learning device.

DETAILED DESCRIPTION OF THE PREFERRED EMBODIMENTS

In the following, an example of the present invention applied to an imaging system having an imaging device (for example, a digital camera, a camera for an endoscope, camera for a microscope etc.) and an external device will be described as a first embodiment of the present invention. An overview of this imaging system is given in the following. The camera can be connected to an external unit via a network. This external device can store images, and an operator looks at the stored images to determine locations to be aimed at, and makes this range annotation information. For example, a physician looks at endoscope images of an affected part of a patient, performs an annotation operation to designate the affected part using a mouse or cursor etc., and information about this range that has been designated is made annotation information. Obviously the annotation operation may also be performed by touch with a touch panel, or pen input may also be adopted. The annotation operation may also use voice input with a microphone, or use an eye controlled focus system with a sight determination camera. A termination operation at the time an annotation operation has been completed may also be performed with operation input such described above, and in this case it is also possible to utilize a keyboard, mouse, or foot switch. Also, since who may have performed annotation operation constitutes important evidence, information input of an operator may be performed with the above described technology, and as required, it is also possible to utilize various biometrics authentication sensors, circuits, and algorithms etc.

Since a specialist such as a physician operates to select a time when there is ample leeway for work using their specialist knowledge, without always being obliged to perform annotation, it takes more time than necessary. This means that when commencing an annotation operation, operation time, a number of images etc. are designated in line with spare time of that time (refer, for example, to S11 in FIG. 5). After commencing an annotation operation manually, if operation time that has been previously designated lapses, or if annotation operation is performed for a number of images, deep learning is performed using annotation information for which addition has already been completed (refer, for example, to S19 FIG. 5). As a result of this deep learning, an inference model for annotation is generated. An annotation operation is also performed manually concurrently with deep learning (refer, for example, to S21 in FIG. 5).

Figure 5:
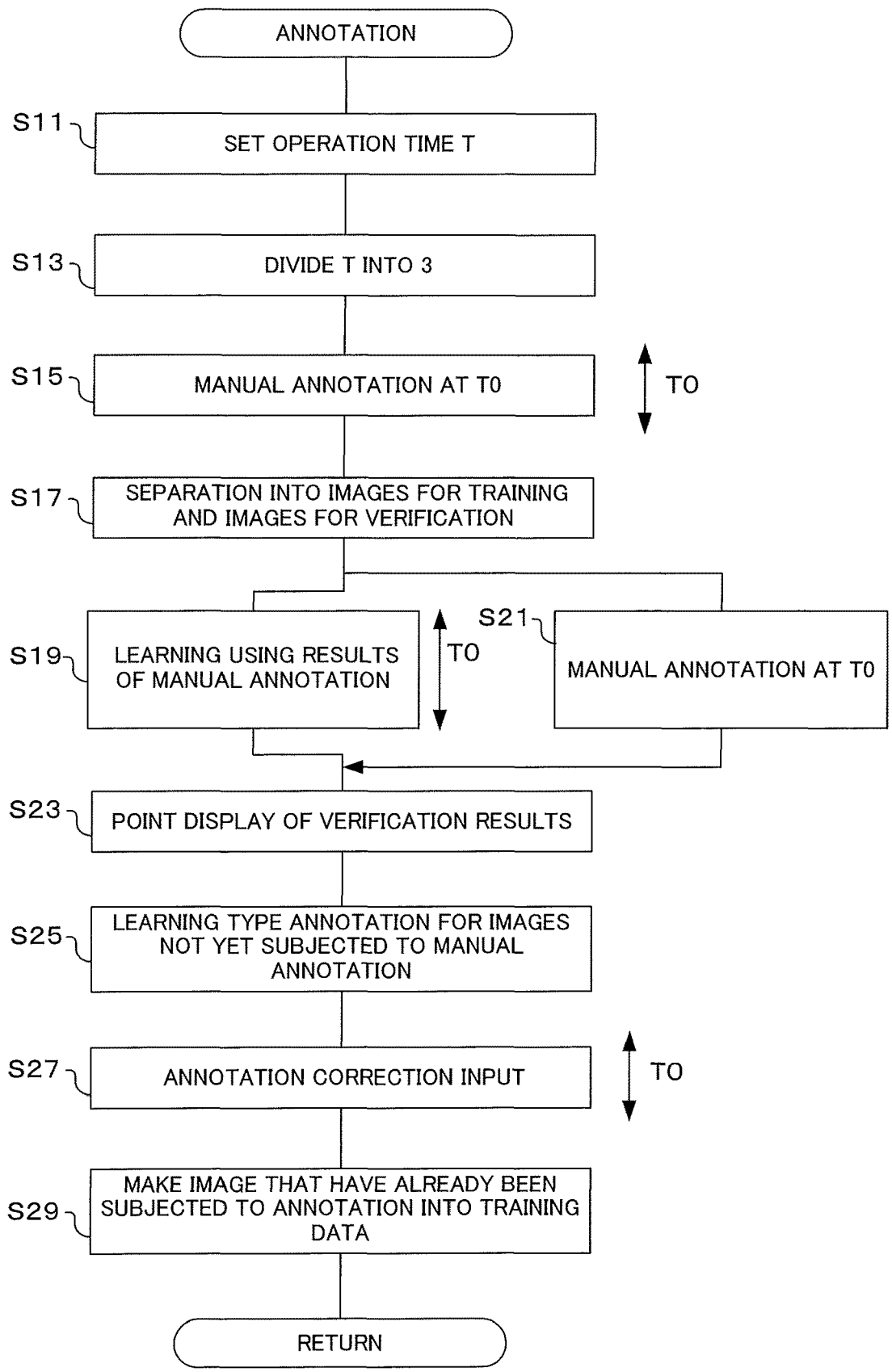
FIG. 5 is a flowchart showing an annotation operation of the imaging system of the first embodiment of the present invention.

If deep learning it is finished, annotation information is added by inference, using the inference model that was generated by deep learning (refer, for example, to S25 in FIG. 5). On operator views inference results for the annotation information, determine whether or not an object such as an affected part has been correctly designated. If the result of this determination is that annotation information has been correctly added it is used as training data, while if it is determined that annotation information has not been correctly added annotation information is manually corrected by the operator so that it can be used as training data. It is possible to further generate an inference model of higher reliability by further performing deep learning using these items of training data.

Also, if annotation operations have been performed for a specified time or for a specified number of images, there is separation into images having annotation information for training data creation and images having annotation information for verification (refer, for example, to S17 FIG. 5). Images that have annotation information for training data are used in deep learning for inference model generation. Images that have annotation information for verification are used when verifying reliability of an inference model that has been generated.

Figure 1:
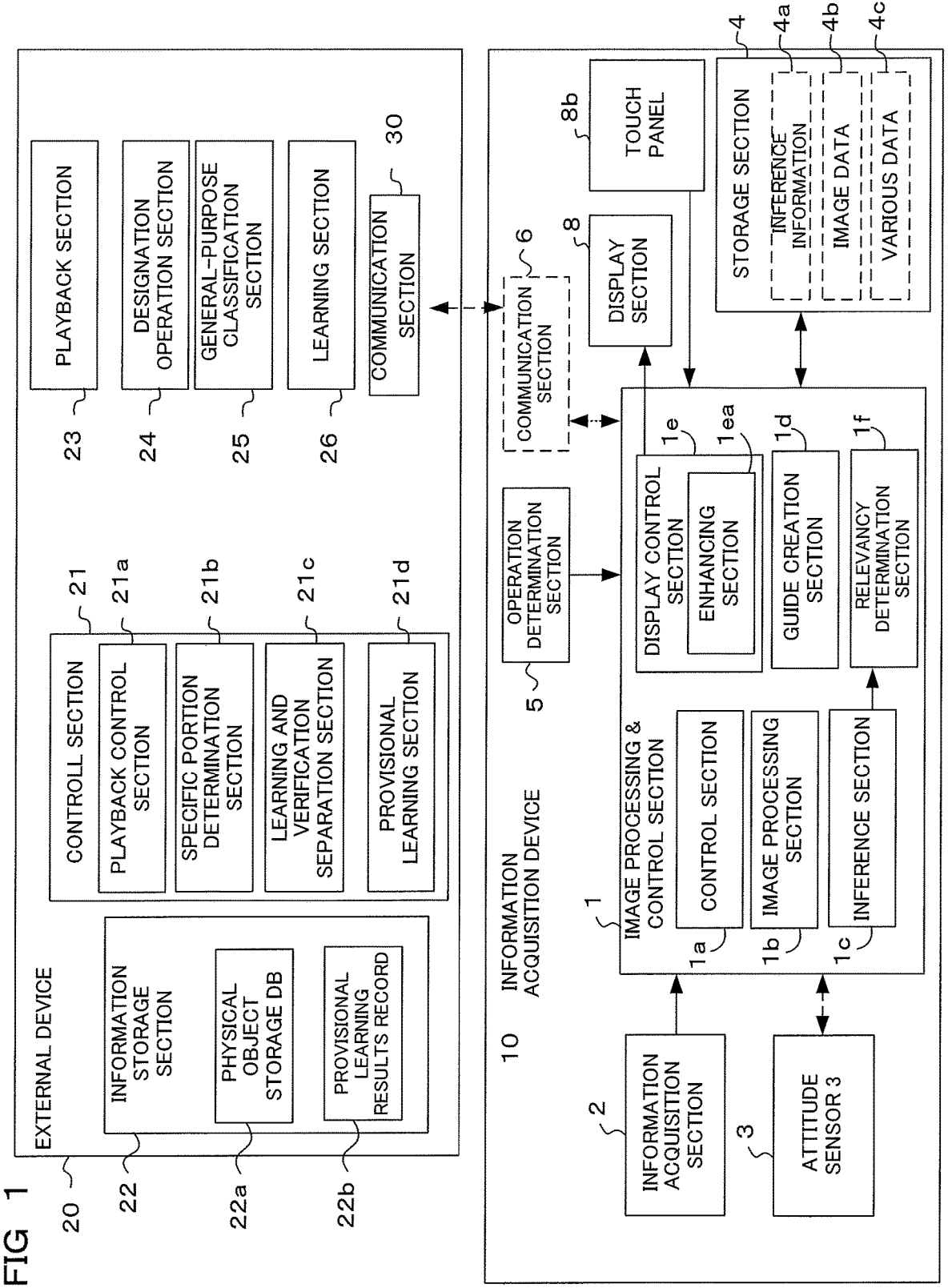
FIG. 1 is a block diagram mainly showing the electrical structure of an imaging system of a first embodiment of the present invention.

FIG. 1 is a block diagram mainly showing the electrical structure of an imaging system of a first embodiment of the present invention. This imaging system comprises an information acquisition device 10 and an external device 20. As the information acquisition device 10 is possible to have a device that is capable of acquiring image information, such as a camera, a smart phone that has an imaging section, a PC (personal computer) that has an imaging section, a tablet that has an imaging section, an endoscope that has an imaging section, a microscope has been fitted with an imaging section etc.

The information acquisition device 10 comprises an image processing and control section 1, information acquisition section 2, attitude sensor 3, memory 4, operation determination section 5, communication section 6, display section 8, and touch panel 8a.

The information acquisition section 2 acquires image data of a physical object. This information acquisition section 2 has an optical system for forming an image of the physical object, an image sensor for converting this optical image to an image signal, and an imaging circuit performing control of the image sensor readout of image signals etc. The imaging circuit further comprises an A/D conversion circuit etc. for amplification processing of image signals and converting to image data. The information acquisition section 2 outputs image data that has been obtained to the image processing and control section 1.

The attitude sensor 3 has a Gyro sensor, acceleration sensor etc. The attitude sensor 3 detects attitude of the information acquisition device 10, and outputs a detection result to the image processing and control section 1. It should be noted that an inclination sensor may be used as the attitude sensor 3, and in this case inclination of the information acquisition device 10 is detected. The attitude sensor 3 may also be an electronic compass, and in this case direction in which the optical system of the information acquisition device 10 is facing is detected, for example. In the case of change to shooting environment or physical object state due to other factors, the sensors may also be provided that capable of detecting that change in environment. It is also possible to provide sensors to detect state and position of the physical object, order to detect a positional relationship between photographic equipment and the physical object, and sensors that can detect distance, color, and size. It is best to provide these sensors so as to receive signals from separate sensors, associate sensor signals etc.

The memory 4 has an electrically rewritable non-volatile memory, and this memory may be a storage medium that can be attached to the information acquisition device 10, and may be a semiconductor memory or hard disc etc, that is fixed to the information acquisition device 10. The memory 4 stores inference information 4a, image data 4b, various data 4c etc. The inference information 4a is inference information such as an inference model that has been created by performing deep learning by a learning section within the external device 20. The image data 4b is image data that is acquired by the information acquisition section 2, and that has been subjected to image processing by the image processing and control section 1. The various data 4c is various adjustment data etc. for causing operation of the information acquisition device 10.

The operation determination section 5 is an interface for the user to supply instructions to the information acquisition device 10, and has operation members such as various operation buttons, an operation dial etc. The operation determination section 5 has a determination circuit for determining operating states of the operation members, and determination results are output to the image processing and control section 1.

The communication section 6 has a communication circuit for performing wired communication and/or wireless communication. The communication section 6 performs transmission and reception with a communication section 30 within the external device 20. By means of the communication section 6, the information acquisition device 10 transmits image data to the external device 20, and receives inference models from the external device 20.

The display section 8 has a display such as a liquid crystal display (LCD) or organic EL. The display section 8 displays a live view image based on image data that has been obtained by the information acquisition section 2, and performs playback display of images based on mage data 4b that has been stored in the image data 4b. Also, the touch panel 8b is provided on the display surface of the display section 8. The touch panel 8b detects a touch operation by the user, and results of this detection are output to the image processing and control section 1.

The image processing and control section 1 comprises a control section 1a, image processing section 1b, inference section 1c, guide creation section 1d, display control section 1e, and relevancy determination section 1f. The image processing and control section 1 is a processor, and may be constructed using an ASIC (Application Specific Integrated Circuit). The control section 1a has a CPU (Central Processor Unit), and performs overall control by controlling each section within the information acquisition device 10 in accordance with programs stored in the memory 4 or a memory within the image processing and control section 1.

The image processing section 1b has an image processing circuit, and performs various image processing on image data that has been acquired by the information acquisition section 2. As various image processing there are, for example, noise processing, WB gain correction, edge enhancement, false color correction etc. Also, the image processing section 1b subjects image data that has been acquired by the information acquisition section 2 to image processing suitable for a live view image of the display section 8, and image processing suitable for when storing in the memory 4.

The inference section 1c may have an inference engine that has been constructed in hardware, and may be realized by inference processing using software using a processor such as a CPU. The inference section 1c is input with an inference model that has been generated in a learning section 26 of the external device 20, and sets weights and connection strengths of a neural network. Also, the inference section 1c is input with image data that has been acquired by the information acquisition section 2, and performs inference using an inference model install In a case where the information acquisition device 10 is an endoscope, for example, the inference section 1c infers position of an affected part and symptoms of an affected part, etc. The inference section 1c outputs this inference result to the relevancy determination section 1f for determining time series relevancy of anteroposterior images, and after the determination is made the inference results are then output to the guide creation section 1d. The guide creation section 1d gives the operator guidance such as position and symptom of the affected part on the display section 8. In performing this guiding, the relevancy determination section 1f determines time series change of images, and for example, if position of an affected part has been passed, the guide creation section 1d outputs guidance so as to return to the observation position. It should be noted that in a case where a guide is created without determining the time series nature of images, the relevancy determination section 1f may be omitted.

The display control section 1e has a display control circuit, and performs control of display on the display section 8. For example, physical objects that have been acquired by the information acquisition section 2 are subjected to live view display, and images being stored in the memory 4 are subjected to playback display. In the case of performing guidance display, an enhancing section 1ea performs control to perform display that enhances a location where it is particularly desired to draw the user's attention to.

The external device 20 comprises a control section 21, information storage section 22, playback section 23, designation operation section 24, general-purpose classification section 25, learning section 26, and communication section 30. The external device 20 may be a stand-alone device such as a personal computer (PC), and may also be a server that is connected to the Internet. In the case of a standalone device such as a PC, image data may be input from a USB memory or the like without going through the communication section. Also, in a case where the external device 20 is a server that is connected to the Internet, a playback section 23 and designation operation section 24, which will be described later, are provided in an information processing device such as a personal computer that the user is capable of operating, and this information processing device on the server can be connected by means of the Internet.

A control section 21 is a processor, and may be constructed using an ASIC (Application Specific Integrated Circuit). Also, this control section 21 has a CPU (Central Processing Unit), and performs overall control by controlling each section within the external device 20 in accordance with programs that have been stored in a storage section within the control section 21 or within the external device 20.

The control section 21 is a processor that has a CPU, memory, and peripheral circuits etc. This control section 21 comprises a playback control section 21a, a specific portion determination section 21b, a learning and verification separation section 21c, and a provisional learning section 21d. Each of these sections may be constructed with hardware circuits, and may be realized by a CPU in accordance with programs. The control section 21 functions as a processor that has the following circuits. These "circuits" are (a) a circuit that acquires operation results of an operation section that designates specific portions within an image that has been displayed on the display (for example, FIG. 3A to FIG. 3D, FIG. 4A to FIG. 4E, S15b and S21 in FIG. 5, etc.), (b) a circuit that, in an annotation operation, acquires annotation information for images that have been displayed, based on operation results (for example, FIG. 3A to FIG. 3D, FIG. 4A to FIG. 4E, S15 and S21 in FIG. 5, etc.), and (c) a circuit that, at a point in time when an operation time, a time based on data amount, or data amount, that have been set, have been reached, makes image data for which annotation information has already been acquired into training data, and requests learning, in order to generate an inference model for inferring specific portions from image data, to a learning circuit (refer, for example, to S17 and S19 in FIG. 5).

The playback control section 21a has a display control circuit etc., and perform successive playback of physical objects (images) to which a plurality of annotations have been granted, individually on the playback section 23. Specifically, images that are stored in a physical object storage DB 22a are successively read out, and these images are subjected to playback display on a display monitor of the playback section 23. It should be noted that besides successive readout and display, the playback display of images may also be display of a plurality of images side by side. The playback control section 21a has a playback control circuit, and playback control of images may be performed by this playback control circuit. The playback control section 21a functions as a display control circuit (display control section) that (1) displays operation time of a series of annotation operations or image data amount of the annotation operations on the display, and (2) performs successive playback display of a plurality of image on the display, based on a plurality of image data that may contain physical objects constituting objects of annotation (refer, for example, to FIG. 3A to FIG. 3D, FIG. 4A to FIG. 4E, and S15 and S21 in FIG. 5, etc.).

The specific portion determination section 21b determines specific portions that have been designated by the operator of the external device 20. If playback display of physical object images has been caused in the playback section 23 by the playback control section 21a, the operator designates specific portions by operating the designation operation section 24 (refer, for example, to FIG. 3A to FIG. 3D, FIG. 4A to FIG. 4E, and S15 in FIG. 5, etc.). The specific portion determination section 21b recognizes the specific portions that have been designated, and stores the specific portions in association with image data of images that have been subjected to playback display. The specific portions constitute annotation information. As specific portions, in the case of endoscope images, for example, there is the range of an affected part etc.

The learning and verification separation section 21c divides images that have been given annotation information into images that will be used at the time of deep learning, and images that will be used at the time of verification of inference model reliability. Specifically, images that have been given annotation information can be used as training data. This training data can be used in deep learning at the time of generating an inference model, and can be used in verification of reliability of an inference model. Since training data that has been used at the time of inference model generation cannot be used in verification of reliability, the learning and verification separation section 21c determines whether images that have been given annotation information will be used at the time of deep learning at the time of verification of reliability (refer, for example, to S17 in FIG. 5).

If annotation operations to perform designation of specific portions for some images among images that are stored in the physical object storage DB 22a have been completed by the operator of the external device 20, the provisional learning section 21d performs deep learning using images for which the annotation has been completed (training data) (refer, for example, to S19 in FIG. 5). This deep learning is learning for extraction (recognition) of specific portions. An inference model for extracting specific portions is generated by this learning. The inference model that has been generated is stored in the information storage section 22 as a provisional learning results record 22b.

The information storage section 22 is an electrically rewritable non-volatile memory, and stores various data and images etc. The physical object storage DB (database) 22a and the provisional learning results record 22b are stored in the information storage section 22. The physical object storage DB 22a is image data that has been acquired by the information acquisition section 2 and has been transmitted to the external device 20 by means of the communication section 6. It should be noted that this physical object storage DB 22a is constructed using image data from many information acquisition devices 10, and may contain image data that is stored on another server etc. As was described previously, the provisional learning results record 22b is an inference model that has been generated by the provisional learning section 21d.

The playback section 23 has a display such as a liquid crystal display (LCD) or an organic EL, and may be attached to the outside of the external device 20. Images are successively displayed on this playback section 23 based on the physical object storage DB that has been stored in the information storage section 22. Images that have been displayed here are subjected to an annotation operation by the operator to give them annotation information, as will be described later (refer, for example, to FIG. 3A to FIG. 3D, FIG. 4A to FIG. 4E, and S15 and S21 in FIG. 5, etc.). Also, regions that have been designated by the designation operation section 24 are displayed.

The playback section 23 functions as a display (playback section) that successively performs playback display individually of a plurality of images that may contain physical objects constituting objects of annotation (refer, for example, to FIG. 3A to FIG. 3D, and FIG. 4A to FIG. 4E, etc.). The playback section 23 also functions as a playback section that successively performs playback display individually of a plurality of images in accordance with general-purpose classification by the classification section (refer, for example, to S14 in FIG. 9).

The designation operation section 24 is a processor that contains an interface for performing operations using a mouse or a touch panel etc., and may be attached to the outside of the external device 20. The designation operation section 24 is used for the operator to designate specific portions for images that have been displayed on the playback section 23. As specific portions there is, for example, a range of an affected part, as was described previously. This designation of specific portions by the designation operation section 24 will be described later using FIG. 3A to FIG. 3D and FIG. 4A to FIG. 4E. Also, operation time or data amount (may also be represented by number of images) etc. for a user (operator) to manually perform annotation can be set by the designation operation section 24 (refer, for example, to S11 in FIG. 5). This operation time or data amount is set at the time of operation commencement, but is not limited to at the time of operation commencement and may be set during operation, and operation time and data amount etc. may also be corrected during operation.

Figure 8A:
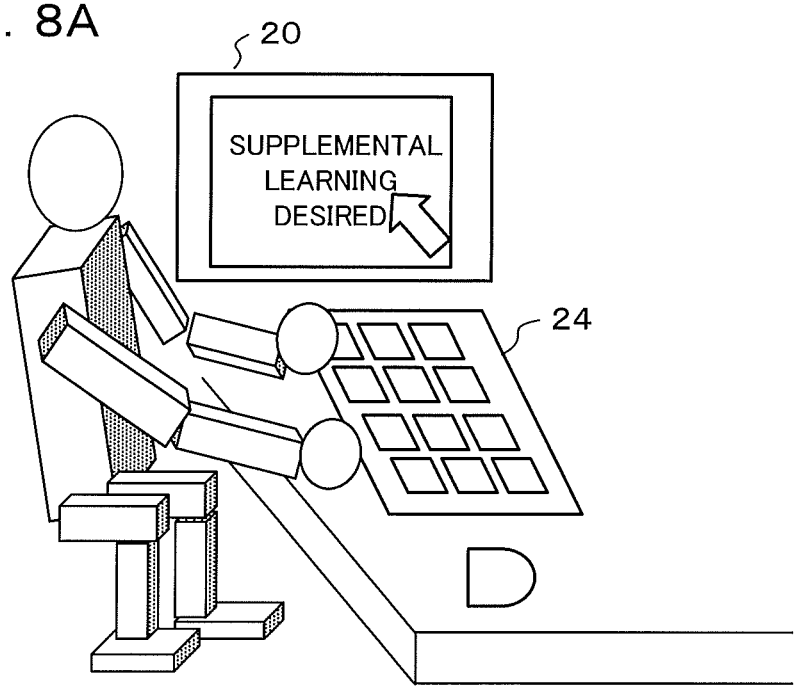
FIG. 8A and FIG. 8B are drawings showing operation states of the first modified example of the annotation operation in the imaging system of the first embodiment of the present invention.
Figure 9:
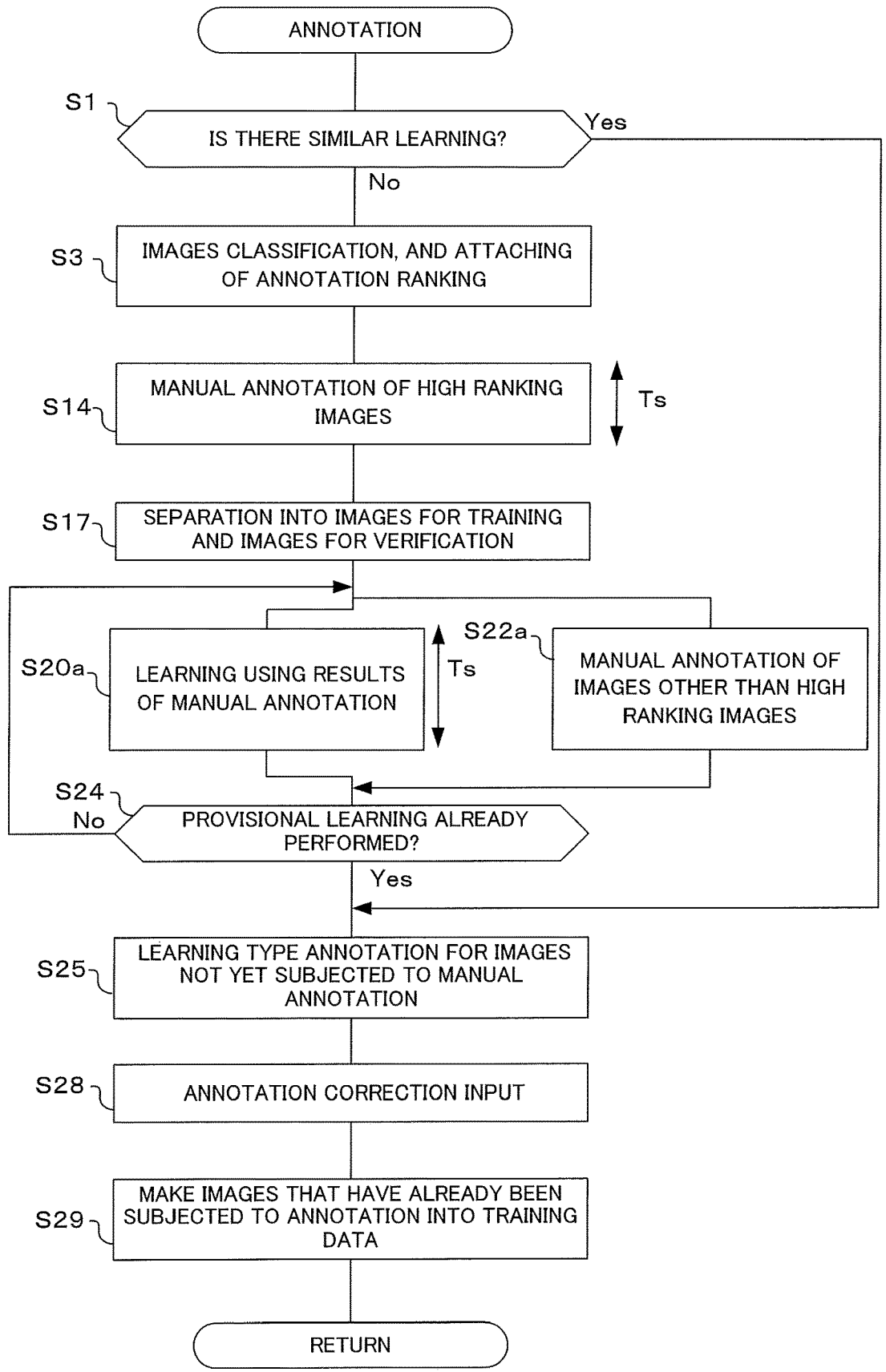
FIG. 9 is a flowchart showing a second modified example of an annotation operation of the imaging system of the first embodiment of the present invention.

The designation operation section 24 functions as a processor (designation section) that designates specific portions of physical objects within images that have been played back by the playback section (refer, for example, to FIG. 3A to FIG. 3D, FIG. 4A to FIG. 4E, S15 and S21 in FIG. 5, S14 and S22a in FIG. 9, etc.). The designation operation section 24 also functions as a processor (setting section) for setting operation time or data amount for designating specific portions (refer, for example, to S11 in FIG. 5, FIG. 6A, S12 in FIG. 7, FIG. 8A etc.). It should be noted that designation of specific portions in this embodiment is initially performed by manual operation by the user, but annotation may also be automatically designated from the start. In this case, time or operation amount for processing is automatically designated, and results of this annotation processing may be verified by the user. As a method for automatically designating annotation, the appending of annotation of the second embodiment, which will be described later, may be utilized. Input of who will perform operations for annotation may be performed at the time of displaying operation time for a series of annotation operations, or image data amount for annotation operations, on the display (refer, for example, to S11 in FIG. 5 S12 in FIG. 7 etc.).

Figure 7:
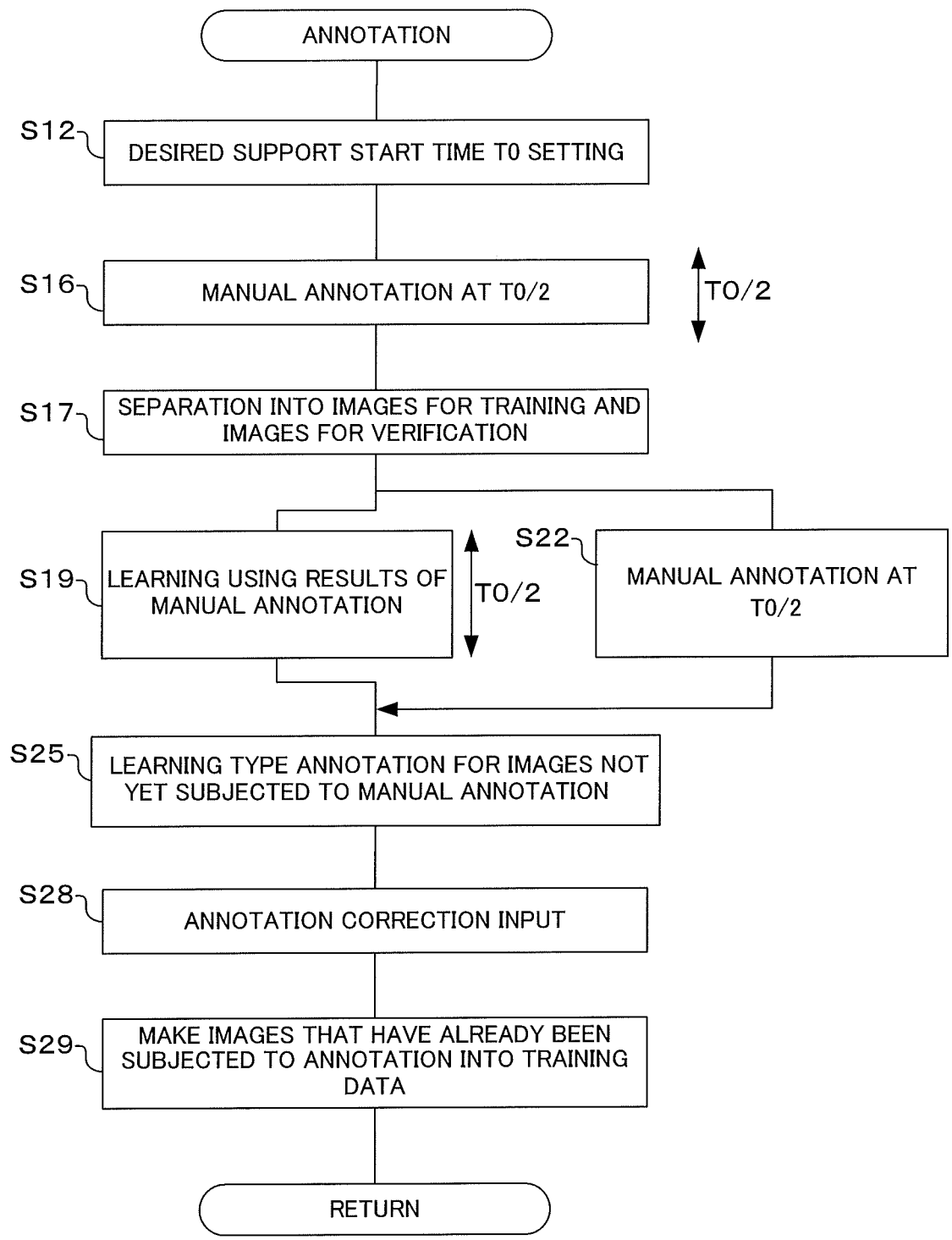
FIG. 7 is a flowchart showing a first modified example of an annotation operation of the imaging system of the first embodiment of the present invention.

Also, concurrently with performing of inference model creation by the learning section, specific portions of physical objects are designated by manual operation for remaining images, among a plurality of images, that have not had specific portions designated by the processor (designation section) (refer, for example, to S19 and S21 in FIG. 5, S20 and S22 in FIG. 7, and S20a and S22a in FIG. 9). Allocation of time for designating specific portions by manual operation and time for creating an inference model is performed in accordance with operation time or data amount that has been set in the setting section (refer, for example, to S15, S21 and T0 of S27 in FIG. 5, S16 and T0/2 of S22 in FIG. 7, etc.).

The general-purpose classification section 25 classifies images within the physical object storage DB 22a based on image patterns such as image brightness, tone and hue, and focus state etc. The operator of the external device 20 performing annotation operations (operations to perform designation of specific portions) for all images of the physical object storage DB 22a will take an enormous amount of time. Therefore, if an inference model that has been generated by the provisional learning section 21d is utilized for some of those annotation operations, the time for all annotation operations can be shortened. In this case, if images that are difficult for deep learning to deal with in generating an inference model are selected by the operator as images on which to perform annotation operations, it is possible to improve reliability of the inference model. It is also possible to improve reliability of the inference model by varying images for which annotation operations are performed.

It should be noted that publicly known data may also be used as training data. This may be, for example, data that is being distributed for research by an organization that handles specific images, data being sold by an evaluator, data of images that are easily available through image search engine services, etc. Since these data are available as a set number of images, annotation may be performed using these collections. Since specification such as "a set number of images" is known, then instead of performing designation such as "duration of operation", this parameter can also be input as specification information at the time of annotation. Obviously manually inputting this data amount and estimating operation amount will achieve the same effect. Distribution of time for the designating specific portions within images by manual operation, and time for creating an inference model by learning, may be determined from the time taken for annotation of a single image.

The general-purpose classification section 25 performs pattern classification for images using brightness, tone and hue, image contrast etc. For example, an image may be classified as bright or dark, in focus or out of focus, having a reddish tint or having a bluish tint etc. Classification may also be performed by a person in charge of manual annotation. Further, at the time of this classification, a specified number of images may also be selected by classifying into classes by characteristics of the images, and having a number of classes ×10 in each class. It is also possible to perform ranking of annotation operations, and to perform annotation operations from images with the highest priority (refer, for example, to S3 and S14 in FIG. 9).

The general-purpose classification section 25 functions as a classification section that classifies the plurality of images in accordance with general-purpose image class classifications, and selects images, in which to designate specific portions using a manual operation, in accordance with classification (refer, for example, to S3 and S14 in FIG. 9). The classification section also designates a priority ranking of images at the time of designation of specific portions by manual operation (refer, for example, to S3 and S14 in FIG. 9). The general-purpose classification section 25 also functions as a classification section that classifies a plurality of images that may contain physical objects that could be objects of annotation, in accordance with general-purpose classification (refer, for example, to S3 and S14 in FIG. 9).

The learning section 26 may have an inference engine that has been constructed in hardware, and may be an inference engine that is realized by inference processing using software using a processor such as a CPU. The learning section 26 performs deep learning using image data that has been given annotation that was created by the annotation information creation section 27, namely training data, and creates an inference model. The inference model that has been created is transmitted to the inference section 1c within the information acquisition device 10 by means of the communication section 30.

The learning section 26 performs deep learning (machine learning) using so-called artificial intelligence (AI). Specifically, the learning section 26 makes images that have been given annotation that was created by the annotation information creation section 27 (training data) a population, and performs deep learning using this training data. Specifically, image data of images with annotation is input to the input layer of a neural network, and weights of intermediate layers are determined so that output results constitute annotation information of training data. These weights (connection strengths) of intermediate layers are output as an inference model. This deep learning will be described later using FIG. 2A and FIG. 2B.

It should be noted that with this embodiment, the learning section 26 and the provisional learning section 21d are arranged separately. However, since deep learning is performed in both, the learning section 26 may also fulfill the role of the provisional learning section 21d, and conversely the provisional learning section 21d may also fulfill the role of the learning section 26. Also, although the provisional learning section 21d has been arranged within the control section 21, this is not limiting, and the provisional learning section 21d may also be arranged externally to the control section 21. It is also possible to arrange the learning section 26 within the control section 21.

The learning section 26 (or provisional learning section 21d) functions as an inference engine (learning section) that creates an inference model by learning using a relationship between physical objects and specific portions, when designation of specific portions by a designation section has been completed for a time or data amount (or number of images) that was based on an operation time or data amount (or number of images) that has been set by a setting section, and there is change to different images, among a plurality of images, in order to designate the specific portions by manual operation, as training data (refer, for example, to S19 in FIG. 5, S19 in FIG. 7 and S20a in FIG. 9). Also, after having created an inference model using the inference engine (learning section), specific portions are designated utilizing inference by the inference engine for remaining images among the plurality of images (further, for example, to FIG. 5, FIG. 7, and S25 in FIG. 9).

Also, the learning section 26 functions as an inference engine (learning section) that, when there is change to different images, among the plurality of images, in order to designated specific portions by manual operation, separates into an image set for learning and an image set for correct solution, creates an inference model by learning using a relationship between physical objects and specific portions of the image set for learning as training data, and verifies the inference model with the image set for correct solution (refer, for example, to S17, S19 and S23 in FIG. 5).

The communication section 30 has a communication circuit for performing wired communication and/or wireless communication. The communication section 30 performs transmission and reception with the communication section 6 within the information acquisition device 10. By means of the communication section 30, image data is received from the information acquisition device 10, and the external device 20 transmits inference models to the information acquisition device 10.

Next, deep learning will be described. "Deep Learning" involves making processes of "machine learning" using a neural network into a multilayer structure. This can be exemplified by a "feedforward neural network" that performs determination by feeding information forward. The simplest example of a feedforward neural network should have three layers, namely an input layer constituted by neurons numbering N1, an intermediate later constituted by neurons numbering N2 provided as a parameter, and an output later constituted by neurons numbering N3 corresponding to a number of classes to be determined. Each of the neurons of the input layer and intermediate layer, and of the intermediate layer and the output layer, are respectively connected with a connection weight, and the intermediate layer and the output layer can easily form a logic gate by having a bias value added.

While a neural network may have three layers if simple determination is performed, by increasing the number of intermediate layer it becomes possible to also learn ways of combining a plurality of feature weights in processes of machine learning. In recent years, neural networks of from 9 layers to 15 layers have become practical from the perspective of time taken for learning, determination accuracy, and energy consumption. Also, processing called "convolution" is performed to reduce image feature amount, and it is possible to utilize a "convolution type neural network" that operates with minimal processing and has strong pattern recognition. It is also possible to utilize a "Recurrent Neural Network" (Fully Connected Recurrent Neural Network) that handles more complicated information, and with which information flows bidirectionally in response to information analysis that changes implication depending on order and sequence.

In order to realize these techniques, it is possible to use conventional general purpose computational processing circuits, such as a CPU or FPGA (Field Programmable Gate Array). However, this is not limiting, and since a lot of processing of a neural network is matrix multiplication, it is also possible to use a processor called a GPU (Graphic Processing Unit) or a Tensor Processing Unit (TPU) that are specific to matrix calculations. In recent years a "neural network processing unit (NPU) for this type of artificial intelligence (AI) of dedicated hardware has been designed to be capable of being integratedly incorporated together with other circuits such as a CPU, and there are also cases where such a neural network processing unit constitutes a part of processing circuits.

Besides this, as methods for machine learning there are, for example, methods called support vector machines, and support vector regression. Learning here is also to calculate discrimination circuit weights, filter coefficients, and offsets, and besides this, there is also a method that uses logistic regression processing. In a case where something is determined in a machine, it is necessary for a human being to teach the machine how determination is made. With this embodiment, a method of deriving determination of an image by using machine learning is adopted, and besides this may also use a rule-based method that accommodates rules that a human being has experimentally and heuristically acquired.

Next, training data for performing deep learning in the learning section 26 within the external device 20, the deep learning performed by the learning section 26, will be described using FIG. 2A and FIG. 2B.

Figure 2B:
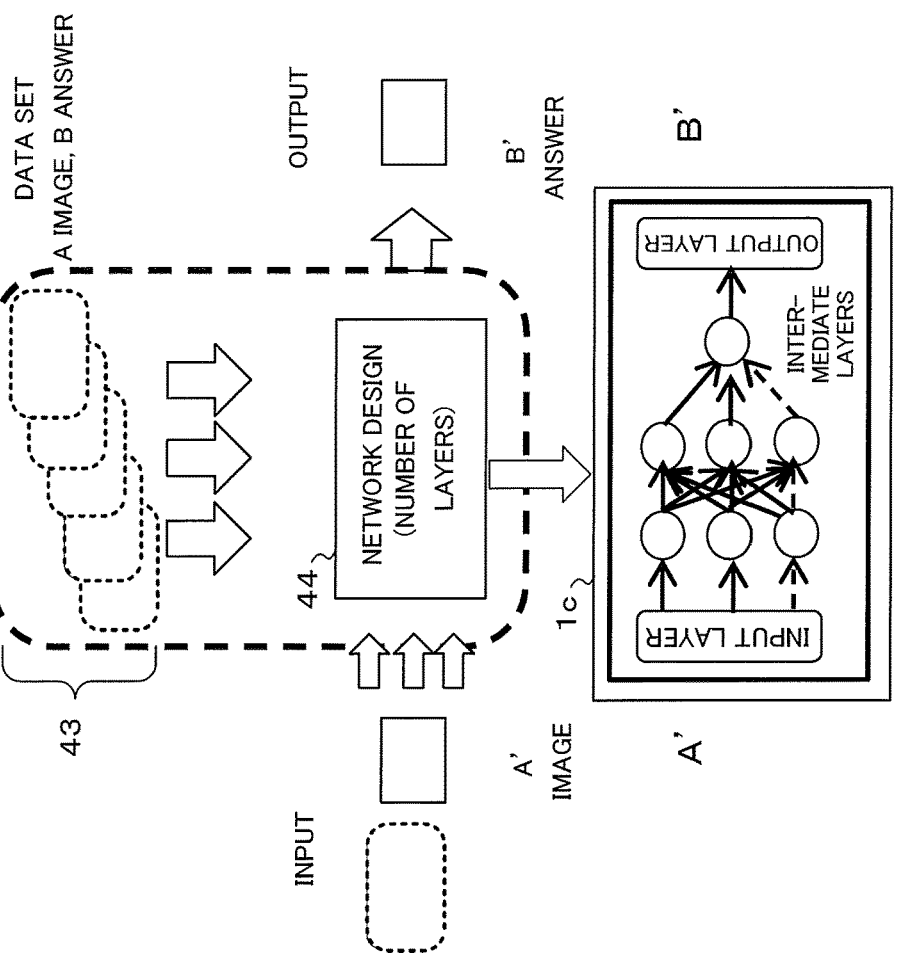
FIG. 2A and FIG. 2B are block diagrams showing generation of training data, and inference that is performed using an inference model that has been created using the training data, in the imaging system of the first embodiment of the present invention
Figure 2A:
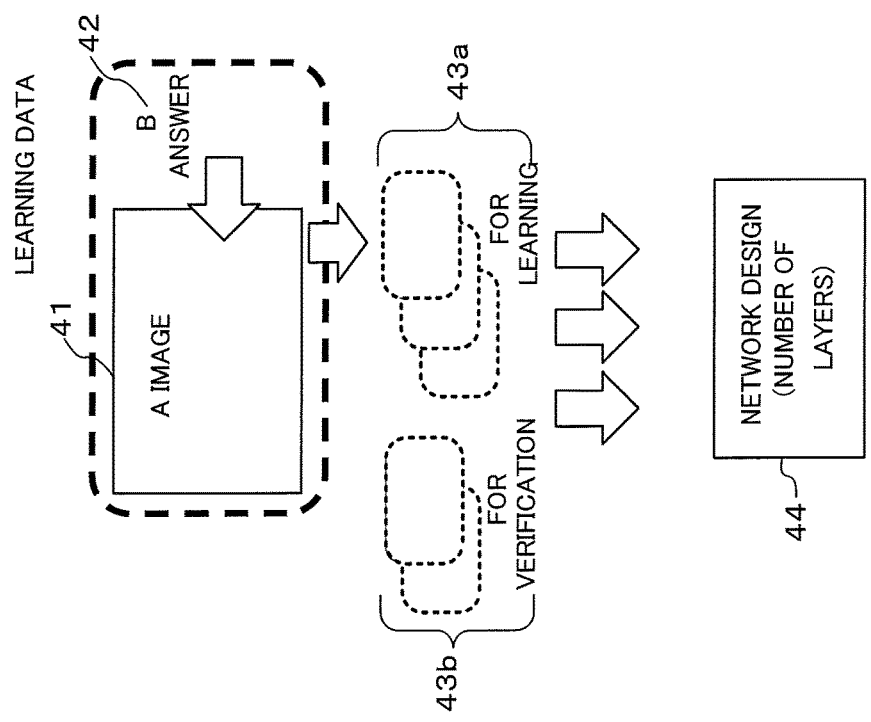

FIG. 2A shows deep learning performed by the learning section 26. The A image 41 is an image that has been acquired by the information acquisition section 2. The B solution 42 is annotation information that has been generated by an annotation creation section 27. The image group for learning 43a is an image group (training data) that has been given annotation information. Using this image group (training data), deep learning is performed in the neural network (design of network) 44 within the learning section 26. The image group for verification 43b is an image group that has been given annotation information the same as the image group for learning 43a, but is not used in deep learning and is used instead in verification of reliability of an inference model that has been generated by deep learning.

FIG. 2B is a drawing for describing deep learning that is performed by the learning section 26 and inference that is performed by the inference section 1c. Images within the image group 43 are input to the input layer of the neural network 44, and solutions (annotation information) within the image group 43 are supplied to the output layer. Then, connection strengths and weights of neurons of each layer of the intermediate layer (neural network 44) are determined so that each output matches each input. The connection strengths and weights of the intermediate layer constitute an inference model. An inference model (strengths and weights of the intermediate layer) that has been generated by the learning section 26 is stored in the inference section 1c, and used at the time of inference.

The deep learning shown in FIG. 2A and FIG. 2B is performed in the learning section 26 within the external device 20, but deep learning is also performed in the provisional learning section 21d within the control section 21. Deep learning that is performed in the provisional learning section 21d generates an inference model for designating and extracting specific portions of a physical object (refer, for example, to S19 in FIG. 5).

Figure 3A:
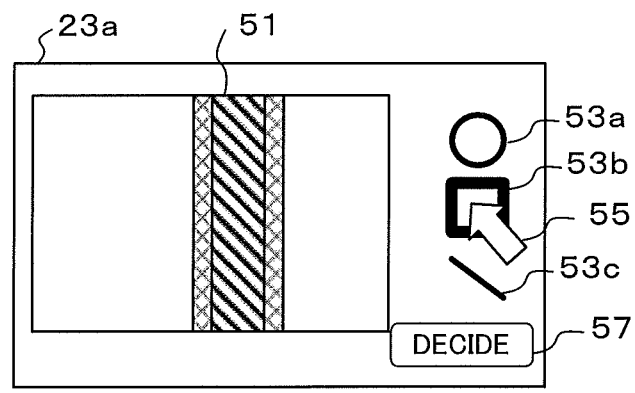
FIG. 3A to FIG. 3D are drawings showing one example of an annotation operation in the imaging system of the first embodiment of the present invention.

Next, an example of an annotation operation performed by an operator of the external device 20 will be described using FIG. 3A to FIG. 3D. FIG. 3A shows appearance of an image, that has been read out from the physical object storage DB 22a, being displayed on the display screen 23a of the playback section 23. The operator performs operations to designate a range of a physical object 51 that has been displayed on the display screen 23a as a specific portion, using a cursor 55. First, the operator selects a shape that is appropriate to the specific portion of the physical object 51 from among shapes for designation 53a to 53c that have been displayed on the right side of the display screen 23a. With the example shown in FIG. 3A to FIG. 3D, since the specific portion is square, the operator selects a square shape for designation 53b. This selection is performed using the designation operation section 24.

Figure 3B:
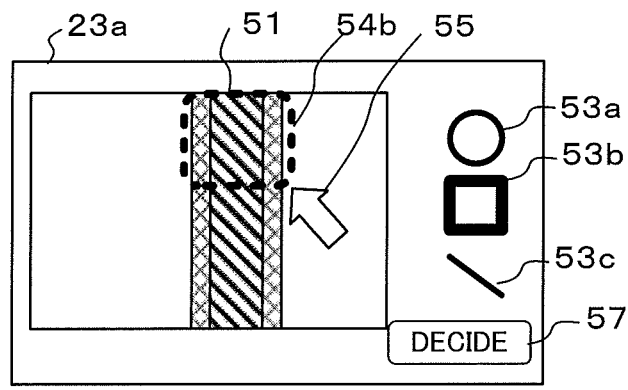
Figure 3C:
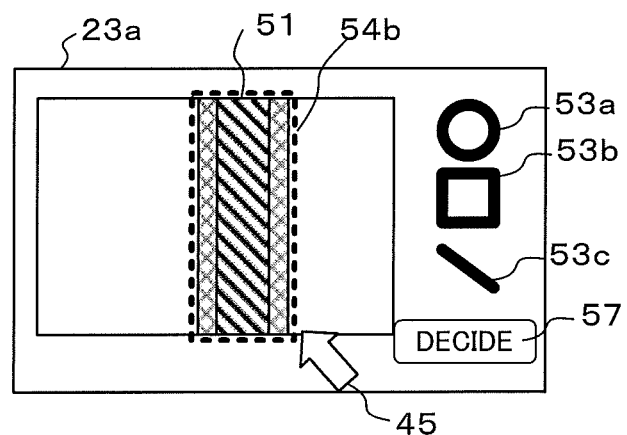
Figure 3D:
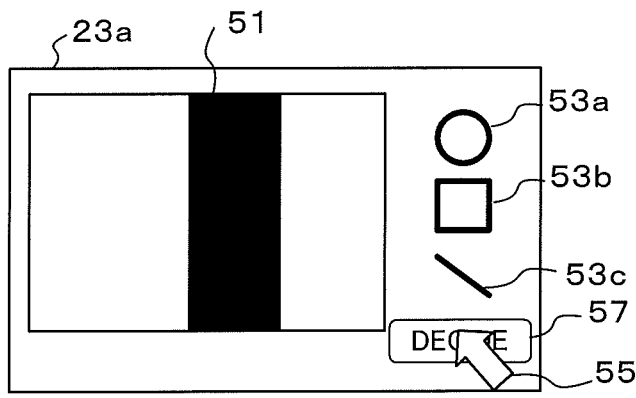

If a shape for designation 53b is selected in FIG. 3A, then the operator moves the shape for designation 54b to the position of the physical object 51 by operating the designation operation section 24, as shown in FIG. 3B. Then, as shown in FIG. 3C, the shape for designation 54b is widened so as to cover all of the physical object 51, by dragging a corner of the shape for designation 54b downwards. In this state the operator selects a "finished" icon that is displayed at the lower right of the display screen 23a. As a result of this selection the range of the physical object 51 can be fixed as a specified range, as shown in FIG. 3D.

Next, another example of an annotation operation performed by an operator of the external device 20 will be described using FIG. 4A to FIG. 4E. With the annotation operation example that was shown in FIG. 3A to FIG. 3D, the shapes themselves of the shapes for designation 53a to 52c were not changed, and only their size was changed. With the annotation operation example shown in FIG. 4A to FIG. 4E, it is possible to reshape the shapes themselves of the shapes for designation 53a to 53c.

Figure 4A:
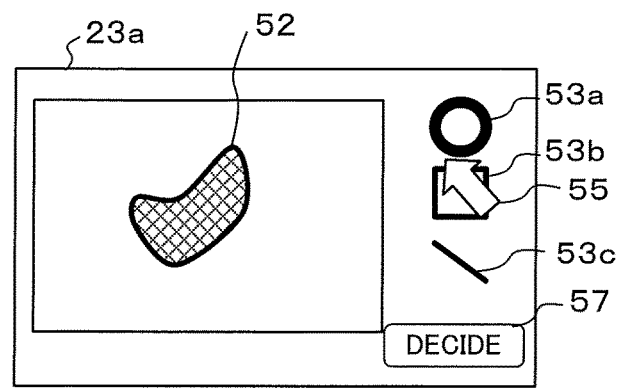
FIG. 4A to FIG. 4E are drawings showing another example of an annotation operation in the imaging system of the first embodiment of the present invention.

In FIG. 4A also, an image, that has been read out from the physical object storage DB 22a, is displayed on the display screen 23a of the playback section 23. In order for the operator to designate a range of the physical object 52 that has been displayed on the display screen 23a as a specific portion, first, a shape that is appropriate to the specific portion of the physical object 52 is selected from shapes for designation 53a to 53c that have been displayed on the right side of the display screen 23a. With the example shown in FIG. 4A, since the specific portion is a bean shape, the operator selects a circular shape for designation 53a using the designation operation section 24.

Figure 4B:
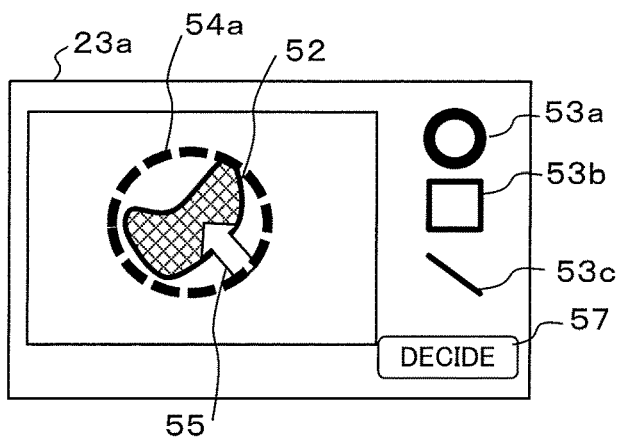

If a shape for designation 53a is selected in FIG. 4A, the operator moves the shape for designation 54a to the position of the physical object 52 by operating the designation operation section 24, as shown in FIG. 4B. In the state shown in FIG. 4B, since there is a gap between the shape for designation 54a and the physical object 52, the shape for designation 54a is deformed so that the shape of the shape for designation 54a becomes close to the shape of the physical object 52.

It should be noted that although the designated shape 54a is a circle in FIG. 4B, it may also be changed in accordance with the shape of the physical object. A database in which relationships between physical objects and shapes for designation (icons) have been associated may be provided in the information storage section 22 of FIG. 1 etc., so as to enable this type of change. Also, in order to determine a physical object, not only image data, but also supplementary information and associated sensor information may also be referenced. As a simple example, images that are lined up vertically and horizontally are comparatively easy to consider, and there is also a method that utilizes technology such as a digital camera that performs length and breadth composition determination using gravity information etc. In particular, in a case where the shape for designation is not a circle, this type of information is useful.

For example, in the example shown in FIG. 3A to FIG. 3D, for columns that were extended vertically etc. against gravity, the shape for designation 54b becomes a rectangle. In this case, if the rectangle is inclined or the like, a manual operation to correct that tilt is input, and obviously that operation will take time. Conversely with a tumor or lesion, due to their category of shape, which is swollen or ulcerated, they will hardly ever be a rectangle, and it would be preferable to designate a circle for their shape.

Also, distance information of the physical object and an imaging section is useful for adjusting size etc. Since an object appears large if distance is close and small if distance is far, when determining radius and diameter of a circular icon of a shape for designation, if there is distance information, focal length information of photographing equipment, image sensor size information, and effective region information within the image sensor this information is useful, and shape for designation icons of higher precision can be displayed. If radius is made to coincide using this shape for designation icon, a process to adjust size is done away with and it becomes possible to simplify steps for adjusting size etc. of a shape for designation.

It should be noted, regarding this type of equipment information, that information stored in the various data storage section 4c within the information acquisition device shown in FIG. 1 may also be used. Also, information for inputting change at the time of shooting may also use output of the operation determination section 5, or output of an encoder or the like for various actuator control, that is not illustrated. Numerical values that have been obtained by integrating these items of information they also be used. This type of information as sensor information will be described later.

Figure 4C:
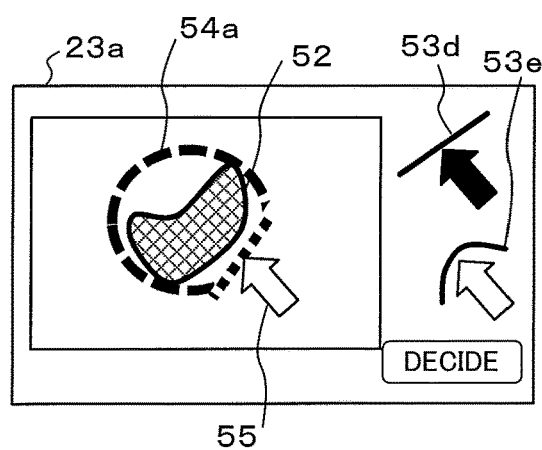
Figure 4D:
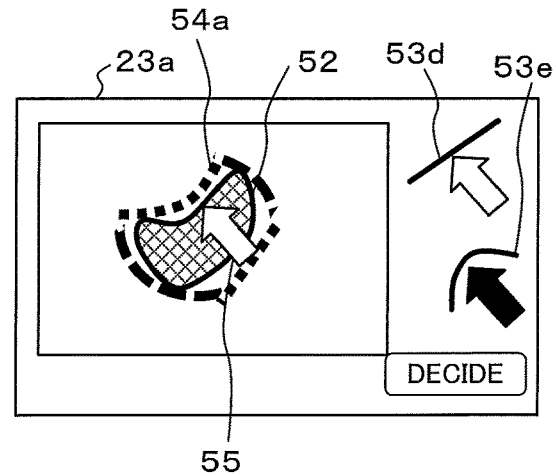
Figure 4E:
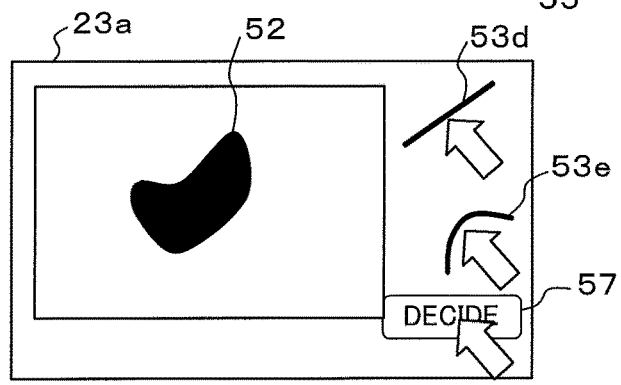

Returning to adjustment of a shape for designation, first, diameter of a circular shape for designation 54a is adjusted using a cursor 55. An icon 53a for correction of concave areas is then selected, and an operation is performed so as to push in from an outer side of the circular shape for designation 54a, as shown in FIG. 4C. An operation is also performed to pull in from an inner side of the circular shape for designation 54a, as shown in FIG. 4D. It should be noted that the icon 53d is an icon for linear correction. By operating the correction icons 53d and 53e, it is possible to fix a range of the physical object 52 as a specified range, as shown in FIG. 4E. In this state the operator selects a "finished" icon that is displayed at the lower right of the display screen 23a. As a result of this selection the range of the physical object 52 can be fixed as a specified range, as shown in FIG. 4E. The annotation operation here is an example that uses a PC and a mouse. However, more simple applications, such as region designation by the operator using their fingers and a touch panel, are also possible in a device that has a touch panel.

In this way, at the time of annotation it is necessary to perform operations made up of various steps, and it is possible to improve operability by replacing some of these steps with AI (artificial intelligence). For example, steps such as selection of candidates to create an initial enclosure shape, selection of size of the enclosure drawing, superimposing of enclosure drawings, etc. may be automated using AI. Workability is increase simply by automating some of these steps, and it is possible to shorten operation time and to further alleviate stress on the operator. Automatically selecting icons such as the icons 53d and 53e shown in FIG. 4C and FIG. 4 from the start also achieves the same effect.

An inference engine of a type that is mounted in an information terminal such as a camera or a portable device is of a compact type that requires high performance while reducing power consumption without reducing the number of layers of a neural network, and differs from an inference engine of a normal type that is mounted in a PC or the like and searches for injuries. With a compact type inference engine loaded in a product, learning for high precision judgment is difficult with only a few layers, and takes time, and so it is preferable to perform accurate annotation. As a result there is more stress than normal on the operator when performing accurate operations for a compact type inference engine.

Next, annotation operation will be described using the flowchart shown in FIG. 5. With this annotation, first the operator of the external device 20 selects specific portions of physical objects 41 and 42 from among images that have been displayed on the playback section 23, and these specific portions are associated with image data as annotation information. If manual annotation is performed for a specified time or if there is processing of a specified number of images using manual annotation, then deep learning for creating an inference model for annotation is performed, and concurrently manual annotation is executed. Once an inference model has been generated, after that annotation is provided by means of inference using the inference model. In the flow shown in FIG. 5, some steps (S15, S21) are performed by the operator, but other steps are realized by a CPU within the control section 21 of the external device 20 controlling each section within the external device 20 in accordance with programs that have been stored in memory.

Figure 6A:
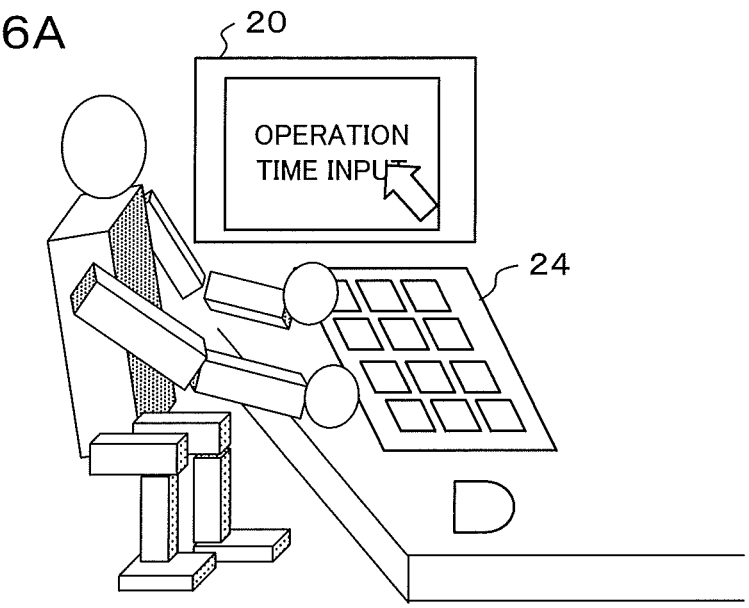
FIG. 6A to FIG. 6C are drawings showing operation states of an annotation operation in the imaging system of the first embodiment of the present invention.

If operation for the annotation shown in FIG. 5 is commenced, first, operation time T is set (S11). In this step, the operator of the external device 20 inputs operation time, as shown in FIG. 6A, by operating the designation operation section 24. It should be noted that instead of operation time a number of images to be operated on may also be input. In the event that operators are specialists such as a physicians, they will be busy, and the operation time is limited to time they can afford to spend on annotation operations for training data creation. In this step S11 therefore, operation time (or number of operational images) can be set in advance. Also, it is conceivable that who has performed annotation operations will become important evaluation criterion at the time of using an inference model later. Therefore input information of the person performing the annotation operation may also be performed in this step, and as required it may also be made possible to guarantee the reliability of the annotation using various biometric sensors and circuits, and algorithms. It is also desirable to link the results here to images that have already been subjected to annotation (particularly those images that have been made into training data), for example, as metadata etc. Specifically, here, the control section 21 (processor) controls steps that perform input of who the person is that performs the annotation operation, and the identity of the operator is displayed together with display of input screens for time setting, or it is made possible to correct who that person is.

If operation time T has been set, next time T0 resulting from dividing operation time T into three is set (S13). As will be described later, with an annotation operation there are three stages, namely manual annotation (refer to S15), simultaneous execution of manual annotation and deep learning (refer to S19 and S21), and annotation using inference (refer to S25). In this step respective times for these three stages are set. It should be noted that in this embodiment T0 is made a time resulting from having divided the operation time T equally into three, but the respective times may be different and not equally divided. Also, the times for steps S19 and S21 need not be the same time.

Next, manual annotation is performed at time T0 (S15). Here, as was described using FIG. 3A to FIG. 3D and FIG. 4A to FIG. 4E, the operator of the external device 20 operates the designation operation section 24 while looking at images that have been displayed on the playback section 23, and designates specific portions of physical objects. As a result of this processing annotation information is given to images.

If time T0 has elapsed from commencement of manual annotation, there is separation into a training image group and a verification image group (S17). As was described using FIG. 2A and FIG. 2B, within images that have been given annotation information some are made a learning image group and the remainder are made a verification image group. This separation may be performed at random, or may be performed automatically based on characteristics of images.

Figure 6B:
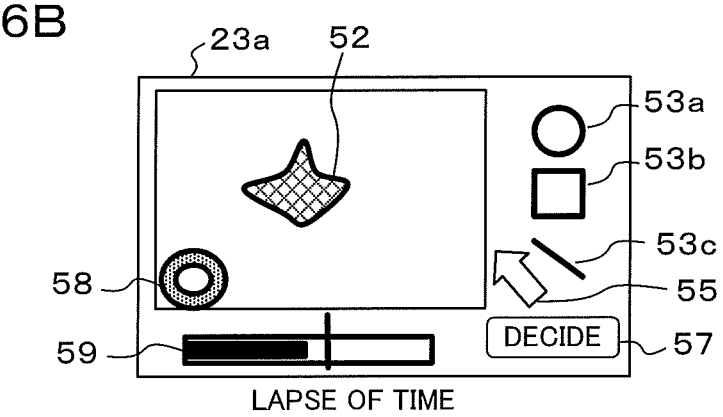

Once there has been separation into the training image group and the verification image group, learning is performed using the results of manual annotation (S19). Annotation information is affixed using manual annotation in step S15, and here deep learning is performed using the image group that was divided as the training image group (training data) in step S17. This deep learning generates an inference model for performing inference to designate (extract) specific portions of physical objects from within images. During learning, a learning in progress mark 58 is displayed, as shown in FIG. 6B.

Concurrently with the learning of step S19, manual annotation is performed at time T0 (S21). Here, as was described using FIG. 3A to FIG. 3D and FIG. 4A to FIG. 4E, similarly to step S15, the operator of the external device 20 operates the designation operation section 24 while looking at images that have been displayed on the playback section 23, and designates specific portions of physical objects. It should be noted that during the operation, elapsed time is displayed on the operation elapsed time display section 59, as shown in FIG. 6B. The operator can know the elapsed time using length of the bar graph of the operation elapsed time display section 59. If the maximum length of the bar graph of this operation elapsed time display section 59 is made to correspond to the operation time T0, it is easy to comprehend the relationship between the operation time T0 elapsed time.

If the learning of step S19 is complete and the manual annotation of time T0 is complete, evaluation results are displayed by points (S23). In step S19 an inference model is created using the training image group. In this step, the verification image group that was separated in step S17 is input to the inference model that was generated as training data, and the reliability of that inference model is calculated. The calculated reliability, for example, 80% (80 points) etc., may be displayed at the lower left etc. of the display screen 23a in FIG. 6C.

Once evaluation results have been displayed, learning type annotation is performed for images that have not been subjected to manual annotation (S25). In steps S15 and S21, annotation information is given to images by manual annotation. In this step, annotation is given to remaining images that were not given annotation information in steps S15 and S21 by inference in the learning section 26 or the provisional learning section 21d using the inference model that was generated in step S19. Learning type annotation is performed using the inference model, and so processing time is an extremely short time (an instant).

Figure 6C:
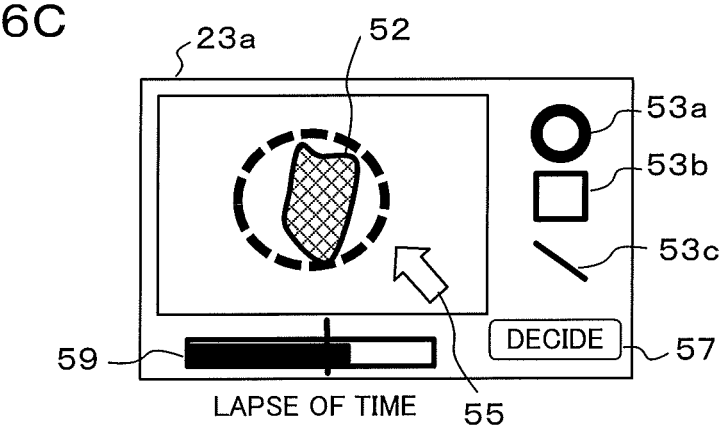

If the learning type annotation has been performed in step S25, annotation correction input is performed (S27). Here, annotation information (namely specific portions of physical objects) resulting from the annotation that was performed in step S25 is displayed as shown in FIG. 6C, based on inference results. The operator looks at this display and changes whether or not annotation information has been given appropriately. In the event that annotation information has not been given appropriately, the designation operation section 24 is operated and correction of the annotation information is performed using shapes for designation 53a to 53c and the cursor 55 etc. The way in which correction is performed is similar to as was shown in FIG. 3A to FIG. 3D, and FIG. 4A to FIG. 4E. Time for this annotation correction is T0, and if operation times of steps S15 and S21, and of step S27, are added up, it results in the operation time T that was set in step S11.

If annotation correction input has been performed in step S27, next images that have been subjected to annotation are made into training data (S29). Here, an image group that was given annotation by manual annotation in steps S15 and S21, or that was given annotation by learning type annotation in steps S25 and S27, is made training data. The learning section 26 performs deep learning using this training data, and it is possible to generate an inference model. Here, "manual" annotation may include a case where an operator "only inputs OK" to candidates that have been automatically displayed for confirmation without performing a manual operation, even when it is possible for the operator to do so.

In this way, in the flow for annotation, if the operator has previously set operation time T (refer to S11), time T0 of manual annotation for a plurality of object image groups (refer to steps S15 and S21), and time T0 for correcting results of learning type annotation, are determined based on this operation time T, and time distribution for annotation is performed in accordance with the set time. As a result it is possible to perform an annotation operation without imposing a burden on specialists such as physicians.

Also, deep learning to provide annotation information is performed using an image group that has been given annotation information by means of respective manual annotation for a plurality of images, and an inference model is generated (refer to S19). Inference to give annotation to an image group that was not subjected to manual annotation is executed using this inference model generated (refer to S25). By performing inference it becomes possible to provide a large amount of annotation information in a short time. The providing of annotation is also performed by manual operation while learning is being performed for inference model generation (refer to S21). In this way, since it is possible to perform two processes concurrently, annotation is performed effectively.

Also, there is separation of a training image group and a verification image group from an image group that has been created by manual annotation (refer to S17), and an inference model for annotation is generated using the training in each group (refer to S19), and reliability of the inference model that has been created is verified using the verification images. As a result it is possible to effectively utilize the image group that has had annotation information granted by manual operation.

Next, a first modified example of the annotation operation that was shown in FIG. 5 will be described using the flowchart shown in FIG. 7. With the example that was shown in FIG. 5, operation time T, which is a total of operation time for manual annotation that is performed in steps S15 and S21, and operation time for annotation correction, was set in advance. With this modified example, time T0 for commencement of support for annotation using learning type annotation is set in advance taking into consideration operation time taken by manual annotation.

Compared to the flowchart of FIG. 5, the flowchart shown in FIG. 7 is the same except that steps S11 to S15 are replaced with steps S12 and S16, and steps S19, S21, S25 and S27 are replaced with steps S20, S22 and S28. Description will therefore concentrate on points of difference.

If operation for the annotation shown in FIG. 7 is commenced, first, desired support start time T0 is set (S12). Here "support" is a time for commencing the learning type annotation of step S25. Manual annotation is performed until desired support start time T0 (S16, S22), and once desired support start time T0 is reached annotation is performed using learning type annotation (S25). Here, the operator of the external device 20 inputs desired support start time, as shown in FIG. 8A, by operating the designation operation section 24. It should be noted that instead of time a number of operation images may also be input.

If the desired support start time T0 has been set, next manual annotation is performed (S16). Here, as was described using FIG. 3A to FIG. 3D and FIG. 4A to FIG. 4E, the operator of the external device 20 operates the designation operation section 24 while looking at images that have been displayed on the playback section 23, and designates specific portions of physical objects. As a result of this processing annotation information is given to images. This manual annotation is performed for a time of T0/2.

Figure 8B:
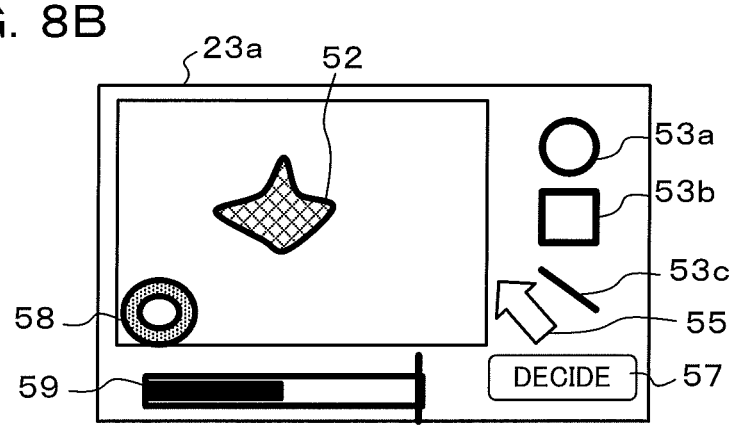

The manual annotation is commenced in step S16, and if the time T0/2 elapses there is separation into a training image group and a verification image group (S17). Once there has been separation into the training image group and the verification image group, learning is performed using the results of manual annotation (S19). Here, deep learning is performed using the image group that was separated as the training image group (training data) in step S17. During learning, a learning in progress mark 58 is displayed, as shown in FIG. 8B. It should be noted that in the flow of FIG. 7, the time for manual annotation learning may be set so that learning is performed for time T0/2.

Concurrently with the learning of step S19, manual annotation is performed for time T0/2 (S22). Here, as was described using FIG. 3A to FIG. 3D and FIG. 4A to FIG. 4E, similarly to step S16, the operator of the external device 20 operates the designation operation section 24 while looking at images that have been displayed on the playback section 23, and designates specific portions of physical objects. It should be noted that during the operation, elapsed time is displayed on the operation elapsed time display section 59, as shown in FIG. 8B. The operator can know the elapsed time using length of the bar graph of the operation elapsed time display section 59. If the maximum length of the bar graph of this operation elapsed time display section 59 is made to correspond to the operation time T0, it is easy to comprehend the relationship between the operation time T0 elapsed time. Also, if the bar graph reaches the right end, the learning type annotation of step S25, namely the supplementary annotation, comes into effect.

If the learning of step S19 is completed, an inference model for annotation information addition is generated. Reliability of the influence model that has been generated may be verified by subjecting the verification image group that was separated in step S17 to this inference model. When performing manual annotation in step S22, verification of reliability is performed, and if that reliability is greater than a specified value the manual annotation may be terminated.

If the learning of step S19 is completed, or if the manual annotation for time T0/2 in step S22 is completed, learning type annotation is performed for images for which manual annotation has not yet been performed (S25).

If the learning type annotation has been performed, annotation correction input is performed (S28). Here, annotation information (namely specific portions of physical objects) resulting from the annotation that was performed in step S25 is displayed as shown in FIG. 8B, based on inference results. The operator looks at this display and changes whether or not annotation information has been given appropriately. Similarly to step S27 in FIG. 5, in the event that annotation information has not been given appropriately, the designation operation section 24 is operated and correction of the annotation information is performed using shapes for designation 53a to 53c and the cursor 55 etc. The way in which correction is performed is similar to as was shown in FIG. 3A to FIG. 3D, and FIG. 4A to FIG. 4E.

If annotation correction input has been performed in step S28, next, images that have been subjected to annotation are made into training data (S29). Here, an image group that was given annotation by manual annotation in steps S16 and S22, or that was given annotation by learning type annotation in steps S19, S25 and S28, is made training data. The learning section 26 performs deep learning using this training data, and it is possible to generate an inference model.

In this way, in the flow for annotation shown in FIG. 7, if the operator sets desired support start time T0 in advance (refer to S12), if the desired support start time T0 elapses after commencement of the annotation operation, annotation is performed using learning type annotation (refer to S25). It is possible to have the operator of the external device 20 perform manual annotation for only this time. For images that have been given annotation information using learning type annotation, annotation correction may be performed, as required. As a result it is possible to perform an annotation operation without imposing a burden on specialists such as physicians.

It should be noted that with this modified example, although the manual annotations of steps S16 and S22 are respectively processed for times T0/2, each time does not need to be a time resulting from dividing T0 equally in two. Times may be unequally divided, as appropriate.

Next, a second modified example of the annotation operation that was shown in FIG. 5 will be described using the flowchart shown in FIG. 9. With this modified example, prior to performing manual annotation, images are classified, and ranking is performed when performing annotation. Ranking at the time of manual annotation is performed in accordance with this classification. It is possible to increase reliability of an inference model for annotation using image classification and ranking.

Compared to the flowchart of FIG. 5, the flowchart shown in FIG. 9 is the same except that steps S1 to S3 are added, and steps S11 to S23 are replaced with steps S14 to S24. Description will therefore concentrate on points of difference.

If the flow for annotation shown in FIG. 9 is commenced, first, it is determined whether or not there similar learning (S1). When giving annotation, it is determined whether or not similar annotation has already been given. In a case where annotation has been given for a similar image group by another specialist such as a physician, it is possible to use the learning type annotation that was performed at that time, even for different affected sites. In this step it is determined whether or not there is learning that can be utilized.

If the result of determination in step S1 is that there is not similar learning, next, images are classified, and a ranking annotation is attached (S3). A classification of images is carried out in a manner such that a given number of images can be displayed at a time for respective classifications. Specifically, when performing manual annotation, if there is bias in image features there may be cases where reliability of an inference model is made high only for specified sections, and for other sections reliability of the inference model becomes low. Then, images are classified, and by selecting an image of each classification it is possible to perform manual annotation for various types of images evenly. Image classification is performed based on image patterns such as image brightness, tone and hue, and focus state etc. Ranking of annotation is also performed. Ranking may be giving a high priority ranking to representative patterns of each classification, or images that are good for learning type annotation.

Figure 10A:
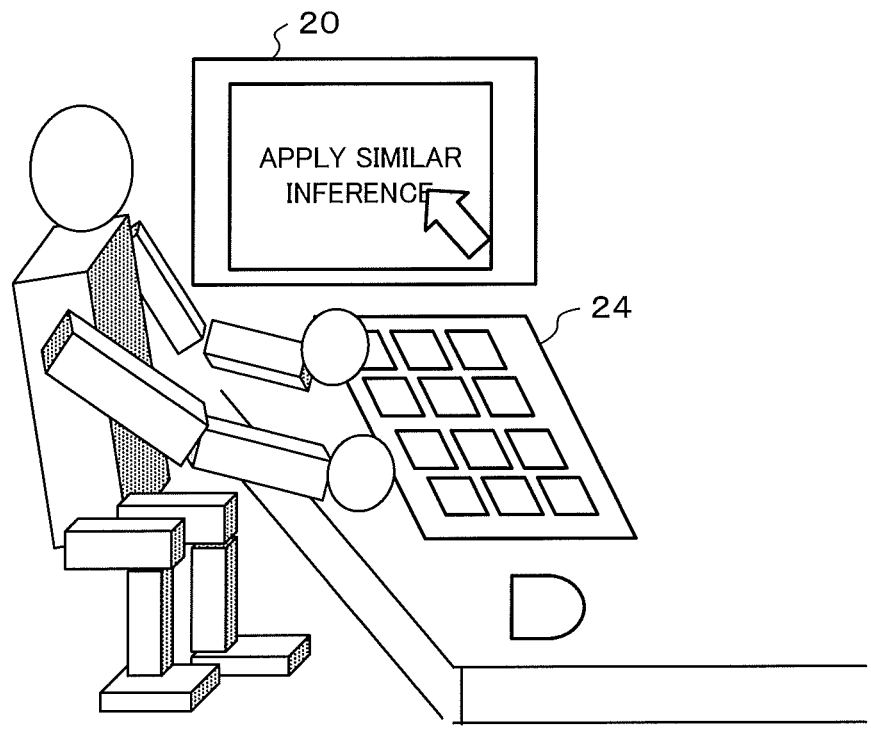
FIG. 10A and FIG. 10B are drawings showing operation states of the second modified example of the annotation operation in the imaging system of the first embodiment of the present invention.
Figure 10B:
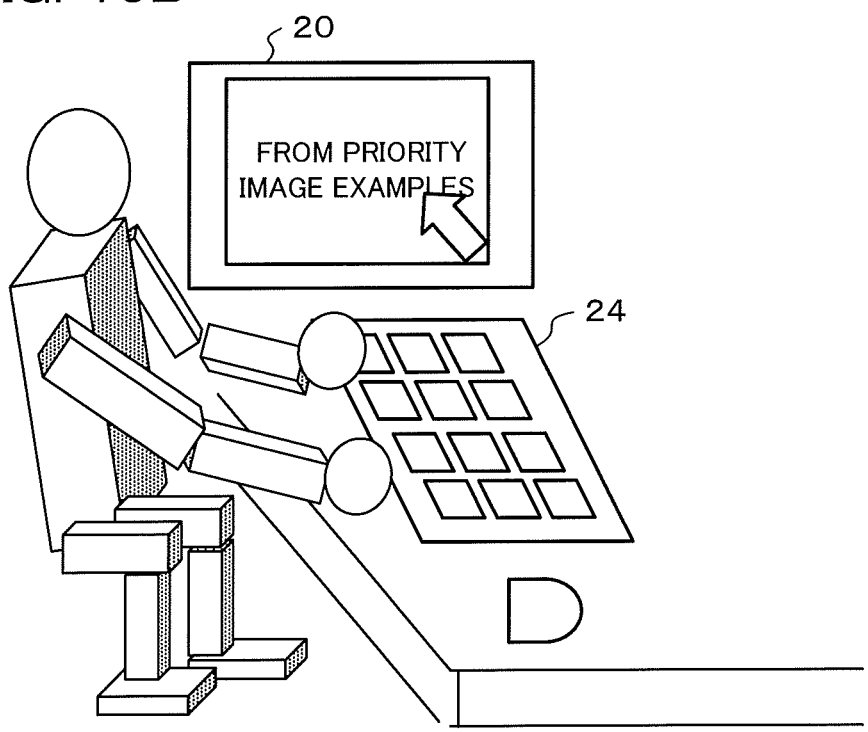

If images have been classified and ranking of annotation performed in step S3, next, high ranking images are subjected to manual annotation (S14). In step S3, since ranking was performed at the time of performing annotation, images are displayed in order from those of a high priority ranking, on the playback section 23, as shown in FIG. 10B. The operator of the external device 20 operates the designation operation section 24 while looking at images that have been displayed on the playback section 23, and designates specific portions of physical objects, as was described using FIG. 3A to FIG. 3D and FIG. 4A to FIG. 4E. As a result of this processing annotation information is given to images. This manual annotation is performed during time Ta.

The manual annotation is commenced in step S16, and if the time Ts elapses there is separation into a training image group and a verification image group (S17). After performing manual annotation for images of high ranking in step S14, images having annotation information that have been acquired are divided into a training image group and a verification image group.

Once there has been separation into the training image group and the verification image group, learning is performed using the results of manual annotation (S20a). Here, deep learning is performed using a training image group (training data), for which annotation information was assigned for images of high-ranking in step S14. It should be noted that in the flow of FIG. 9, the time for deep learning using the results of annotation may be set so that learning is performed for time Ts.

Concurrently with the learning of step S20a, manual annotation is performed for time Ts (S22a). Here, the operator of the external device 20 operates the designation operation section 24 while looking at images that have been displayed on the playback section 23, as was described using FIG. 3A to FIG. 3D and FIG. 4A to FIG. 4E, and designates specific portions of physical objects for images other than images for which manual annotation was performed in step S14, as images of high ranking.

If learning has been performed in step S20a, or if manual annotation has been performed in step S22a, it is next determined whether provisional learning has already been completed (S24). In this step it is determined whether or not the learning of step S20a has been completed. This determination is determination as to whether learning has been completed for all of the image groups that were separated in step S17. However, even if learning has not been completed for all of the learning image groups, if learning has been completed for a fixed number of image groups it may be determined that learning has been completed, and if it is possible to verify that reliability is greater than a specified level using verification image groups, it may be determined that learning is complete. If the result of this determination is that the provisional learning has not been completed, processing returns to steps S20a and S22a.

On the other hand, if the result of determination in step S24 is that provisional learning has been completed, or if a result of determination in step S1 is that there is similar learning, learning type annotation is performed for images that have not already been subjected to manual annotation (S25). Here, learning type annotation is performed using an inference model for annotation that was created in step S20a, or, if the result of detection in step S1 was that there was similar learning, an inference model for annotation that was created using this similar learning. Next, annotation correction input is performed (S28), and images that have already been subjected to annotation are made into training data (S29). Once training data has been created, this flow for annotation is terminated.

In this way, in the flow for annotation shown in FIG. 9, images are classified before performing manual annotation (refer to S3). Based on this classification, manual annotation is performed for images that are uniformly rich in variety by selecting an image for each classification. As a result it is possible to improve the reliability of an inference model for annotation. A ranking is also provided for images for which manual annotation is performed (refer to S3). Manual annotation is performed in accordance with this ranking (refer to S14). As a result it is possible to perform manual annotation that is efficient and has high reliability even if there is not a lot of time for manual annotation.

As has been described above, in the first embodiment and modified examples of the present invention, operation time or data amount for designating specific portions of physical objects that may constitute subjects of annotation are set (refer, for example, to S11 in FIG. 5), a plurality of images that may contain physical objects are successively played back in accordance with the operation time or data amount that has been set, annotation to designate specific portions of the physical objects within the images that are being played back is performed (refer, for example, to S15 and S21 in FIG. 5), and creation of an inference model using learning that uses a relationship between the physical objects and specific portions that were acquired in the annotation as training data is requested to a learning device (S19). As a result it is possible to perform an annotation operation without imposing a burden on the operator. Specifically, it is possible for the operator to perform operations for an operation time or data amount that has been determined in advance, and an inference model for annotation is generated based on annotation information that has been obtained as a result of this operation.

Also, with the first embodiment and modified examples of the present invention, operation time or data amount (or number of images) for designating specific portions of physical object that may constitute subjects of annotation is set by manual operation (refer, for example, to S11 in FIG. 5), a plurality of images that may contain physical objects are individually successively played back in accordance with the operation time or data amount (or number of images) that has been set, first manual annotation for designating specific portions of the physical objects within images that have been played back is performed (refer, for example, to S15 in FIG. 5), after the first manual annotation has been completed second annotation for designating specific portions among a plurality of images in accordance with the set operation time or data amount (or number of images) is performed (refer, for example, to S21 in FIG. 5), and, concurrently with the second annotation, an inference model is created by means of learning performed with a relationship between physical objects and specific portions that was obtained in the first annotation as training data (refer, for example, to S25 in FIG. 5). As a result it is possible to perform an annotation operation without imposing a burden on specialists such as physicians.

Also, with the first embodiment and modified examples of the present invention, a plurality of images that may contain physical objects that constitute subjects of annotation are individually successively played back, and specific portions of physical object within the images that have been playback are designated by manual operation (refer, for example to S15 and S21 etc. in FIG. 5), at the time of changing to different images in order to designate specific portions among a plurality of images by manual operation there is separation into an image set for learning and an image set for correct solution (refer, for example, to S17 in FIG. 5), an inference model is created by performing learning using a relationship between physical objects and specific portions of the learning image sets as training data (refer, for example, to S19 in FIG. 5), and the inference model is verified using the image set for correct solution (refer, for example, to S23 in FIG. 5). Since images that have been given annotation information by manual annotation are divided into image sets for inference model creation and image sets for inference model verification, creation of an inference model and verification of the inference model can be effectively utilized.

Also, with the first embodiment and modified examples of the present invention, a plurality of images that may contain physical objects that constitute objects of annotation are classified in accordance with general-purpose classifications (refer, for example, to S3 in FIG. 9), a plurality of images that have been classified in accordance with general-purpose classification are individually successively played back, and specific portions of physical objects within the images that have been playback are designated by manual operation (refer, for example, to S14 in FIG. 9). Since it is possible to select images that will be objects of annotation without specific bias, it is possible to improve reliability of an inference model that has been created.

It should be noted that with the first embodiment and modified examples of the present invention, description has been given using an example where an affected part that is depicted in an endoscopic image of the patient is used as a specific portion of a physical object. However the physical objects and specific portions of those physical objects are not limited to this example.

Also, with the first embodiment and modified examples of the present invention, together with performing learning using results of manual annotation, manual annotation was performed (refer, for example, to S19 and S21 in FIG. 5, S20 and S22 in FIG. 7, and S20a and S22a in FIG. 9). Setting time of these two processes has been made the same, but they do not need to be the same. Also, verification results have been displayed only with the example shown in FIG. 5 (referred to S23 in FIG. 5) but in the example shown in FIG. 7 and FIG. 9 also, it is possible to perform verification using verification image groups after learning has been completed, and display the results of that verification.

Since it is difficult and takes time for a compact type inference engine that is fitted in an information terminal product such as a camera or a mobile device to perform learning to produce high precision determination with only a few layers, a contrivance in accurate annotation and learning method is required. When creating an inference model, since specification of the inference model changes in accordance with images that were used in learning, learning may be carried out efficiently with information on the learning incorporated. Information indicating what type of learning has been performed may be set at the time of an annotation operation, and this information may be stored as part of the inference information 4a in the memory 4 of the information acquisition device 10.

For example, in the case of performing inference using an inference model that was created by learning using only images that were horizontally and vertically aligned, and that were acquired using general purpose taken images, there is a possibility that correct inference will not be possible for images having horizontal and vertical displacement. Therefore, by performing inference on acquired images with the addition of horizontal or vertical information from the attitude sensor 3 at the time of reading out the above described information from the inference information 4a and performing imaging, correct measurement site determination becomes possible. An approach such as determining images by inputting horizontal and vertical information before performing inference using an inference model is effective, and it is preferable to have sensors for correcting information and images under these conditions. Since specification and performance of an inference engine will change depending on whether or not to input these types of restrictions at the time of learning, an annotation operation may be carried out through such trial and error, and that trial and error may be displayed.

Also, this embodiment may also be applied to an example that has an attitude sensor, and where man-made items that have been designed taking into consideration gravity, such as structures that are typified by buildings, are taken as physical objects. There are also infinite instances in the natural world that will be determined to have a shape that is affected by gravity like this. For example, plants such as trees and grass often grow against the force of gravity, the legs of animals extend in the direction to support gravity, and the vertical and horizontal direction of faces etc. are determined in accordance with gravity. This is due to the fact that, even without the direct action of gravity, the sun is in a direction against gravity, and reflections are opposite to that, and portions where water etc. has accumulated have a boundary surface with air in the direction of gravity etc. This applies not only to what we can see on a daily basis, it is also known that the structures of substances such as microorganisms and crystals, or structure and arrangement of organs, tumors and lesions that exist both inside and outside, liquid pooling conditions etc. are also affected by gravity, and performing determination taking gravity into consideration and supplementing at the time of annotation can be applied to various physical objects.

Also, it does not have to be gravity, and the information that can be used in annotation may also be information on time and position. This supplemental information may be obtained using any sensor other than an attitude sensor, namely, any sensor that can acquire information that will be supplemental to annotation for that physical object. Specifically, with the annotation device of this embodiment, specific portions of physical objects are detected using information from sensor data that has been associated with shooting time of image data, and an annotation operation is supplemented based on the results of this detection. That is, specific portions within image data using information may be automatically detected from sensor data that has been associated with shooting time of image data, and specific portions of physical objects may be designated based on the results of this detection.

Although it has been described here that supplemental information is obtained from sensors, that may be sensor groups that output specified information such as shooting environment and shooting conditions in cooperation with a plurality of the sensors (for example, converted distance from control information of focusing at the time of shooting, etc.), and there may be sensors that have captured reactions of people and animals that were present at the time of shooting using a camera or microphone. Using these sensors, dictation results from a persons voice may be reflected at the time of annotation, and when a dog has growled it is possible to reflect supplementary information such as that there is a suspicious person at the time of annotation.

There may also be cases where there is no information on shooting location, and errors arise in specification of lesions of a specified organ. It is therefore preferable to devise an approach for correlating environment at the time of examination, location of examined objects and information of affected site. For example, with an endoscope examination, all the examination locations for that organ can be determined by image analysis etc., but this method is not limiting, and there are also approaches where locations to be examined are inferred based on magnetic information or previously obtained medical images etc. using radioactive rays. Size and shape of the icon 54a that was described in FIG. 4B may also be determined by a processor using not only image data being displayed, but also using supplementary information, as required. For example, in step S15 of FIG. 5 and step S16 of FIG. 7, the control section 21 (processor) of the external device 20 may decide on an icon and display it.

It should be noted that since the word "annotation" is "to annotate", in the narrow sense it means adding some sort of annotation to image data. In fact, on performing this annotation operation, it tends to take longer for selecting image data and for observing image data carefully, and it is not possible to ignore these operations. That is, in this specification, an annotation operation is not simply the instant an annotation is made, but also means operations including selection of image candidates, search, extraction and verification, "OK input" etc. With this embodiment, the intention is to simplify these operations in total, operations for pending annotations with a technical view point can be focused on, and it is possible to obtain data that has high quality annotation information attached. A high precision inference engine is obtained, and it is possible to make information that is obtained from images high precision. Accordingly, the invention of this application includes utilizing such sensor data and supplementary information for selecting and searching images for the sake of simplification of annotation operations.

Similarly, if learning is performed using only images that have been obtained from specific distances with respect to the physical objects, correct inference is not possible for images that have been taken at other than the specific distance. In the case of performing inference using an inference model that has been generated with these types of images, it is possible to improve precision by taking an approach such as using an inference model by enlarging images that are far away so as to negate distance differences and making images that have been made artificially close. In this case, when performing inference on images using a distance sensor etc. together, correction is performed for correcting differences between actual scaling of images and learning data. A memory is provided for storing information as to what kind of learning data was used in creating a model, and when performing inference a scheme may be implemented such as correcting images so that an inference model can perform correct inference, using the above-described information. Whether or not this type of correction is necessary is discovered at the time of an annotation operation, and at the time of an annotation operation such as in this embodiment an approach that makes it possible to verify provisional learning is beneficial.

Obviously shooting locations may be considered in advance in accordance with differences in various shooting conditions that will arise at the shooting locations, or things are prepared such as including learning data and various conditions so that it becomes possible to deal with unknown conditions, and learning may be performed using a reinforcement learning method whereby learning is performed by also applying specific rewards. Reinforcement learning is for learning of "behavior such that values and effects become maximum" by trial and error, and is not learning that is performed as is until output of a correct solution that has been provided, but is learning to as to be able to obtain even better solutions. Determining whether learning without training should be performed, such as this type of reinforcement learning etc., also enables early determination in provisional learning reflected display during annotation, and it becomes possible to reduce effort at the time of development.

With the first embodiment of the present invention, as has been described above, there is the effect of increasing efficiency at the time of inference engine generation by reflecting provisional learning (learning using provisional rules that have been determined in advance) during an annotation operation. In particular, when creating a compact type inference engine suitable for a portable device, as a terminal device useable on site as represented in this embodiment, since it is necessary to deal with performing very time-consuming learning taking into consideration a number of layers and energy consumption, such as consumed current, an approach of giving reward and etc. in the learning can be considered while performing annotation operations, which enables early determination and handling. Feedback to perform review of specifications etc. ahead of schedule becomes possible while confirming results of provisional learning, and it is possible to comprehensively contribute to obtaining an inference engine of excellent performance, including time reduction.

Also, with the flowcharts that were shown in FIG. 5 etc. operation was divided by operation time, but besides dividing by operation time it is also possible to divide operation by data amount. Data amount may also be replaced by number of images. It is possible to divide operation time and similarly operation amount by setting whether learning is performed after initially creating a given number of training data. For example, after manual annotation of ⅓ of the data, learning is performed using training data based on this annotation. Annotation that has been mechanized is then performed on the remaining ⅔ of the data by inference using the results of this learning (inference model), and this annotation is checked by a human being. Data that appears good, and data for which sufficient annotation has not been performed but that are easily fixed manually by person, is subjected to additional annotation, and may be used in relearning. This operation is repeated until annotation has been completed for all data targeted.

Specifically, with respect to improvement of an annotation devise that is used in technology to create an inference model by subjecting image data to annotation, and by taking images that have already been subjected to annotation as training data, this annotation device has a display control section for performing the display control described below on a display for displaying the image data. Specifically, information on operation time of the annotation operation, on image data amount of an annotation operation performed at that time, are displayed, and it is possible to improve efficiency of business during an operation time that has been determined in advance. Also, these images are subjected to successive playback display based on a plurality of image data that may contain physical objects constituting subjects of annotation, and during playback display it is sometimes possible for the user to perform an annotation operation. It is also possible to acquire operation results of an operation section for designating specific portions within image data that has been displayed on the display in accordance with the progress of this operation.

It is also possible to obtain annotation information for image data that has been displayed in the annotation operation, and at a point in time where the operation time, a time based on data amount, or a data amount, that have been set, are reached, image data that has already been subjected to annotation is made training data, and it is possible to request learning, to generate an inference model for inferring specific portions from image data, to a learning circuit. As a result, it becomes possible to reflect learning results that have been obtained during a specific operation time in subsequent annotation operations.

Also, time for which operations can be performed differs depending on conditions, and in particular, there is a tendency for a specialist to only be able to perform operations for a limited time. An operation to change operating time that is performed at the time of annotation may therefore be made possible. For example, in steps S15 and S21 of FIG. 5, and steps S16 and S22 of FIG. 7, operation time may be changed by the user operating the designation operation section 24 at the time manual annotation is being performed, or before manual annotation. Results of changing the operation time may be displayed by the display control section (playback control section 21a). It is possible to alleviate the anxiety of a busy specialist by displaying change of operation time. If it is a simple operation that can be performed by anyone, restriction of time is not so important, but there are many cases where annotation can be performed by only a few specialists. In this way, it is desirable to implement an approach whereby it is easy for specialists to start and finish annotation operations without too much trouble. If operations have been completed it is necessary to perform data saving etc., but it may be made possible to perform saving automatically, not manually. Automatic saving may also be performed at the time when operations have been completed etc. At this time, there is a possibility that there will be images for which operations have not been completed and images for which operations have failed, and it is also possible to store these images so that which images are which will be understood at the time of the next operation. For example, images for which operation has taken too much time, images for which operation has been completed but that are still not confirmed, and images that have timed-out etc. are detected, and metadata is appended to the images that have been detected.

As has been described above, learning times are determined in accordance with time or data or amount, but display such as "operation until such and such an hour and so many minutes" may also be performed, and there may be time setting. If there is specific clock information, this is also applicable to this display. Also, learning times may be determined by determination including even whether or not a specified reliability can be obtained with both data amount and time for which annotation has been performed.

In this way, with the first embodiment of the present invention, annotation can be performed automatically by applying results of having performed learning with a small amount of data that has already been subject to annotation to data for which annotation has not yet started, and there is the effect of reducing load and stress on the operator, and reducing operation time. Specifically, according to this embodiment, it is possible to simplify an annotation operation. Also, in a case where operation time includes an estimated time, for example, that operations will take three days, operation time and operation period are set also including the time the operator goes home, and learning may be performed using the estimated time and going home time. In a case of management using data amount also, similar effects can be obtained, but there may also be applications such as commencing learning at a specified time, commencing learning at the time an operation has been stopped, and performing learning once a specified time has elapsed from an operation or operation suspension. It is also possible to perform learning for automatic annotation for a period of time until returning from a recess, or until the next operation is commenced, so that at the time operation is commenced again immediate learning effects are reflected. However, it is not necessary to thus limit the invention. Also, application for annotation operation may be activated at a specified time, and it is also possible to determine that time by predicting behavior of operators and determining behavior etc.

Also, in the first embodiment and modified examples of the present invention, the playback section 23, designation operation section 24, general-purpose classification section 25, learning section 26 etc. are constructed separately from the control section 21, but some or all of these sections may be constituted by software, and executed by a CPU within the control section 21. Each section within the control section 21 may also be provided using hardware circuits outside the control section 21. It is also possible for each of the above described sections to have a hardware structure such as gate circuits that have been generated based on a programming language that is described using Verilog, and also to use a hardware structure that utilizes software such as a DSP (digital signal processor). Suitable combinations of these approaches may also be used.

Next, operation of a second embodiment of the present invention will be described. In patent publication 1 mentioned above, although it has been proposed to determination a position to be diagnosed, there is no description regarding creating training data for use in machine learning such as deep learning. This embodiment makes it possible to easily create training data for use in machine learning such as deep learning.

An overview of the imaging system of the second embodiment will be described in the following. The camera can be connected to an external unit via a network. This external device can store images, a range of a thick linear structure is determined for these images that have been stored, and a range up to an outline of the structure is made annotation information. Specifically, a structure that will be made a subject is automatically detected from the images, and it is possible to create training data in which annotation information has been appended to the images (for details refer to FIG. 14 and FIG. 15). Also, as structures that will be made the subject there are pillar shaped structures such as columns and piping of bridge piers, tunnels and buildings etc., but besides these there also lockers, and furniture etc. and the invention is not limited to column shapes. It is also possible to apply this embodiment to structures that are not fixed.

Figure 16:
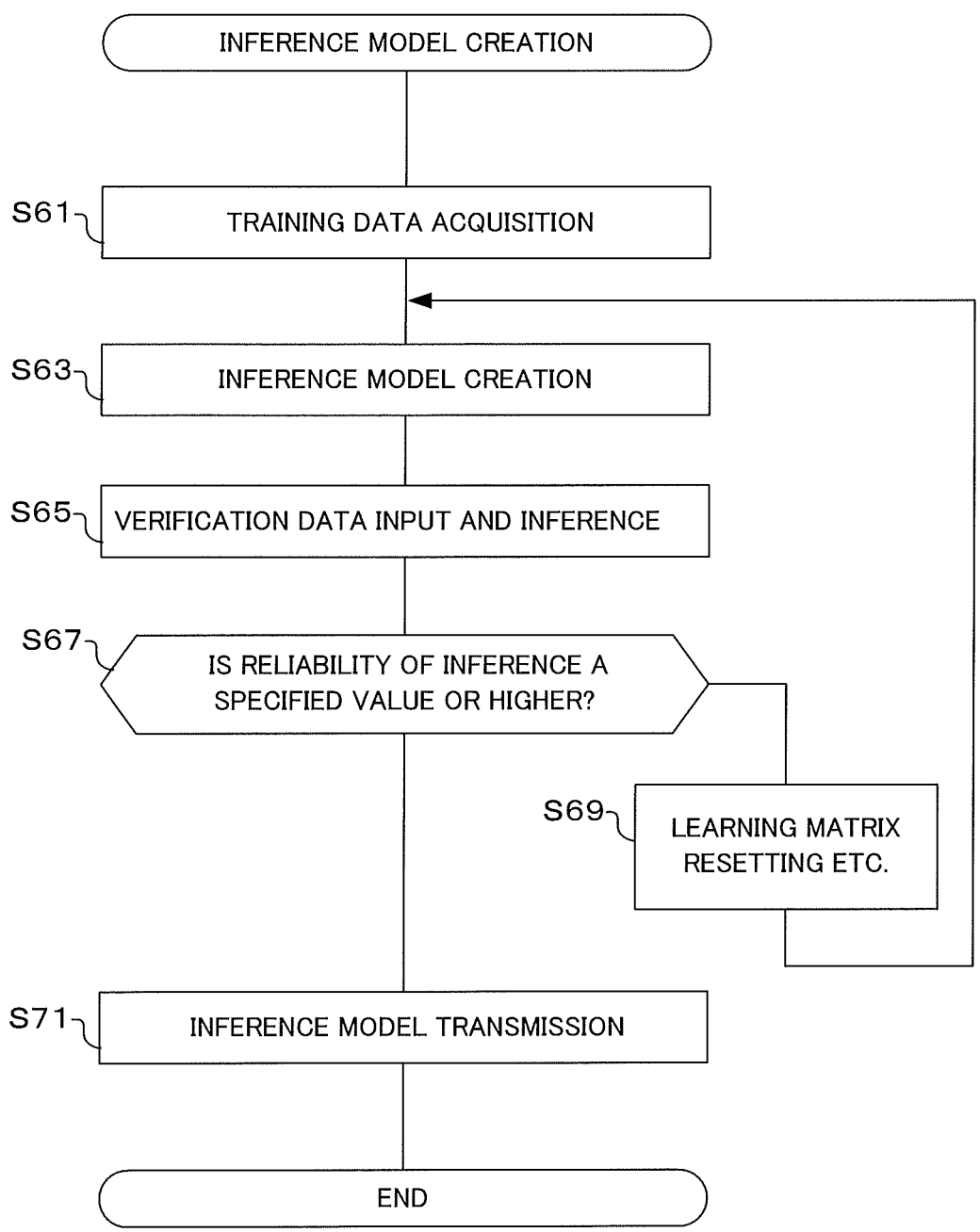
FIG. 16 is a flowchart showing operation for inference model creation, in the imaging system of the second embodiment of the present invention.

If training data having annotation information attached has been created, a learning section (inference engine) within the external device performs deep learning and it is possible to create an inference model for measuring a physical object (for details refer to FIG. 16). By performing inference of images using this inference model that has been created, structures are detected and it is possible to automatically measure size, such as thickness of the structure (for details refer to FIG. 17).

Figure 19A:
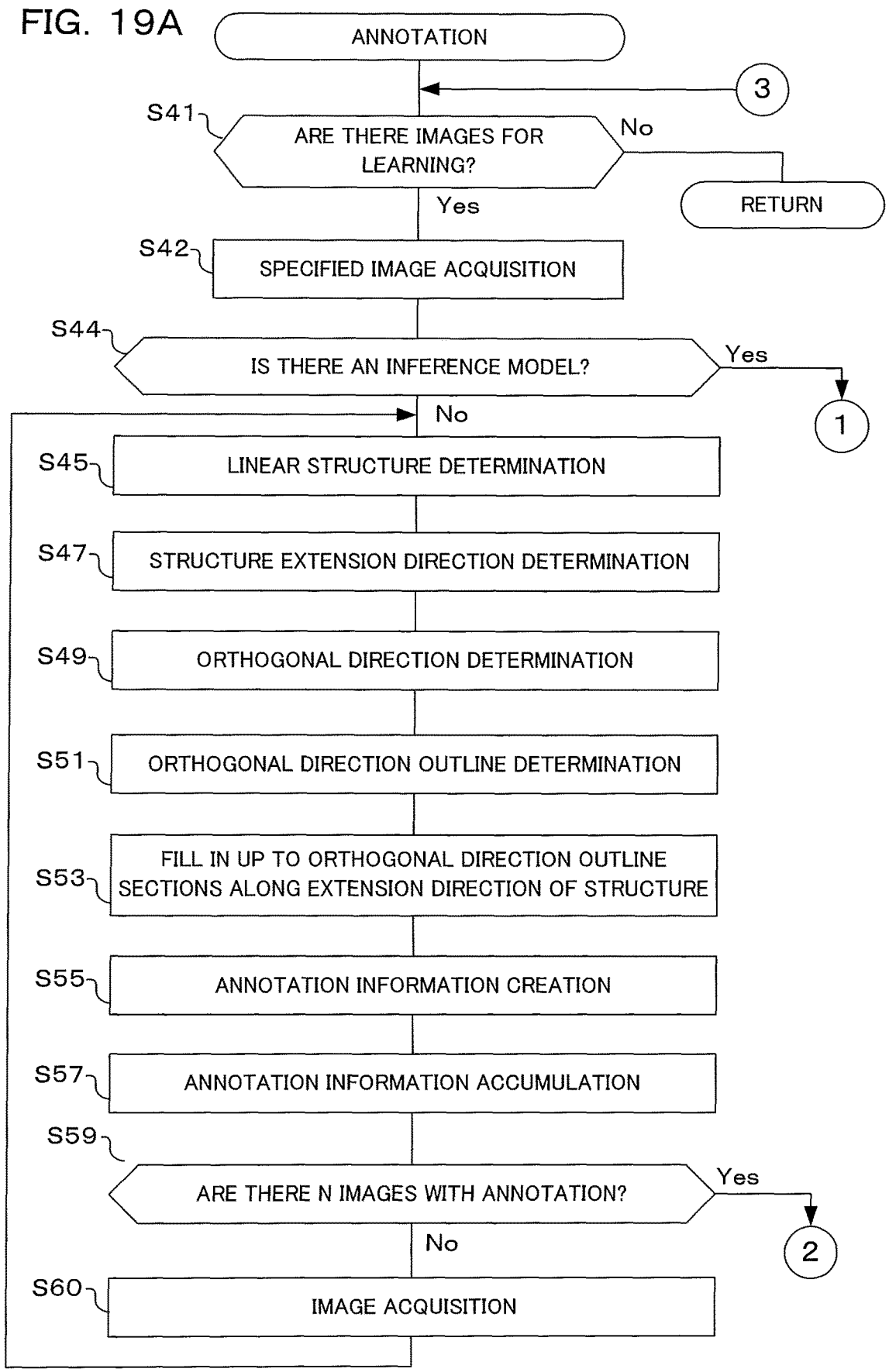
FIG. 19A and FIG. 19B are flowcharts showing a modified example of an annotation operation of the imaging system of the second embodiment of the present invention.

Also, with a modified example of this embodiment, if training data having annotation information attached is created for a specified number (N) of images among images that have been stored in the external device, deep learning for addition of annotation information is performed using this training data, and an inference model is created. The addition of annotation information is then performed for the remaining images using the inference model (for details refer to FIG. 19).

Figure 11:
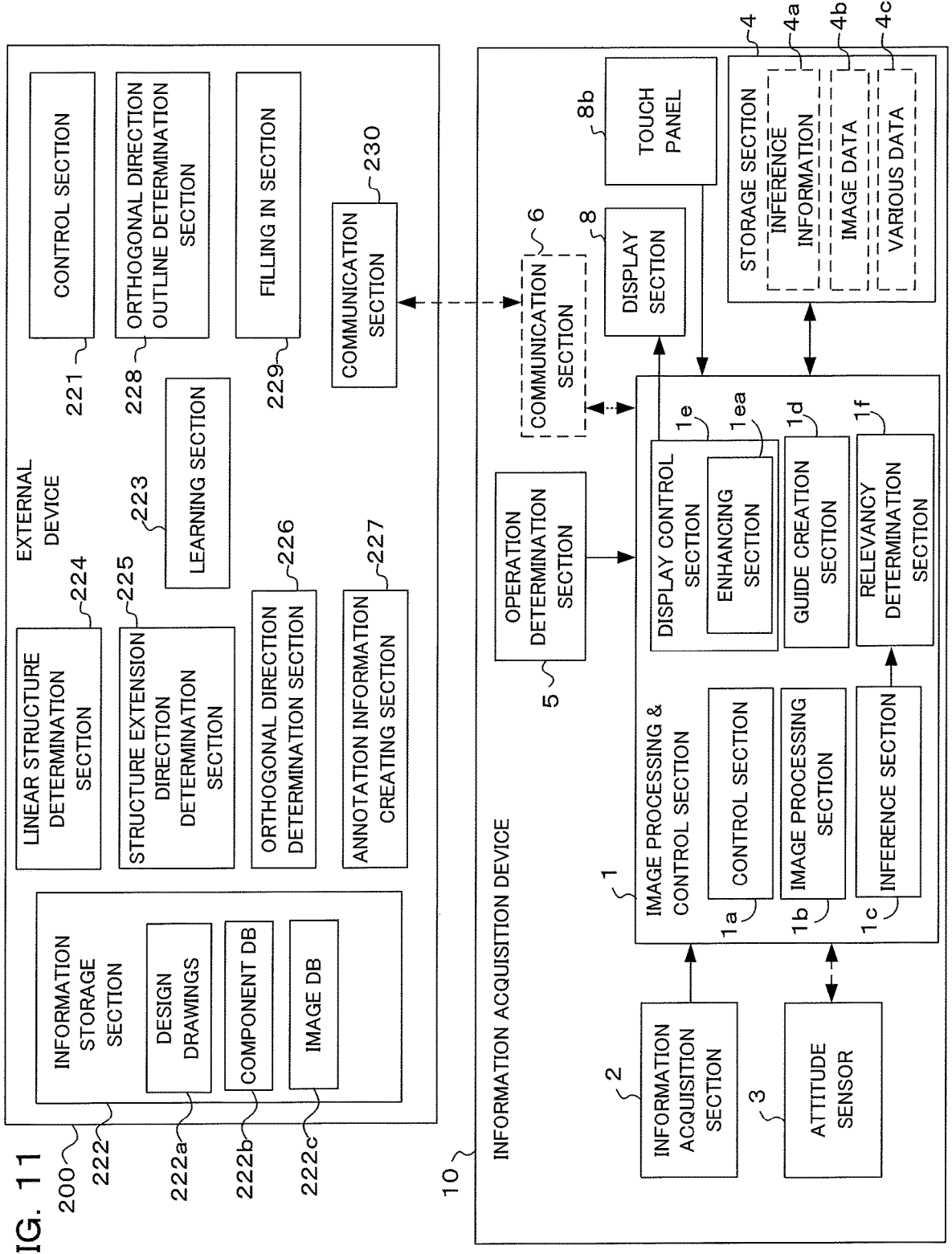
FIG. 11 is a block diagram mainly showing the electrical structure of an imaging system of a second embodiment of the present invention.

FIG. 11 is a block diagram mainly showing the electrical structure of an imaging system of a second embodiment of the present invention. This imaging system comprises an information acquisition device 10 and an external device 200. As the information acquisition device 10 it is possible to have a device that is capable of acquiring information such as images, such as a camera, a smart phone that has an imaging section, a PC (personal computer) that has an imaging section etc.

The information acquisition device 10 comprises an image processing and control section 1, information acquisition section 2, attitude sensor 3, memory 4, operation determination section 5, communication section 6, display section 8, and touch panel 8a. Each of these sections has the same function as each of the sections within the information acquisition device 10 that was shown in FIG. 1, and so detailed description will be omitted.

The image processing and control section 1 comprises a control section 1a, image processing section 1b, inference section 1c, guidance section 1d, and display control section 1e. The image processing and control section 1 is a processor, and may be constructed using an ASIC (Application Specific Integrated Circuit). The control section 1a has a CPU (Central Processor Unit), and performs overall control by controlling each section within the information acquisition device 10 in accordance with programs stored in the memory 4. Each of these sections has the same function as each of the sections within the image processing and control section 1 that was shown in FIG. 1, and so detailed description will be omitted.

Similarly to the case of FIG. 1, the inference section 1c may have an inference engine that has been constructed in hardware, and may be realized by inference processing using software using a processor such as a CPU. The inference section 1c is input with an inference model that has been generated in a learning section 223 of the external device 200, and sets weights and connection strengths of a neural network. Also, the inference section 1c is input with image data that has been acquired by the information acquisition section 2, and performs inference.

Figure 17:
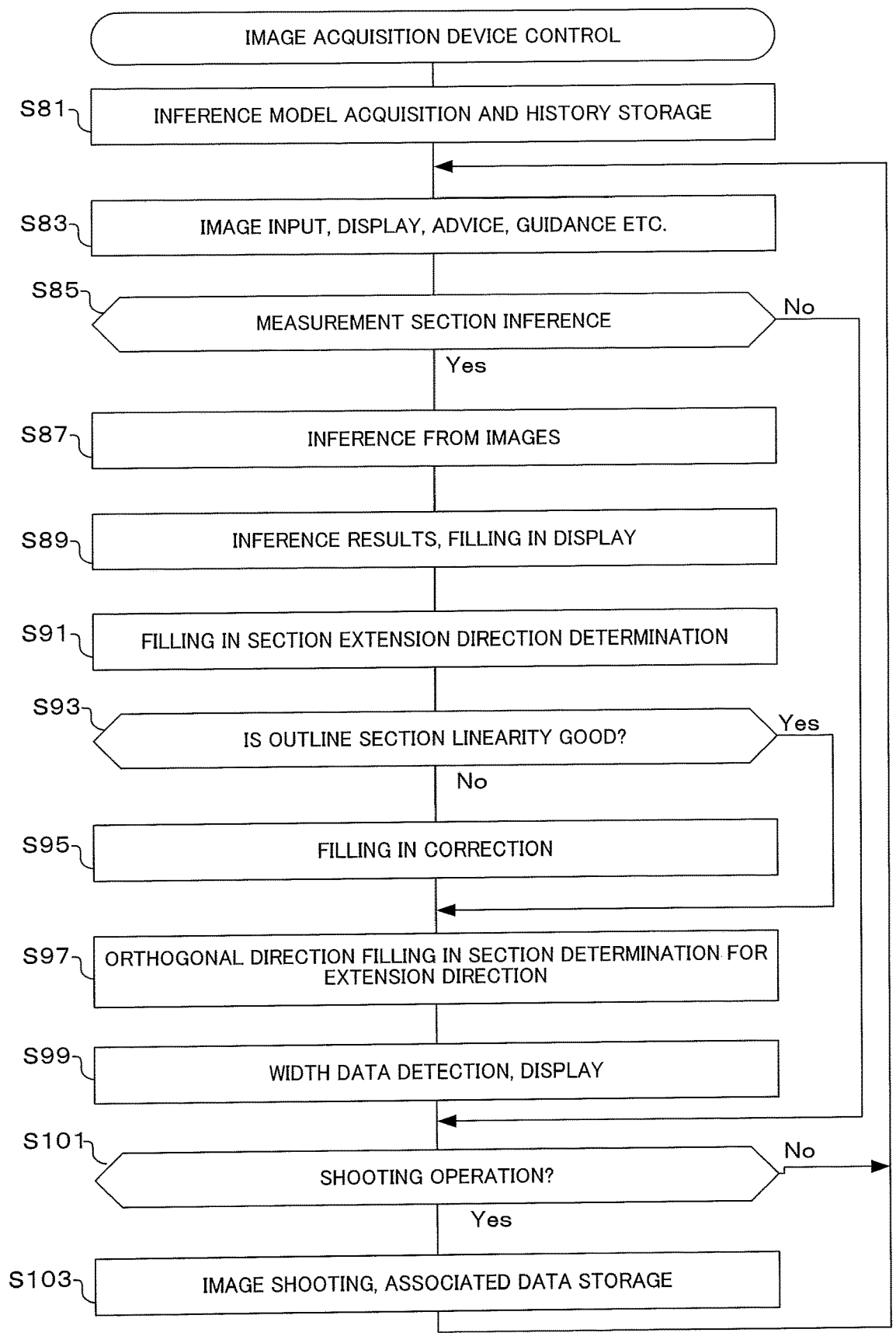
FIG. 17 is a flowchart showing control operation of an image acquisition device, in the imaging system of the second embodiment of the present invention.

For example, as will be described later using FIG. 13, physical objects, such as fixtures like lockers and desks, appliances, and structures such as piping and columns etc. are inferred based on images that have been acquired by the information acquisition device 10, and further the inference may include a calculation of length of physical objects that have been subjected to the inference (refer to S47 and S59 in FIG. 17). It should be noted that utilizing only inference results of the inference section 1c may not be limiting in calculating length of a physical object. For example, in a case where reliability of inference results is low, it is possible to supplement or substitute calculating length of a physical object by performing determination by executing image determination such as is performed in FIG. 14 in the control section 1a of the information acquisition device 10 etc.

Also, the guide creation section 1d creates various guidance display so that it is possible for the user to perform appropriately measurement at the time of measuring various fixtures, appliances, and structures using the information acquisition device 10. For example, if the inference section 1c infers physical objects such as fixtures like lockers and desks, appliances, and buildings such as piping and columns based on images that have been acquired by the information acquisition device 10, length of the physical objects that have been inferred is calculated and displayed as guidance information. It is possible for how the guide creation section 1d and the inference section 1c collaborate to change depending on the design or learning (depending on training data). Specifically, inference results of the inference section 1c may be displayed as they are, and the inference section 1c may only perform determination regarding what object portions are, and measurement such as of the length of object portions that have been determined may be performed by the guide creation section 1d.

As has been described above, in a case where reliability of inference results is low, for example, functional support or functional substitution required for guidance display may take the form of executing a specified image determination program etc., and this type of function may be provided in the guide creation section 1d. It is also possible to produce guidance for posture, distance, focus, exposure etc. at the time of imaging so that correct judgment is possible. It becomes possible for the user to perform normal operations while looking at this guidance, and to perform correct measurements and acquire measurement results.

The display control section 1e has a display control circuit, and performs control of display on the display section 8. For example, physical objects that have been acquired by the information acquisition section 2 are subjected to live view display, and images being stored in the memory 4 are subjected to playback display. In the case of performing guidance display etc., an enhancing section 1ea performs control to perform display that enhances location that the user particularly wants to pay attention to. For example, when displaying size of a physical object measurement points may be displayed (refer to FIG. 13B to FIG. 13D). The touch panel 8b is provided on a display surface of the display section 8, and if the user performs a touch operation touch information is detected and output to the image processing and control section 1. Using this enhancing section 1ea measurement points at the time of annotation are expressed with enhanced color and contrast, as shown in FIG. 13B to FIG. 13D, which means that the user can recognize that the device or system have correctly ascertains portions to be made objects, and operations proceed easily.

The external device 200 comprises a control section 221, an information storage section 222, a learning section 223, a linear structure determination section 224, a structure extension direction determination section 225, an orthogonal direction determination section 226, an annotation information creation section 227, an orthogonal direction outline determination section 228, a filling-in section 229, and a communication section 230. The external device 200 may be a stand-alone device such as a personal computer (PC), and may also be a server that is connected to the Internet. In the case of a standalone device such as a PC, image data may be input from a USB memory or the like without going through the communication section.

The control section 221 is a processor, and may be constructed using an ASIC (Application Specific Integrated Circuit). Also, this control section 221 has a CPU (Central Processing Unit), and performs overall control by controlling each section within the external device 200 in accordance with programs that have been stored in a storage section.

The information storage section 222 is an electrically rewritable non-volatile memory, and stores various data and images etc. The information storage section 222 is for storing whether or not a measured physical object has correct dimensions as evidence, and stores documents to be submitted to a relevant agency as required. This information storage section 222 further stores design drawings 222a, a component database (DB) 222b, and an image database (DB) 222c. The design drawings 222a are design drawings for fixtures and devices such as lockers and desks etc., and buildings such as piping and columns etc. Also, the component DB 222b is a database that stores data relating to each component of fixtures and devices such as lockers and desks etc., and buildings such as piping and columns etc. The image DB 222c is a database that stores images that have been transmitted from the information acquisition device 10 (refer to S3 in FIG. 14). It should be noted that the image DB 222c may also store images that have been acquired from means other than the information acquisition device 10. These items of data may be used when attaching annotation.

The learning section 223 may have an inference engine that has been constructed in hardware, and may be realized by inference processing using software using a processor such as a CPU. The learning section 223 performs deep learning using image data that has been given annotation that was created by the annotation information creation section 27, namely training data, and creates an inference model (refer to S23 in FIG. 16). The inference model that has been created is transmitted to the inference section 1c within the information acquisition device 10 by means of the communication section 230.

Also, with a modified example that will be described later (refer to FIG. 19A and FIG. 19B), if a specified number N of image data that have annotation that was created by the annotation information creation section 227 are accumulated, the learning section 223 performs deep learning in order to create annotation with this image data that has annotation as training data, and creates an inference model (refer to S125 and S1277 in FIG. 19B). The learning section 223 functions as a learning section that combines images and annotation information that has been attached by the annotation information creating section to make training data, and creates an inference model, for inferring object sections, by machine learning. Using the inference model that has been created by the learning section, object sections, for images that are different to images that have annotation information attached, are filled in, and training data is created by assigning annotation information to those images. As a result, if the user assigns annotation information for the specified number N of image data, then an inference model is created based on that information, and for other images it is possible to assign annotation based on that inference model, and it is possible to perform annotation quickly and in large amount.

With this embodiment also, similarly to the first embodiment, deep learning is performed as machine learning. Deep learning was explained in detail for the first embodiment, and so detailed description is omitted.

Figure 14:
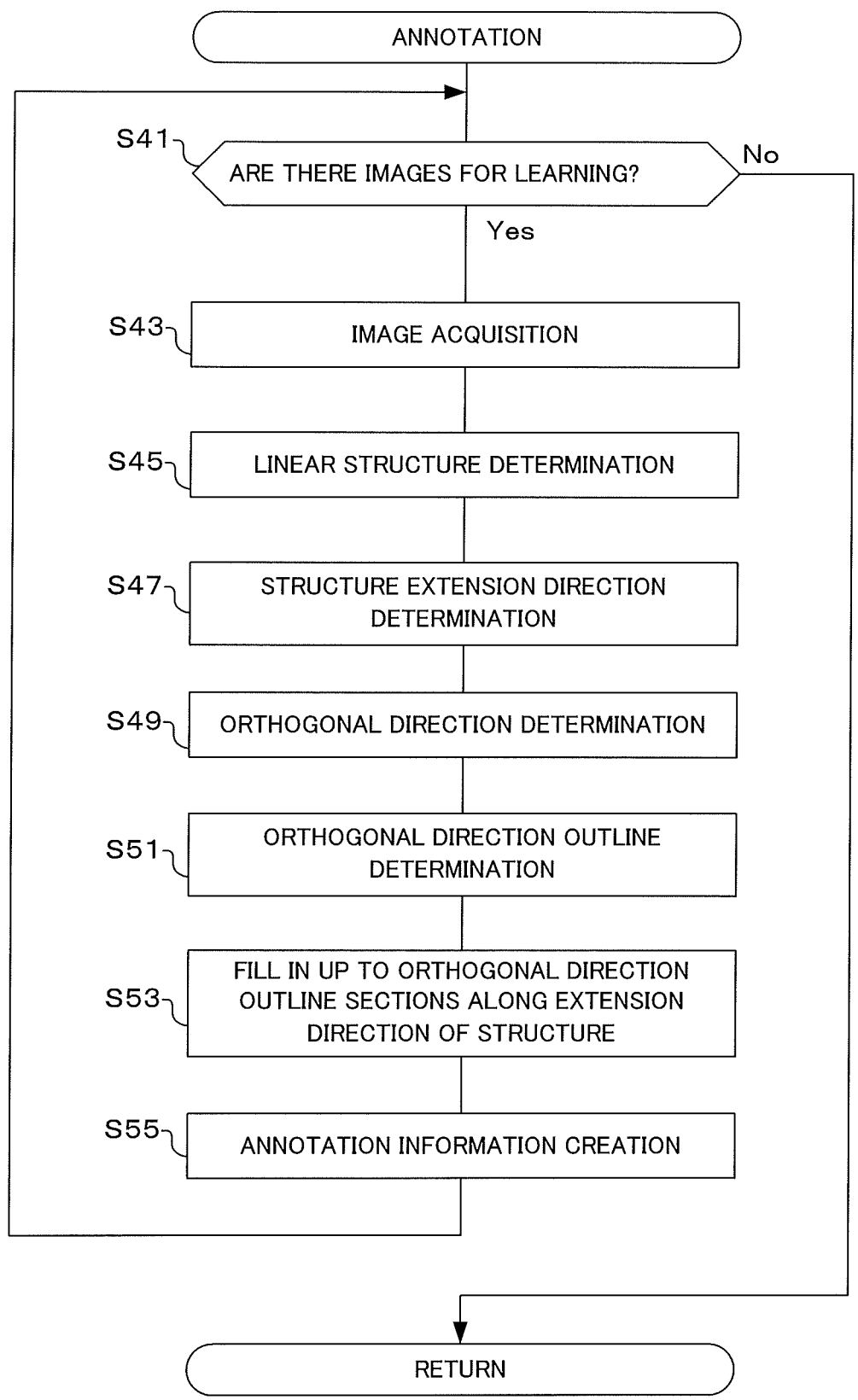
FIG. 14 is a flowchart showing an annotation operation of the imaging system of the second embodiment of the present invention.
Figure 15A:
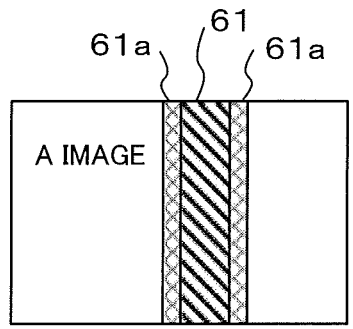
FIG. 15A to FIG. 15D are drawings for describing specifying of object range when performing annotation for a physical object, in the imaging system of the second embodiment of the present invention.

The linear structure determination section 224 successively reads out images that have been transmitted from the information acquisition device 10 and stored in the image DB 222c, and determines if there are any linear structures from among these images that have been read out (refer to S45 in FIG. 14, and to FIG. 15A).

Figure 15B:
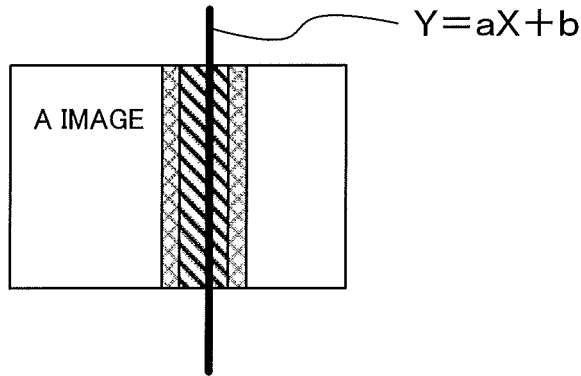

The structure extension direction determination section 225 determines a direction in which a linear structure that has been determined by the linear structure determination section 224 is extending (refer to S47 in FIG. 14, and to FIG. 15B). The structure extension direction determination section 225 may determine extension direction by performing judgment based on image data, for example, by analyzing whether or not substantially the same color extends toward the periphery of the screen. The structure extension direction determination section 225 functions as an extension direction determination section of a figure of a structure.

Figure 15C:
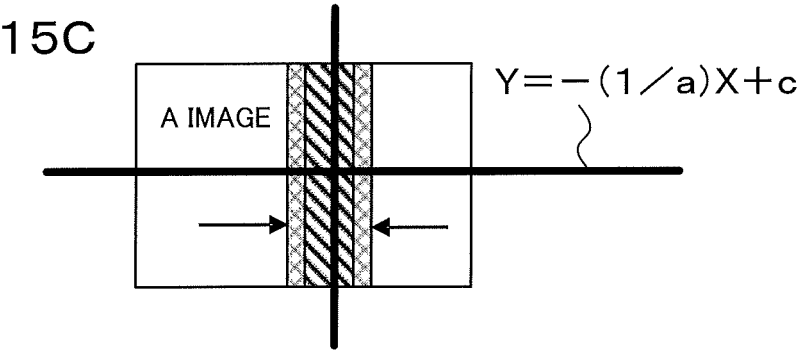

The orthogonal direction determination section 226 determines a direction which crosses at right angles to the extension direction of the structure that has been determined by the structure extension direction determination section 225 (refer to S49 in FIG. 14, and to FIG. 15C). If an extension direction of the structure has been determined, a direction that crosses this direction at right angles is determined as the orthogonal direction. The orthogonal direction determination section 226 functions as an orthogonal direction determination section that determines an orthogonal direction with respect to an extension direction that has been determined by the extension direction determination section.

An orthogonal direction outline determination section 228 determines outline portions of structures for an orthogonal direction that has been determined by the orthogonal direction determination section 226. For images that have been acquired by the information acquisition section 2, if there is a deep depth of field at the time the images were formed by the optical system, there are sections that are not in focus across the entire screen. This means that outline sections of the structure that have been determined by the linear structure determination section 224 are also not in focus. Therefore, the orthogonal direction outline determination section 228 determines where outline portions of a structure are by analyzing contrast change of an image and color change of an image along the orthogonal direction and that has been determined by the orthogonal direction determination section 226. Since a structure is columnar, outline portions extend in the extension direction. The orthogonal direction outline determination section 228 therefore successively determines outline sections along the extension direction.

It may be possible to infer many structures by referencing other components in many cases due to uniformity in strength and quality of their parts and structures themselves, manufacturing reasons, or simplification in design and construction of structures using parts. For example, for a leg or the like of a desk or chair, there are many cases where if a single leg is measured, the other legs will also have the same measurements. In this way, since thickness and strength are often the same at a component level, and further there is a tendency for components that have been standardized to specific regulations to be used, even if an outline of a taken images is unclear it is possible to infer from similar components of images that have been taken clearly. This can be applied to skeletons of people to a certain extent, and also in cases where, for shoe size, measurement is not possible because the right leg is in a plaster cast, it is possible to obtain similar results as long as the left leg is measured. At a building site also, depending on the dirt and the way of curing, although there are parts that are difficult to measure, measurement may be possible with those parts removed from measurement.

The orthogonal direction outline determination section 228 functions as an outline determination section that determines outline portions in a vertical direction, based on contrast change and/or, change in images of the structure. This outline determination section determines adjoining portions of parts by referencing nearby adjoining portions, for parts where there is no contrast change and/or, change of an image.

For structures within an image, the filling-in section 229 fills in along the extension direction of a structure up to orthogonal direction outline portions. Specifically, the filling-in section 229 performs filling in processing in order to designate regions within an image that correspond to a structure. As was described previously, if a structure is extending in the extension direction, outline portions are also extending in the orthogonal direction. Filling in processing may be applied to regions that are surrounded by an outline portions and an upper end and lower end of a structure. This filling in processing may use a general purpose image processing circuit, and may also use image processing software without providing an image processing circuit.

The filling-in section 229 functions as a filling-in section that applies image processing to fill-in along an extension direction of the structure, up to the outline sections in the orthogonal direction for a structure within an image. The filling-in section 229 functions as an image processing section that analyzes images and performs image processing to fill in object portions.

It should be noted that as well and filling in object sections, this image processing may be image processing so as to make it possible to display object areas by distinguishing from other areas, such as showing enclosure line, making object sections visible using arrows, changing color etc. Also, as long it is possible to make it easy to understand that it is the same object using uniform processing, and improve legibility, the filling in may be by another method. For example, edge enhancement, halftone dot meshing using diagonal lines, inking, which is a cartoon technique, and tone processing etc. are possible. Besides this processing to improve discrimination, there is an image processing method to change brightness, change to a complementary color, and emphasize primary color. At the time of learning, if this homogenized annotation and improved discrimination annotation are left as they are, then when the information acquisition device 10 displays inference results at a site where physical objects are measured it is possible to improve legibility by displaying in the same way. With regard to operations at a measurement site, there is a need for rapidity, and operation using small devices is preferred. Display and guidance of inference results having improved legibility contributes significantly to streamlining. It is therefore preferable to perform this type of annotation from the learning stage.

For images that have been acquired by the information acquisition section 2, the annotation information creation section 227 associates regions that have been filled in by the filling in section 228 with images. Specifically, regions that have been filled in are made annotation, and associated with images. These images that have been associated can be used in the learning section 223 as training data when performing deep learning (refer to FIG. 12).

The annotation information creation section 227 functions as an annotation information creating section that makes images that have been filled in by the filling in section annotation information. Here, annotation information that has been generated, and images, are made training data, and used in machine learning in order to create an inference model that determines images of a structure. The annotation information creation section 227 functions as an annotation information creating section that makes images that have been filled in by an image processing section annotation information. Also an inference model is generated by the annotation information creating section. The annotation information creation section 227 functions as a processor (annotation information creating section) that detects outline sections of a physical object, and makes a range that is surrounded by the outline sections annotation information. This processor (annotation creation section) determines extension direction of images of a physical object, further determines a direction that is orthogonal to the extension direction, and detects outline sections based on extension direction and the orthogonal direction.

It should be noted that the above described linear structure determination section 224, structure extension direction determination section 225, orthogonal direction determination section 226, annotation information creation section 227, orthogonal direction outline determination section 228 and filling-in section 229 are constructed separately to the control section 221 and learning section 223 in this embodiment. However, this is not limiting, and some or all of the sections may be constructed as a single or a plurality of processors. Further, each section may be constructed with a hardware circuit, and functions may be realized in software using a CPU etc. Also, there may be cases where training data used at the time of learning in the learning section 223 can use publicly known data, This may be, for example, data that is being distributed for research by an organization that handles specific images, data being sold by an evaluator, data of images that are easily available through image search engine services, etc. Since these data are available as collections of how many sets, annotation may be performed using these collections.

The learning section 223 performs deep learning (machine learning) using so-called artificial intelligence (AI). Specifically, the learning section 223 makes images that have been given annotation that was created by the annotation information creation section 227 (training data) a population, and performs deep learning using this as training data. Specifically, image data of images with annotation is input to the input layer of a neural network, and weights of intermediate layers are determined so that output results constitute annotation information (regions that have been determined (filled) to be structures) of training data. These weights (connection strengths) of intermediate layers are output as an inference model. Deep learning in the learning section 223 will be described later using FIG. 12.

The communication section 230 has a communication circuit for performing wired communication and/or wireless communication. This communication section 230 performs transmission and reception with the communication section 6 within the information acquisition device 10. By means of the communication section 230, image data is received from the information acquisition device 10, and the external device 200 transmits inference models to the information acquisition device 10.

Next, training data for performing deep learning in the learning section 223 within the external device 200, and the deep learning performed by the learning section 223, will be described using FIG. 12. It should be noted that functions that are the same as the deep learning that was shown in FIG. 2 are given the same reference numerals as in FIG. 2.

Figure 12B:
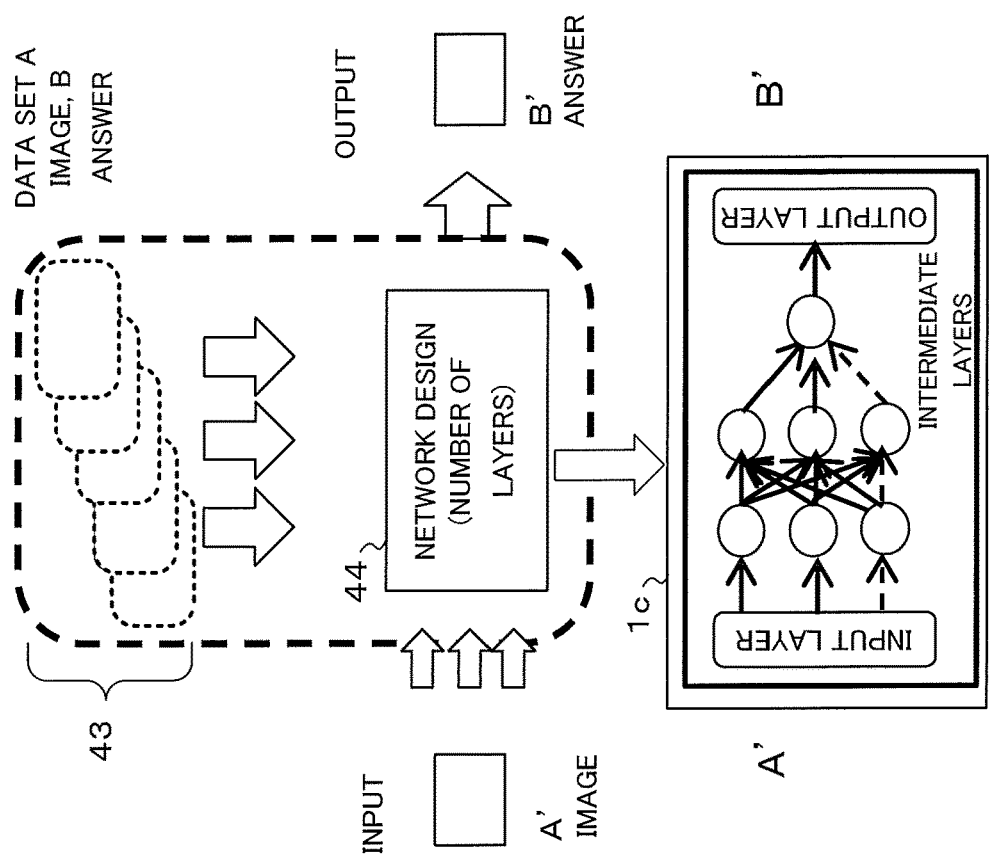
FIG. 12A and FIG. 12B are block diagrams showing generation of training data, and inference that is performed using an inference model that has been created using the training data, in the imaging system of the second embodiment of the present invention
Figure 12A:
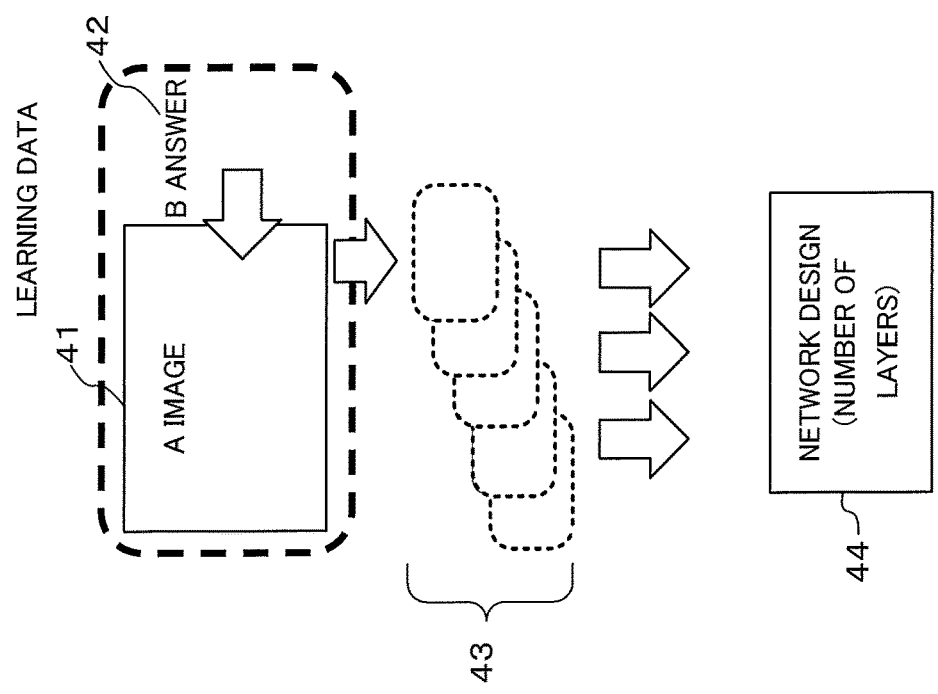

FIG. 12A shows training data used by the learning section 223. The A image 41 is an image that has been acquired by the information acquisition section 2. The B solution 42 is annotation information that has been generated by the annotation information creation section 227 (regions that have been determined to be a structure). The image group 43 is an image group (training data) that has been given annotation information. Using this image group (training data), deep learning is performed in the neural network (design of network) 44 within the learning section 223.

FIG. 12B is a drawing for describing deep learning that is performed by the learning section 223 and inference that is performed by the inference section 1c. Images within the image group 43 are input to the input layer of the neural network 44, and solutions (annotation information (regions that have been determined to be a structure)) within the image group 43 are supplied to the output layer. Then, for each input, connection strengths and weights of neurons of each layer of the intermediate layer (neural network 44) are determined so that each output matches. The connection strengths and weights of the intermediate layer constitute an inference model. An inference model (strengths and weights of the intermediate layer) that has been generated by the learning section 223 is stored in the inference section 1c, and used at the time of inference.

Next, inference that is performed by the inference section 1c using an inference model that has been generated by the learning section 223 will be described using FIG. 13A to FIG. 13D. The examples shown in FIG. 13A to FIG. 13D are for appearance when an image is acquired by the information acquisition section 2, and size of the physical object is measured based on this image. The physical object here is a locker (refer to FIG. 13A and FIG. 13B).

Figure 13A:
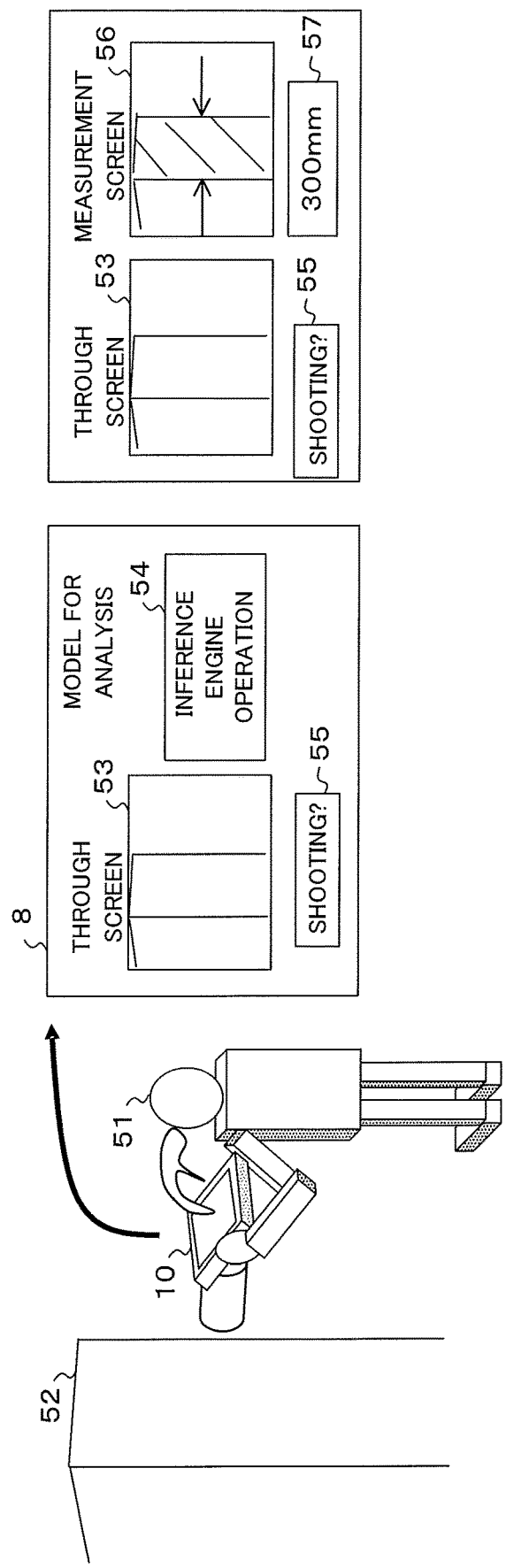
FIG. 13A to FIG. 13D are drawings showing an example display of inference results in the imaging system of the second embodiment of the present invention.
Figure 13B:
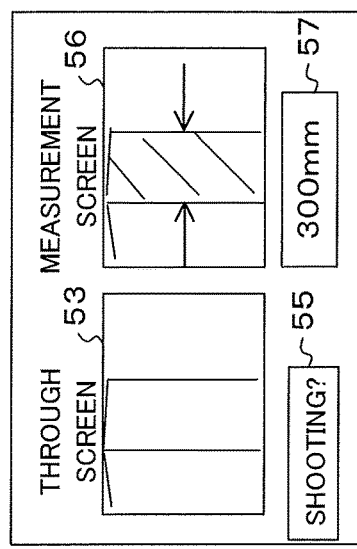
Figure 13D:
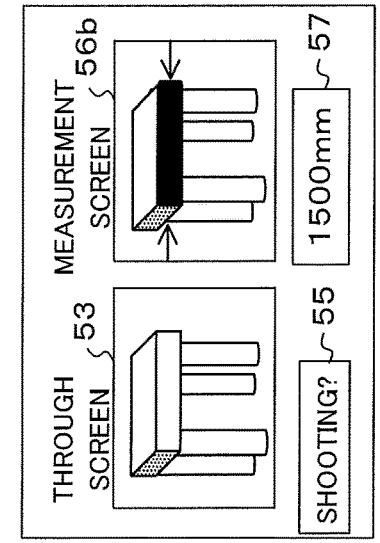
Figure 13C:
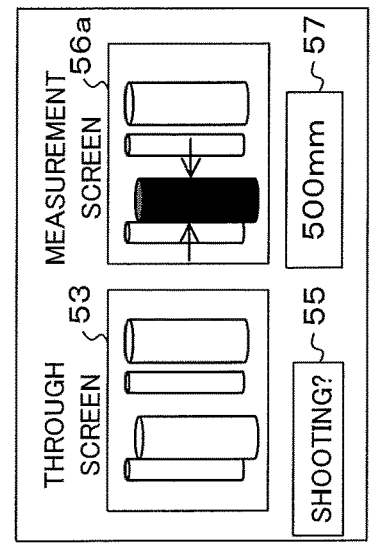

FIG. 13A shows appearance of a user 51 measuring size of the physical object 52 using the information acquisition device 10. If this information acquisition device 10 commences measurement, measurement and progress is shown on the display section 8. Specifically, an image (with this example, an image of a locker) that has been acquired by the information acquisition section 2 is displayed on the through screen 53 as a through image. Also, the fact that measurement position of the physical object 52 is being inferred by the inference engine (inference section 1c) is displayed on the inference display 54. An icon for performing instruction when the user 51 performs still picture shooting is also displayed on a shooting icon 55. The user 51 may touch the shooting icon 55 in the case of shooting.

If measurement position has been inferred by the inference engine and size of the measurement position measured, measurement results are displayed, as shown in FIG. 13B. Specifically on the measurement screen 56 there is display using arrows for measurement position, and on the measurement results display 57 there is display of measurement results for size of the physical object. It should be noted that calculation of size of the measured physical object will be described later using FIG. 18.

Display of the measurement screen 56 is not limited to the example shown in FIG. 13B, and other display methods may also be used. For example as shown in FIG. 13C and FIG. 13D, the measured physical object is filmed in on the measurement screens 56a and 56b, and measurement positions may be shown using arrows. With the example shown in FIG. 13C, the measured physical object has a cylindrical color and shape, and with the example shown in FIG. 13D the measured physical object is a side plate length of a desk chair or the like.

Next, an annotation (adding annotation) operation will be described using the flowchart shown in FIG. 14. The annotation of FIG. 14 is the user etc. teaching regions of a measured physical object for images that have been acquired by the information acquisition section 2, and generating data for training. The flowchart for this annotation is realized by a CPU within the control section 221 of the external device 20 controlling the linear structure determination section 224, structure extension direction determination section 225, orthogonal direction determination section 226, vertical direction outline portion determination section 228, filling-in section 229 and annotation information creation section 227 etc. within the external device 20 in accordance with programs that have been stored in memory.

If the operation for annotation shown in FIG. 14 is commenced, first, it is determined whether or not there are images for learning (S41). As was described previously, images that have been acquired by the information acquisition section 2 are stored in the information storage section 222 as an image DB 222c by means of the communication section 6 and the communication section 30. In this step, it is determined whether or not images have been stored in the information storage section 222 as images for learning.

If the result of determination in step S41 is that there are images for learning, next, images are acquired (S43). In this step, images for learning are read out from the image DB 222c of the information storage section 222. The images shown in FIG. 15A are examples of images that have been read out from the image DB222c as images for learning, The measured physical object 61 of the example shown in FIG. 15A is a cylinder that extends in one direction (Y direction), and a portion 61a shows portions that are not in focus (out of focus regions).

Once an image has been acquired, next, linear structure determination is performed (S45). In this step, the linear structure determination section 224 determines whether or not there are linear structures in the image that was read out in S43. There may be cases where there are a plurality of linear structures in an image. In this case, priority may be placed on detecting a front, and all linear structures within a screen may be detected taking into consideration a state of overlapping of physical objects. Also, in a case where an image that has been acquired by the information acquisition section 2 is a stereo image, a depth relationship in front and behind is determined, and all linear structures within a screen may be detected.

If the result of determination in step S45 is that the measured physical object 61 is a linear physical object, structure extension direction is determined (S47). In this step, the structure extension direction determination section 225 determines in which direction a structure is extending, and the extension direction is calculated using a linear equation (a general equation, calculating Y=aX+b).

Once structure extension direction has been determined, next a direction that is orthogonal to the extension direction is determined (S49). In this step, the orthogonal direction determination section 226 performs calculation using the linear equation that was calculated in step S47. A condition under which two straight lines for the extension direction and the orthogonal direction, namely Y=aX+b and Y=a'x+b', cross is m×m'=−1. Therefore, an equation for a line that orthogonally crosses the extension direction can be calculated using Y=−(1/a)X+c.

Once the orthogonal direction has been determined, next, orthogonal direction outline portions are determined (S51). In this step, the vertical direction outline portion determination section 228 determines outline portions 61a based on changing contrast and/or changing color of the image. Since, as was described previously, a structure has a linear shape extending in the extension direction, the outline portions also extend along the extension direction. Therefore, the vertical direction outline portion determination section 228 detects outline portions 61a continuously (or intermittently) along the extension direction. It should be noted that in the vicinity of some of the outline portions there may be cases where there is no longer any change in contrast or change in color of the image. In this case, outline portions may be determined by referencing (by performing interpolation calculation etc.) outline portions that could be detected near to these portions.

If outline portions have been determined, next filling in is performed along the extension direction of the structure up to outline portions in the orthogonal direction (S53). In this step, the filling-in section 229 performs filling in of a range that is enclosed by the outline portions that were obtained in step S51, along the extension direction that was obtained in step S47. Specifically image processing for filling in is applied so that the range of the physical object can be known. It should be noted that when filling in has been performed, the external device 200 may display the results of the filling in on a device that has a display section, such as the information acquisition device 10. In this case, in the event that a region that has been filled in is irrelevant, the user may amend the region that has been filled in. This amendment may be performed automatically, and may be performed by the user manually operating an operation section. Also, when performing the filling in, coordinate determination for outline portions within the image is performed, and filling in processing may be performed using these coordinates.

Figure 15D:
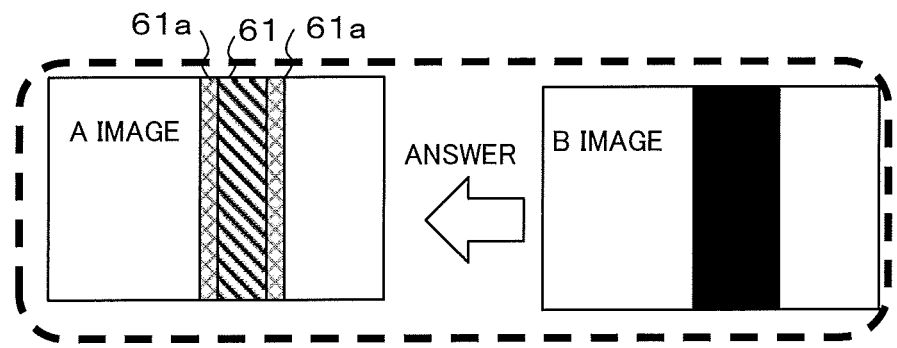

If filling in has been performed in step S53, an image that has been filled in is made into information to be annotated (S55). In this step, the annotation information creation section 227 associates an image B, that has been filled in, with an A image. Specifically, training data made from a set of B solutions for A images, as shown in FIG. 15D, is created (refer to FIG. 12A).

Once annotation information creation has been formed, processing returns to step S41, and next it is determined whether or not there is image data for learning. If the result of this determination is that there is image data for learning, steps S43 to S55 are executed, and annotation information creation is performed. On the other hand, if the result of determination in step S41 is that there is not an image for learning, the processing for annotation shown in FIG. 14 is terminated, and the originating flow is returned to.

In this way, in the flow for annotation, regions of a measured physical object are detected from within an image, for images that have been acquired in the information acquisition section 2, and these regions are stored in association with the image. By performing annotation to associate regions of a measurement object with this image, it is possible to generate training data for performing deep learning. Compared to a user manually designating measurement regions, since measurement regions are designated automatically it is possible to create a large amount of training data in a short time.

Next, operation for inference model creation will be described using the flowchart shown in FIG. 16. The flow for this inference model creation is realized by the learning section 223 within the external device 200.

If the flow for inference model creation is commenced, first, training data is acquired (S61). Here, image data that has annotation (training data) that was created by the annotation creation section 227, in accordance with the flow for notation shown in FIG. 14, is acquired (refer to FIG. 12A).

If training data has been acquired, next an inference model is created (S63). The learning section 223 performs deep learning and creates an inference model using training data, as was described using FIG. 12B.

Once an inference model has been created, next verification data is input and inference is performed (S65). Here, the learning section 223 inputs verification data to the inference engine within the learning section 223, and obtains inference results. Verification data (refer to FIG. 2A) is a combination of data of input and answer that are known. It is also possible to use training data that was not used at the time of inference model creation in step S63, within the training data that has been created by the annotation creation section 227.

If inference has been performed using verification data, it is next determined whether or not reliability of the inference is greater than or equal to a specified value (S67). Here, at the time of inference in step S25, inference results and previously known answers are compared, a proportion at which the two match is obtained, and this proportion is made reliability. The specified value is set to a level that can determine whether reliability is high or is low.

If the result of determination in step S67 is that reliability of inference is not a specified value or greater, the learning matrix is reset (S69). Reliability of inference being low means that there is a possibility that the learning matrix is not appropriate. The learning matrix is therefore reset, processing returns to step S63, and deep learning is performed again. Specifically, selection and addition etc. of training data is performed.

On the other hand, if the result of determination in step S67 is that reliability of the inference is greater than or equal to the specified value, the inference model is transmitted (S71). Here, the external device 200 transmits the inference model that was created in step S63 to the information acquisition device 10 using the communication section 230. Once the inference model has been transmitted, this flow is terminated.

In this way, in the flow for inference model creation shown in FIG. 16, the learning section 223 creates an inference model (refer to S63) using training data that was created by the annotation that was shown in FIG. 14 (refer to S61). By performing inference using this inference model, it is possible to find linear structures from within an image.

It should be noted that specifications of the inference model will change depending on images used at the time of learning. Specifically, if learning is performed with only images that were horizontally and vertically aligned, there is a possibility that correct inference will not be possible for images having horizontal and vertical displacement. Therefore, in the case of performing inference using that type of inference model, an approach may be taken whereby before performing inference, horizontal and vertical information is input and images are then determined with the inference model. Also, if learning is performed using only images that have been obtained from a specific distance, correct inference is not possible for images that have been taken at other than the specified distance. Therefore, it is possible to improve precision by taking an approach such as performing inference etc. by enlarging images that are far away so as to negate distance differences and making images that have been made artificially close. Accordingly, it is possible to take an approach such as storing information, representing what type of learning data was used when an inference model was created, in memory (for example the memory 4 in which the inference information 4a has been stored), reading out information representing that inference model at the time of using the inference model, and correcting images so that correct inference is possible.

Next, control operation of the image acquisition device will be described using the flowchart shown in FIG. 17. This flow for image acquisition device control is realized by the CPU of the control section 1a within the information acquisition device 10 controlling each section within the information acquisition device 10 in accordance with programs that have been stored in memory.

If the flow for image acquisition device control is commenced, first, inference model acquisition and history storage are performed (S81). In this step, the information acquisition device 10 acquires inference models from the external device 20, as required. Also, history up to that point is stored. As history, type and acquisition dates etc. of an inference model that has been acquired from the external device 200, for example, are stored.

Next, images are input and display, and advice and guidance etc. are displayed (S83). Here, an image is input using the information acquisition section 2, and these input images are subjected to through image display on the display section 8. Also, at the time of inference of the image, which will be described later (refer to S87), if advice and guidance are possible, they are displayed.

Next, it is determined whether or not to perform inference for a measurement section (S85). As was described using FIG. 13A to FIG. 13D, there are cases where the user measures size etc. of a physical object using the information acquisition device 10. In this type of situation, the user can set a measurement section inference mode, for setting object sections to be measured by inference, using the operation section. In this step, determination is based on whether or not this mode has been set using the operation determination section 5.

If the result of determination in step S85 is that the measurement section inference mode has been set, inference is performed from the image (S87). Here, the inference section 1c inputs an image that has been acquired by the information acquisition section 2 and infers measurement sections using an inference model that was acquired from the external device 200.

Next, filling in display is performed based on inference results (S89). Here, filling in is displayed based on the inference results of step S87. For example the measurement section may be filled in and displayed, as shown on the measurement screen in FIG. 13B to FIG. 13D. However, in this step, since determination of extension direction has not been completed, only some parts are displayed. Next determination of extension direction is performed for the field in section (S91). Here, similarly to as was described in FIG. 15B, extension direction of a linear measured physical object is determined.

It is next determined whether or not outline section linearity is good (S93). Since the outline section is determined based on change in contrast and change in color, the linearity of the outline section is not always good. In this step, determination is for linearity of an outline section it has been determined by the image processing section.

If the result of determination in step S93 is that linearity of the outline section is not good, the filling is corrected (S95). Here, contour lines of the outline section are corrected so as to become linear by the image processing section. The contour lines may also be corrected so as to become linear by the user manually.

If the filling in correction of step S95 has been performed, or if the result of determination in step S93 was that the linearity of the outline section was good, an orthogonal direction filling in portion is determined for the extension direction (S97). Here, a filling in portion in a direction that is orthogonal to the extension direction is determined for the linear measured physical object. Specifically, since width is detected in the next step S99, the width direction is detected in step S97 as a preliminary stage.

Next, width data detection and display are performed (S99). Here, width is calculated for filling in portions in a direction that is orthogonal to the extension direction was detected in step S97. For example, the measurement results 57 that were shown in FIG. 13B to FIG. 13D are displayed. Details of the width calculation will be described later using FIG. 18.

If width data detection and display have been performed in step S99, or if the result of determination in step S85 was that there was not measurement section inference, it is determined whether or not there is a shooting operation (S101). If the user performs still picture shooting, a release button of the operation section is operated, or a touch operation is performed on a shooting icon 55 (refer to FIG. 13A to FIG. 13D). In this step therefore, it is determined whether or not these operations have been performed. In the case of measuring length etc. of a physical object, such as was shown in FIG. 13A to FIG. 13D, it is preferable to perform taking of photographs for evidence, together with measurement values.

If the result of determination in step 5101 is that there is not a shooting operation, processing returns to step S83. On the other hand if a shooting operation has been performed, images are taken, and associated data is stored (S103). Here, the information acquisition section 2 acquires an image, and after performing image processing using the image processing section 1b, this image is stored in the memory 4 as image data 4b. Also, if width data has been calculated in step S99, this width data, and an image having the filling-in section subjected to measurement, may be stored together. Once images are taken and associated data have been stored, processing returns to step S83.

In this way, in the flow for image acquisition device control, parts to be measured are inferred using an inference model that was created by the learning section 223 of the external device 200 (refer to S87). As a result, even if the user does not input parts to be measured manually, the parts to be measured are inferred automatically, filling in is displayed, and it is possible to measure size etc. of a measured physical object.

Figure 18A:
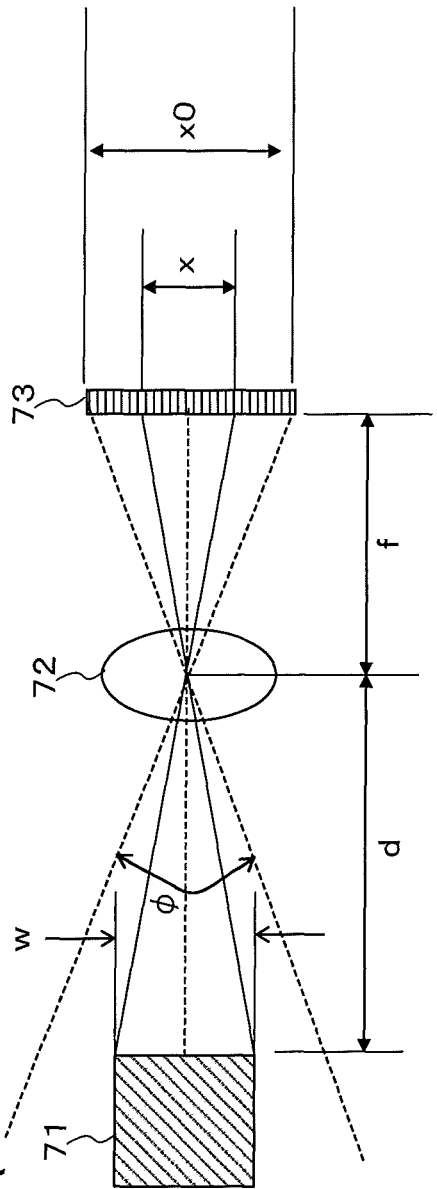
FIG. 18A and FIG. 18B are drawings for explaining a measurement method for physical object size, in the imaging system of the second embodiment of the present invention.

Next, a method of calculating size of a measured physical object will be described using FIG. 18. FIG. 18A shows a case where the optical system of the information acquisition section 2 is constructed with a single optical system 72. Width of a location to be measured 71 is made w, and an angle of view in which the optical system 72 expects the object location 71 is made φ. An image of the object location 71 is formed on the image sensor 73 by the optical system 72, with width of the image sensor 73 being x0, and width of an image of the object location 71 being made x. The image width x is known by detecting an outline. Also distance from the object location 71 to the optical system 72 is d, and focal length of the optical system 72 is f. If the focus position changes as a result of autofocus etc., the distance d also changes. The focal length f can be acquired from lens information and zoom information.

In FIG. 18A, width w of the object location 71 can be calculated using equation (1) below.

$$w = d * x / f \tag{1}$$

Also, the angle of view φ can be calculated using equation (2) below.

$$\varphi \approx \arctan x0/f \tag{2}$$

Figure 18B:
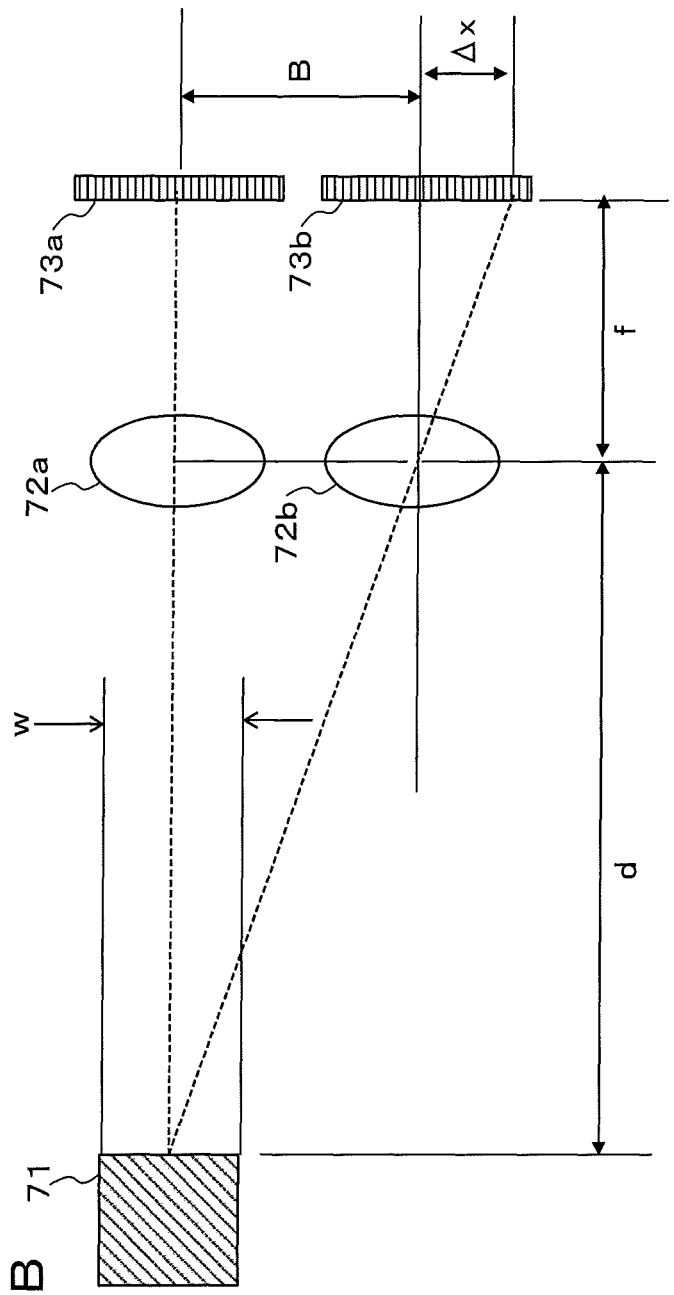

FIG. 18B Shows a case where the optical system of the information acquisition section 2 is constructed of two optical systems 73a and 73b, and an image sensor is constructed with two image sensors 73a and 73b. In FIG. 18B also, width of the object location is made w, angle of view is made φ, distance from the optical systems 72a and 72b to the object location 71 is made d, and focal length of the optical systems 72a and 72b is made f. A center to center dimension (parallax error) for the image sensor 73a and the image sensor 73b is B. Image position of the image sensor 73a is on the optical axis of the optical system 72a, and image position of the object location 71 on the image sensor 73b is offset by Δx from the center position of the image sensor 73b. Specifically, the object location 71 is relatively offset by Δx between the two image sensors. A distance d at this time can be calculated using equation (3) below.

$$d = \Delta x * B / f \tag{3}$$

Once distance d is obtained, it is possible to calculate width 3 of the object location 71 by substituting into equation (1) above. Specifically, if it is possible to accurately calculate distance, it is also possible to similarly calculate image width w.

In this way, with the second embodiment of the present invention, a linear measured physical object is extracted using annotation (refer to FIG. 14 and FIG. 15), and it is possible to perform image processing such as filling in of this physical object. This portion that has been filled in is made annotation information, and stored in association with the image (refer to S45 in FIG. 14). Image data that has this annotation can be used as training data at the time of performing deep learning (refer to S61 and S63 in FIG. 16). Regarding training data for deep learning, answers (in this example filled in portions) must be associated with images one at a time as annotation, and is a time consuming operation. However, with this embodiment it is possible to automatically create image data having annotation, and it is possible to rapidly create training data.

Next, a modified example of the annotation flow that was shown in FIG. 14 will be described using the flowchart shown in FIG. 19. With this modified example, initially a specified number N of images having annotation are created, and when N images having annotation have been created then similarly to the first embodiment an inference model for measurement site extraction is created using these images having annotation. Compared to the flow of FIG. 14, the flow shown in FIG. 19 has steps S41, and S45 to S55, that are the same, and so description will focus on points of difference.

If the flow of FIG. 19 is commenced, it is first determined whether or not there are images for learning (S41). If the result of this determination is that there are images for learning, specifications are required (S42). Here, images are read out from among images that have been stored in the image DB 222c. Readout is performed excluding images that have already had annotation information attached. Also, even if annotation information has not been attached, readout is performed excluding images that were determined to be NG in step S115.

If specified images have been acquired, it is next determined whether or not there is an inference model (S44). As will be described later, with this modified example images having annotation are initially created for a specified number N of images, and an inference model is created with these images that have annotation as training data (refer to S127). In this step it is determined whether or not an inference model has already been created.

If the result of determination in step S44 is that an inference model has not been created, then images having annotation (training data) are created by analyzing images in steps S45 to S55. Once annotation information has been created, next the annotation information is accumulated (S57). Images having annotation information that have been created are stored in memory such as the information storage section 222. Next it is determined whether or not a number of images having annotation that have been accumulated in the memory has reached N (S59). If the result of this determination is that the number of images has not reached N, next, images are required (S60). Images having annotation are then created for the images that have been acquired, in steps S45 to S57.

If the result of determination in step S59 is that the number of images having annotation has reached N, deep learning is performed to create annotation (S125). Here, the learning section 223 performs deep learning to extract measurement object locations using the images having annotation that were accumulated in step S57.

Once deep learning has been performed, the learning results are made an inference model M (S127). Here, learning results from the learning section 223 are made the inference model M. Deep learning is performed every time N images having annotation are accumulated. Initial results of deep learning are stored as inference model 1 and results of the next deep learning are stored as inference model 2. After that, inference models 3, 4, . . . M are successively updated.

If the inference model M has been created, processing returns to step S41. If there are images for learning, specified images are acquired and after that it will be determined that there is an inference model in step S44. If it is determined that there is an inference model, inference is performed using the inference model M (S111). Here, measurement object locations in images that were read out in step S42 are inferred using the inference model M. Next, filling in is performed (S113). Here, measurement sites that were inferred in step S111 are filled in, and the filled in images are displayed on the display section 8.

If filling in has been performed, it is next determined whether or not that filling in is NG (S115). Here, whether filling in is OK or NG is determined by the user looking at images that have been displayed on the display section 8. As a result of having performed inference using the inference model M, there are cases where measurement sites have been filled in well (extracted), and cases where filling in has failed. The user therefore determines the resulting images of inference visually. If this determination results in NG, processing returns to step S41. Specifically, since the result of having performed inference is NG, those inference results are excluded from the deep learning of step S125.

On the other hand if the result of determination in step S115 is not NG, it is next determined whether or not adjustment is necessary (S117). There may be cases where it is necessary to correct measurement sites that were filled in by inference that the user has judged visually to be not be NG. In this step therefore it is determined whether or not it has been deemed necessary for the user to perform correction as the result of having performed visual inspection.

If the result of determination in step S117 is that adjustment has been deemed necessary, correction is performed (S119). Here, correction is applied to images that are being displayed on the display section 8 by the user operating the operation section.

If correction has been performed in step S119, or if the result of determination in step S77 is that adjustment is not necessary, annotation information is accumulated (S121). Here, annotation information that has been judged to be OK with correction or without correction is accumulated in memory.

It is next determined whether or not a number of images having annotation has reached N (S123). Here, determination as to whether or not there are N images having annotation is performed after having performed the previous deep learning. If the result of this determination is that N images having annotation have been accumulated, processing advances to previously described step S125 and deep learning is performed. After that the previously described operations are repeated and if there are no longer any images for learning (S41→No) the deep learning for creating annotation is terminated.

In this way, with this modified example, if the number of images having annotation reaches N, then an inference model for creating images having annotation is created by deep learning (refer to S59, S125, and S127). Then, once this inference model has been created inference is performed in order to create images having annotation, using the inference model (refer to S111). As a result, it is possible to rapidly create a large amount of image data having annotation (training data).

Also, images in which filled in regions have been inferred using an inference model are visually inspected by the user, and if images are deemed to be NG (inappropriate) those images are excluded from image data having annotation (training data) (refer to S115 Yes). If the number of images that have not been determined to be NG reaches N, deep learning is performed again and an inference model is created (refer to S123 Yes, S125 and S127). As a result it is possible to improve reliability of the inference model.

Also, for images that have not been determined to be NG (inappropriate), it is determined whether or not correction is necessary for annotation information, and if correction is necessary images that have been corrected are used in deep learning (may also be machine learning) at the time of updating an inference model (refer to S117, S119, S125, and S127). As a result, if there are images that can be corrected it is possible to use these images as a population at the time of learning for inference model creation.

It should be noted that with this modified example the specified number N has been made a fixed value, but it may also be a variable, for example, if M representing a model update number, is increased, the specified value N may also be increased, and conversely may also be decreased. Also, although the user performs judgment visually in steps S75 and S77, whether or not there is a linear structure and/or whether or not correction is required, may also be performed using image analysis. Also, with the flow shown in FIG. 9, it is determined whether or not it is possible to correct images that were NG, and correction performed if correction was possible. However, this operation may be omitted.

Also, with this modified example annotation is attached to a linear structure. However, a physical object to which annotation is attached is not limited to being a linear structure, and may be spherical, or may be a structure having various shapes such as a cube, a rectangular solid, a cone etc. Also, the physical object is not limited to being three-dimensional, and may be two-dimensional.

Also, with this modified example until the images having annotation reaches the specified value N, annotation may be attached by analyzing image data, in the same way as in the flow of FIG. 14. Annotation may also be attached not using image analysis, but by designating positions and areas where annotation should be attached as a result of visual inspection of images by the user. For example, annotation may be given to the range of affected parts by a physician while looking at images that are displayed on a PC or the like.

As has been described, with the second embodiment and modified example of the present invention, extension direction of a structure in an image is determined by analyzing the image (refer to S47 in FIG. 14), a direction that is orthogonal to the determined extension direction is determined (refer to S49 in FIG. 14), outline portions for the orthogonal direction are determined based on contrast change and/or color change of the image of the structure (refer to S51 in FIG. 14), image processing to fill in along the extension direction of the structure up to the outline portions in the orthogonal direction is applied to the structure within the image (refer to S53 in FIG. 14), images that have been filled in are made annotation information (refer to S55 in FIG. 14), and the images and annotation information are used as training data in machine learning for creating an inference model to determine images of a structure. As a result it is possible to easily create training data for use in machine learning such as deep learning. Specifically, according to this embodiment, it is possible to simplify an annotation operation.

Figure 19B:
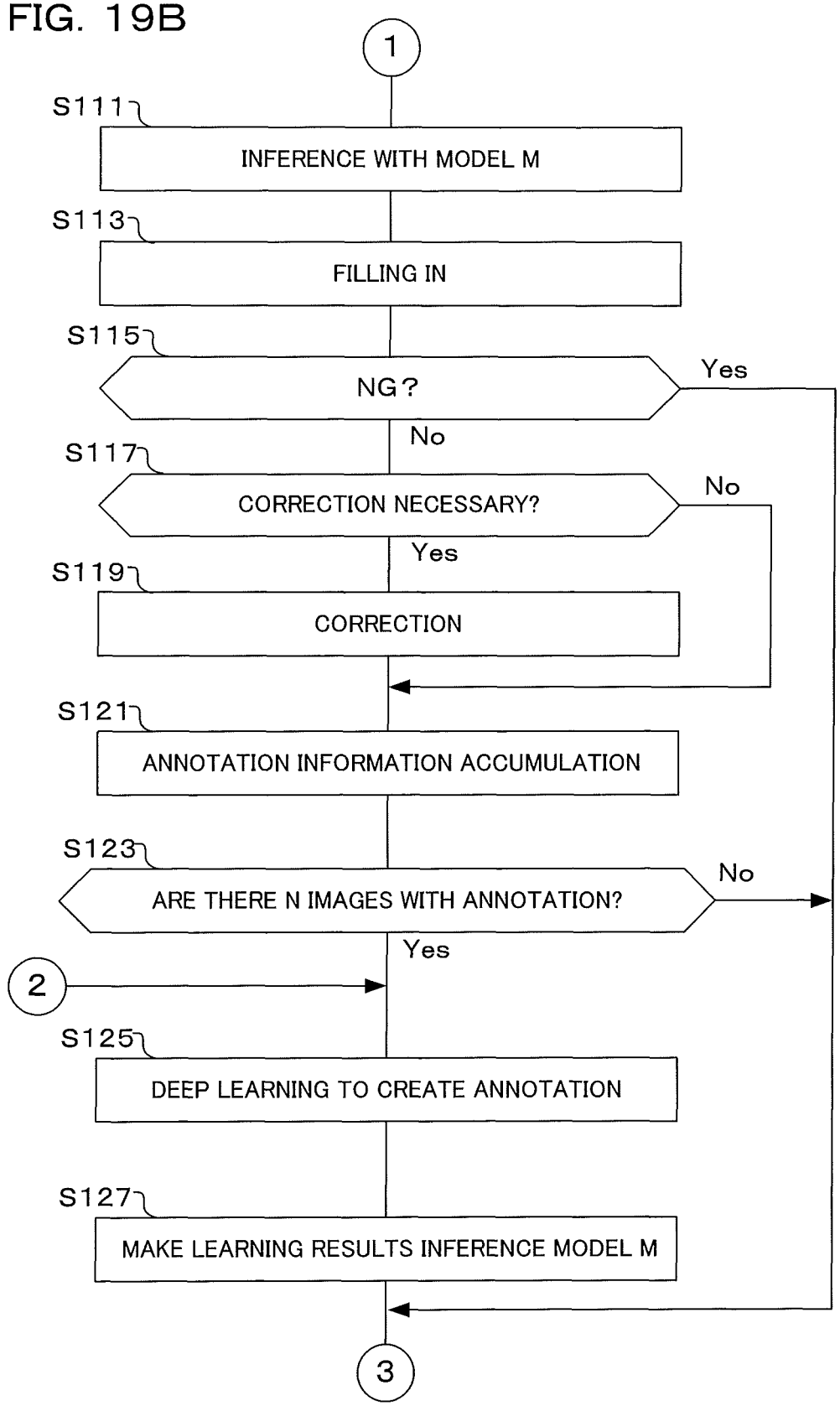

Also, image processing to fill-in object sections is applied by performing analysis of images (refer to S53 in FIG. 19A), images that have been filled in are made annotation information (refer to S55 in FIG. 19A), combinations of images and annotation information are made training data, an inference model for inferring object sections is created using machine learning (refer to S125 and S127 in FIG. 19B), and training data is created by filling in object sections and applying annotation information to images that are different to images that have annotation information attached, using the inference model (refer to S111, S113, and S121 in FIG. 19B). As a result it is possible to easily create training data for use in machine learning such as deep learning.

Also, first annotation processing is performed to add annotation to images by performing image analysis (refer to S42 to S59 in FIG. 19A), an inference model for performing annotation application is generated using training data that has been created by the first annotation processing (refer to S125 and S127 in FIG. 19B), and second annotation processing is performed in order to attach annotation to images that are different to images that have annotation information attached, using the inference model (refer to S111 to S127 in FIG. 19B). As a result it is possible to easily create training data for use in machine learning such as deep learning.

Also, until annotation information of a specified number N have been initially accumulated, annotation information is created based on images that have been filled in using the image processing section (refer to S45 to S59 in FIG. 19A), and after the specified number N of annotation information have been accumulated, annotation information is created using an inference model created using the learning section (refer to S111 to S127 in FIG. 19B). This means that if the user performs annotation on a given number N of images, afterwards it is possible to create annotation information using an inference model, and it is possible to rapidly make a large amount of annotations.

Also, in a case where images to which annotation information has been attached using an inference model have been determined to be inappropriate, the images that have been determined to be inappropriate are excluded (S115 Yes in FIG. 19B), machine learning is performed to attach annotation information using images that were not determined to be inappropriate, and an inference model is updated (refer to S121, S125, and S127 in FIG. 19B). Images that have been determined to be inappropriate are not used at the time of inference model creation, and so it is possible to increase the reliability of the inference model.

Also, for images that have not been determined to be inappropriate, it is determined whether or not correction is necessary for annotation information, and if correction is necessary images that have been corrected are also used in machine learning at the time of updating an inference model (refer to S117, S119, S121, S125, and S127 in FIG. 19B). As a result, since an inference model is generated using correct images there is no wasted effort.

Also, with the second embodiment and modified example of the present invention, inventions of a display device such as described below also included. This display device analyzes physical object images that have been captured, detects parts to be measured, and performs display (refer, for example, to FIG. 13A to FIG. 13D). This display device comprises an extension direction determination section that determines extension direction of the shape of the structure (refer, for example, to the structure extension direction determination section 225 in FIG. 11), an orthogonal direction determination section that determines a direction that is orthogonal to the extension direction that has been determined by the extension direction determination section (refer, for example, to the orthogonal direction determination section 226 in FIG. 11), and an outline portion determination section that determines outline portions in a vertical direction based on contrast change and/or of the structure in the image (refer, for example, to the orthogonal direction outline determination section 228 in FIG. 11). Then, for a structure within physical object images, images that have the structure filled-in along an extension direction of the structure up to outline portions in an orthogonal direction are made annotation information, machine learning is performed with the annotation information as training data, and parts to be measured are detected using the inference model that has been generated by this machine learning. An invention of a program for execution by a computer provided in a display device having the same structure as this display device, and implementing, is also included. If training data is created based on annotation information, then since it is possible to generate an inference model using this training data, it is possible afterwards to infer parts to be measured using this inference model.

It should be noted that at the time of creating an inference model specifications of the inference model change depending on images that are used in learning. Information indicating what type of learning has been performed may be set at the time of an annotation operation, and this information may be stored as part of the inference information 4a in the memory 4 of the information acquisition device 10.

For example, in the case of performing inference using an inference model that was created by learning using only images that were horizontally and vertically aligned, there is a possibility that correct inference will not be possible for images having horizontal and vertical displacement. Therefore, by performing inference on acquired images with the addition of horizontal or vertical information from the attitude sensor 3 at the time of reading out the above described information from the inference information 4a and performing imaging, correct measurement site determination becomes possible. An approach such as determining images by inputting horizontal and vertical information before performing inference using an inference model is effective, and it is preferable to have sensors for correcting information and images under these conditions.

Similarly, if learning is performed using only images that have been obtained from specified distances, correct inference is not possible for images that have been taken at other than the specified distance. In the case of performing inference using an inference model that has been generated with these types of images, it is possible to improve precision by taking an approach such as using an inference model by enlarging images that are far away so as to negate distance differences to making images that have been made artificially close. In this case, also using a distance sensor etc., at the time of performing inference on images correction is performed to handle differences between actual scaling of images and learning data. A memory is provided for storing information as to what kind of learning data was used in creating a model, and when performing inference a scheme may be implemented such as correcting images so that an inference model can perform correct inference, using the above-described information.

Obviously shooting locations may be considered in advance in accordance with differences in various shooting conditions that will arise at the shooting locations, or, as learning data, learning data that can deal with unknown conditions is prepared so that it becomes possible to handle unknown conditions, and learning may be performed using a reinforcement learning method whereby learning is performed by also applying specific rewards. Reinforcement learning is for learning of "behavior for maximizing values" by trial and error, and is not learning mere output of a correct solution that has been provided, but is learning so as to be able to obtain even better solutions. In particular, at the time of creating an inference engine of a portable compact size so as to be used with a terminal device at a location such as shown in this embodiment, learning that takes an extremely long time is performed taking into consideration number of layers and current consumption.

Also, with the second embodiment and modified example of the present invention, description for the case of appending annotation information to images has been described with an example of linear structures. However, this embodiment is not limited to linear structures, and can be applied to various structures. Further, this embodiment can also be applied when an affected part is extracted by a physician from images such as x-ray photographs or endoscope photographs, and annotation is performed for this affected part. In this case, annotation may be performed on images that have been stored in a standalone PC, or on a server etc. that has been connected to the Internet or an intranet, as an external device.

Since learning to produce high precision determination with few neural network layers is difficult and takes time for a compact type inference engine that is loaded in an information terminal product such as a camera or a mobile device, it is preferable for accurate annotation and the way of learning to be contrived. When creating an inference model, since specification of the inference model changes in accordance with images that were used in learning, efficient learning may also be carried out in cooperation with information at the time of learning. Information indicating what type of learning has been performed may be set at the time of an annotation operation, and this information may be stored as part of the inference information 4a in the memory 4 of the information acquisition device 10.

For example, in the case of performing inference using an inference model that was created by learning using only images that were horizontally and vertically aligned, and that were acquired using general purpose taken images, there is a possibility that correct inference will not be possible for images having horizontal and vertical displacement. Therefore, by performing inference on acquired images with the addition of horizontal or vertical information from the attitude sensor 3 at the time of reading out the above described information from the inference information 4a and performing imaging, correct measurement site determination becomes possible. An approach such as determining images by inputting horizontal and vertical information before performing inference using an inference model is effective, and it is preferable to have sensors for correcting information and images with this approach. Since specification and performance of an inference engine will change depending on whether or not to input these type of restrictions at the time of learning, it is preferable to be able to perform this type of trial and error while the annotation operation progresses, and progress of that trial and error may be displayed.

Similarly, if learning is performed using only images that have been obtained from specified distances with respect to the physical objects, correct inference is not possible for images that have been taken at other than the specified distance. In the case of performing inference using an inference model that has been generated with these types of images, it is possible to improve precision by taking an approach such as using an inference model by enlarging images that are far away so as to negate distance differences and making images that have been made artificially close. In this case, also using a distance sensor etc., at the time of performing inference on images correction is performed to handle differences between actual scaling of images and learning data. A memory is provided for storing information as to what kind of learning data was used in creating a model, and when performing inference a scheme may be implemented such as correcting images so that an inference model can perform correct inference, using the above-described information. Whether or not this type of correction is necessary is discovered at the time of an annotation operation, and at the time of an annotation operation such as in this embodiment, an approach that makes it possible to verify provisional learning is beneficial.

Obviously shooting locations may be considered in advance in accordance with differences in various shooting conditions that will arise at the shooting locations, or, as learning data, data are prepared that include learning data and various conditions so that it becomes possible to deal with unknown conditions, and learning may be performed using a reinforcement learning method whereby learning is performed by also applying specific rewards. Reinforcement learning is for learning of "behavior for maximizing values and effects" by trial and error, and is not learning mere output of a correct solution that has been provided, but is learning to as to be able to obtain even better solutions. In particular, with a terminal device used at a site as represented in this embodiment, since it is necessary for a compact type inference engine to take into consideration a number of layers and consumed current, and it is thus preferable to perform very time consuming learning, an approach of giving reward etc. in the learning can be considered while performing annotation operations. Feedback to perform review of specifications etc. ahead of schedule becomes possible while confirming results of provisional learning, and it is possible to comprehensively contribute to obtaining an inference engine of excellent performance, including time reduction.

Also, with the second embodiment and modified example of the present invention, the learning section 223, linear structure determination section 224, structure extension direction determination section 225, orthogonal direction determination section 226, annotation information creation section 227, orthogonal direction outline determination section 228, and filling-in in section 229 are constructed separately from the control section 221, but some or all of the functions of the sections may be implemented using a CPU (Central Processing Unit) and program code, may be implemented by circuits that are executed by program code such as a DSP (Digital Signal Processor), may use a hardware structure such as gate circuits that are generated based on a programming language described using Verilog, or may be executed using hardware circuits.

The invention as described below is included as each of the embodiments and modified examples of the present invention. An annotation device that comprises a playback section that performs individual successive playback display of a plurality of images that may contain physical objects that will be the subject of annotation, a designation section that designates specific portions of the physical objects within the images that have been played back by the playback section by manual operation, and a learning section that, when there is change to different images, among the plurality of images, in order to designate the specific portions by manual operation, separates into an image set for learning and an image set for correct solution, creates an inference model by learning using a relationship between physical objects and the specific portions of the image set for learning as training data, and verifies the inference model with the image set for correct solution.

The invention as described below is included as each of the embodiments and modified examples of the present invention. An annotation method comprising individually and successively playing back a plurality of images that may contain physical objects that will be the subject of annotation, designating specific portions of the physical objects within the images that have been played back, by manual operation, and when there is change to different images, among the plurality of images, in order to designate the specific portions by manual operation, separating into an image set for learning and an image set for correct solution, creating an inference model by learning using a relationship between physical objects and the specific portions of the image set for learning as training data, and verifying the inference model with the image set for correct solution.

The invention as described below is included as each of the embodiments and modified examples of the present invention. An annotation device comprising a classification section that classifies a plurality of images that may contain physical objects that may constitute subjects of annotation, in accordance with general classification, a playback section that individually and successively plays back the plurality of images in accordance with the general purpose classification by the classification section, and a designation section that designates specific portions of the physical objects within the images that have been played back by the playback section by manual operation.

The invention as described below is included as each of the embodiments and modified examples of the present invention. An annotation method comprising classifying a plurality of images that may contain physical objects that may constitute subjects of annotation, in accordance with general classification, individually and successively playing back the plurality of images that have been classified in accordance with the general classification, and designating specific portions of the physical objects within the images that have been played back, by manual operation.

Also, the invention as described below is included as each of the embodiments and modified examples of the present invention. A machine learning device comprising an extension direction determination section that determines extension direction of a structure in an image by analyzing the image, an orthogonal direction determination section that determines an orthogonal direction with respect to an extension direction that has been determined by the extension direction determination section, an outline determination section that determines outline portions in an orthogonal direction, based on contrast change and/or, change in images of the structure, a filling in section that applies image processing to fill up structures within the image along the extension direction of the structure up to outline portions in the orthogonal direction, and an annotation information creating section that makes images that have been filled in by the filling in section into annotation information, wherein the images and annotation information are used as training data in machine learning in order to create an inference model that determines images of a structure.

Also, the invention as described below is included as each of the embodiments and modified examples of the present invention. A machine learning device that, if the number of images that have had the annotation information appended reaches a specified number of images, generates an inference model by performing machine learning in order to append annotation information, and after that appends annotation information to new images using this inference model.

Also, the invention as described below is included as each of the embodiments and modified examples of the present invention. A machine learning device that, in a case where images to which annotation information has been attached using the inference model have been determined to be inappropriate, the images that have been determined to be inappropriate are excluded, machine learning is performed to attach the annotation information using images that were not determined to be inappropriate, and an inference model is updated.

Also, the invention as described below is included as each of the embodiments and modified examples of the present invention. A machine learning device that, for images that have not been determined to be inappropriate, determines whether or not correction is necessary for annotation information, and if correction was necessary images that have been corrected are also used in machine learning at the time of updating an inference model.

Also, the invention as described below is included as each of the embodiments and modified examples of the present invention. A machine learning device wherein an outline determination section determines adjoining portions of the parts by referencing nearby adjoining portions, for parts where there is no contrast change and/or change of an image.

Also, the invention as described below is included as each of the embodiments and modified examples of the present invention. An inference model that has been created using the annotation creation section.

Also, the invention as described below is included as each of the embodiments and modified examples of the present invention. A display device that analyzes physical object images that have been captured, and detects and displays parts to be measured, comprising an extension direction determination section that determines extension direction of a structure in an image, an orthogonal direction determination section that determines an orthogonal direction with respect to an extension direction that has been determined by the extension direction determination section, and an outline determination section that determines outline portions in an orthogonal direction, based on contrast change and/or, change in images of the structure, wherein images in which a structure is filled in within the physical object image along an extension direction of the structure up to outline portions in an orthogonal direction, are made annotation information, machine learning is performed with the annotation information as training data, and the parts to be measured are detected using the inference model that has been generated by this machine learning.

Also, the invention as described below is included as each of the embodiments and modified examples of the present invention. A display method wherein physical object images that have been captured are analyzed, and displays parts to be measured are detected, comprising determining an extension direction of a structure in an image at the time of learning, determining and orthogonal direction with respect to the extension direction that has been determined, and after having determined outline portions in an orthogonal direction, based on contrast change and/or, change in images of the structure, making images having filled in structures within the physical object image along an extension direction of the structure up to outline portions in an orthogonal direction, into annotation information, performing machine learning with the annotation information as training data, and detecting the parts to be measured using the inference model that has been generated by this machine learning.

The invention as described below is also included as each of the embodiments and modified examples of the present invention. A display method wherein physical object images that have been captured are analyzed, and parts to be measured are detected and displayed, comprising, in a learning device, determining extension direction of a structure in an image, and determining an orthogonal direction with respect to the extension direction that has been determined, determining outline portions in an orthogonal direction, based on contrast change and/or change in images of the structure, making images, that have had up to outline portions in an orthogonal direction, for a structure within the physical object image, filled in along an extension direction of the structure, into annotation information, generating an inference model by performing machine learning with the annotation information as training data, and, in a display device, detecting the parts to be measured using the inference model that has been generated by the machine learning.

The invention as described below is also included as each of the embodiments and modified examples of the present invention. A program for executing a computer that has been provided in a display device that analyzes physical object images that have been captured and detects and displays parts to be measured, the program comprising determining an extension direction of a structure in an image at the time of learning, determining an orthogonal direction with respect to the extension direction that has been determined, and after having determined outline portions in an orthogonal direction, based on contrast change and/or change in images of the structure, making images, that have had up to outline portions in an orthogonal direction, for a structure within the physical object image, filled in along an extension direction of the structure, into annotation information, performing machine learning with the annotation information as training data, and detecting the parts to be measured using the inference model that has been generated by this machine learning.

The invention as described below is also included as each of the embodiments and modified examples of the present invention. A program for executing a computer that has been provided in a display device that analyzes physical object images that have been captured and detects and displays parts to be measured, the program comprising determining an extension direction of a structure in an image at the time of learning, determining an orthogonal direction with respect to the extension direction that has been determined, determining outline portions in an orthogonal direction based on contrast change and/or change of the structure in the images, making images, that have had up to outline portions in an orthogonal direction, for a structure within the physical object image, filled in along an extension direction of the structure, into annotation information, transmitting an inference model that has been generated by this machine learning with the annotation information as training data, and detecting the parts to be measured using the inference model that has been transmitted.

The invention as described below is also included as each of the embodiments and modified examples of the present invention. A training data creation device, comprising an image processing section that analyzes images and applies image processing to fill-in an object portion, an annotation information creating section that makes images that have been filled in by the image processing section into annotation information, and a learning section that creates an inference model for inferring the object portions using machine learning with combinations of the images and the annotation information that has been added by the annotation information creating section as training data, wherein the training data creation device creates the training data by filling in the object portions for images that are different to images that have annotation information attached, using the inference model that has been created by the learning section, and adding the annotation information.

The invention as described below is also included as each of the embodiments and modified examples of the present invention. A training data creation device, wherein, until annotation information of a specified number N have been initially accumulated, annotation information is created based on images that have been filled-in using the image processing section, and after the specified number N of annotation information have been accumulated, annotation information is created using an inference model that has been created using the learning section.

Also, the invention as described below is included as each of the embodiments and modified examples of the present invention. A training data creation device wherein, in a case where images to which annotation information has been attached using the inference model have been determined to be inappropriate, the images that have been determined to be inappropriate are excluded, machine learning to attach the annotation information is performed using images that were not determined to be inappropriate, and an inference model is updated.

Also, the invention as described below is included as each of the embodiments and modified examples of the present invention. A machine learning device wherein, for images that have not been determined to be inappropriate, whether or not correction is necessary for annotation information is determined, and if correction was necessary images that have been corrected are also used in machine learning at the time of updating an inference model.

Also, the invention as described below is included as each of the embodiments and modified examples of the present invention. A machine learning method wherein an extension direction of a structure in an image is determined by analyzing the image, an orthogonal direction with respect to the extension direction that has been determined is determined, outline portions for the orthogonal direction are determined based on contrast change/and or change of the physical object in the image, image processing is applied to fill in along the extension direction of the structure up to the outline portions in the vertical direction, images that have been filled in are made annotation information, and the images and the annotation information are used as training data in machine learning to create an inference model for determining images of a structure.

Also, the invention as described below is included as each of the embodiments and modified examples of the present invention. A training data creation method, comprising analyzing images and applying image processing to fill-in an object portion, making images that have been filled in into annotation information, creating an inference model for inferring the object portions using machine learning with combinations of the images and the annotation information as training data, and creating training data by filling in object portions for images that are different to images that have annotation information attached, using the inference model, and adding the annotation information.

Also, the invention as described below is included as each of the embodiments and modified examples of the present invention. A training data creation method that analyzes images and performs first annotation processing to add annotation to the images, generates an inference model for performing annotation addition using training data that has been created by the first annotation processing, and performs second annotation processing in order to attach annotation to images that are different to images that have annotation information attached, using the inference model.

Also, with each of the embodiments and the modified examples of the present invention, an image acquisition device has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal, personal computer (PC), tablet type computer, game console etc., or a camera for a scientific instrument such as a microscope, a camera for mounting on a vehicle, a surveillance camera etc. In any event it is possible to apply the present invention as long as it is to a device that can acquire images for the purpose of adding annotation.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An annotation device, comprising:
   a display control circuit that performs the following display control:

(1) display of operation times of a series of annotation operations, or image data amount of the annotation operation, on a display; and
(2) sequential playback display of a plurality of images on the display, based on a plurality of items of image data that may contain physical objects constituting subjects of annotation; and
a processor that has the following circuits:
(a) a circuit that acquires operation results of an operation section that designates specific portions within an image that has been displayed on the display;
(b) a circuit that, in an annotation operation, acquires annotation information for the displayed image, based on the operation results; and
(c) a circuit that, at a point in time when an operation time, a time based on data amount, or data amount, that have been set, have been reached, make image data for which annotation information has already been acquired into training data, and requests learning, for generating an inference model that will infer specific portions from image data, to a learning circuit.

2. The annotation device of claim 1, wherein:
in a case where change of the operating time has been changed by operation of the operation section, the display control circuit displays the operating time that has been changed on the display.

3. An annotation device, comprising:
a display that performs sequential playback display of a plurality of images that may contain physical object that are the subject of annotation; and
a processor that, acquires specific portions that have been designated within the images displayed on the display as annotation information, sets operation time or data amount for designating the specific portions, and at a point in time where designation of the specific portions has been completed for the operation time, a time based on data amount, or data amount, that have been set, requests learning to an inference engine that creates an inference model by learning, using annotation information that has been acquired up to the time of completion as training data representing a relationship between the physical object and the specific portions.

4. The annotation device of claim 3, wherein:
the processor performs input of who it was that performed the annotation operation, when displaying operation time for a series of annotation operations, or image data amount for the annotation operations, on the display.

5. The annotation device of claim 3, wherein:
the processor automatically detects specific portions within the image data using information from sensor data that has been associated with shooting time of the image data, and designates specific portions of the physical objects based on the results of this detection.

6. The annotation device of claim 3, wherein:
when performing the inference model creation using the inference engine, the processor designates specific portions of the physical object by manual operation for remaining images, among the plurality of images, for which the specific portions have not been designated.

7. The annotation device of claim 3, wherein:
after having created an inference model using the inference engine, the specific portions are designated utilizing inference by the inference engine for remaining images among the plurality of images.

8. The annotation device of claim 3, wherein:
distribution of time for designating the specific portions by manual operation and time for creating the inference model is performed in accordance with operation time or data amount.

9. The annotation device of claim 3, wherein:
the processor has a classification section that classifies the plurality of images in accordance with general purpose image class classification, and selects images in which specific portions will be designated by manual operation in accordance with the classification.

10. The annotation device of claim 9, wherein:
the classification section designates a priority ranking for images when designating specific portions by manual operation.

11. The annotation device of claim 3, wherein:
the processor detects outline portions of the physical object, and makes a range that is enclosed by the outline portions into annotation information.

12. The annotation device of claim 11, wherein:
extension direction of images of a physical object is determined, a direction that is orthogonal to the extension direction is further determined, and outline sections are detected based on the extension direction and the orthogonal direction.

13. An annotation method, comprising:
setting operation time or data amount for designating specific portions of a physical object that may subjects of annotation;
sequentially playing back a plurality of images that may contain the physical object in accordance with operation time or data amount that have been set, and performing annotation to designate specific portions of the physical object within an image that has been played back; and
requesting generation of an inference model, by learning using a relationship between the physical object and the specific portions that has been acquired in the annotation as training data, to a learning device.

14. The annotation method of claim 13, further comprising:
designating the specific portions of the physical object using manual operation.

15. The annotation method of claim 13, further comprising:
automatically detecting specific portions within the image data using information from sensor data that has been associated with shooting time of the image data, and designating specific portions of the physical objects based on the results of this detection.

16. The annotation method of claim 13, further comprising:
when performing the inference model creation, concurrently designating specific portions of the physical object by manual operation for remaining images, among the plurality of images, for which the specific portions have not been designated.

17. The annotation method of claim 13, further comprising:
after having created the inference model, designating the specific portions utilizing inference by the inference model for remaining images among the plurality of images.

18. The annotation method of claim 13, further comprising:

performing distribution of time for designating the specific portions by manual operation, and time for creating the inference model, in accordance with operation time or data amount.

19. The annotation method of claim 13, further comprising:
classifying the plurality of images in accordance with general purpose image class classification, and selecting images in which specific portions will be designated by manual operation in accordance with the classification.

20. The annotation method of claim 19, further comprising:
designating a priority ranking for images when designating specific portions by manual operation.

21. The annotation method of claim 13, further comprising:
detecting outline portions of the physical object, and making a range that is enclosed by the outline portions into annotation information.

22. The annotation method of claim 21, further comprising:
determining extension direction of images of a physical object, further determining a direction that is orthogonal to the extension direction, and detecting outline sections based on the extension direction and the orthogonal direction.

* * * * *